United States Patent [19]

Kato et al.

[11] Patent Number: 5,953,044
[45] Date of Patent: Sep. 14, 1999

[54] PICTURE TRANSMISSION SYSTEM

[75] Inventors: Hitoshi Kato, Tokyo; Akino Inoue, Kawasaki; Shinji Nojima; Shugo Horikami, both of Tokyo; Masaki Sohma, Yokohama; Satoshi Kageyu, Fujisawa; Hiroshi Nishikawa, Kawasaki, all of Japan

[73] Assignee: Matsushita Electric Industrial Co., Ltd., Osaka, Japan

[21] Appl. No.: 08/782,147

[22] Filed: Jan. 10, 1997

[30] Foreign Application Priority Data

Jan. 11, 1996 [JP] Japan .................................... 8-019242

[51] Int. Cl.$^6$ .................................................. H04N 7/173
[52] U.S. Cl. ................................... 348/7; 348/12; 348/13; 348/17; 348/6; 455/3.1; 455/5.1; 455/4.1; 370/468; 370/465
[58] Field of Search .................................. 348/6, 7, 8, 10, 348/12, 13, 14, 15, 16, 17, 705, 153, 159; 455/3.1, 4.1, 4.2, 5.1, 6.1, 6.2, 6.3; 370/468, 465, 260, 522, 537; H04N 7/173, 7/18

[56] References Cited

U.S. PATENT DOCUMENTS

| | | | |
|---|---|---|---|
| 4,511,886 | 4/1985 | Rodriguez | 348/154 |
| 4,673,974 | 6/1987 | Ito | 348/159 |
| 4,679,077 | 7/1987 | Yuasa | 348/154 |
| 4,943,854 | 7/1990 | Shiota | 348/159 |
| 4,959,713 | 9/1990 | Morotomi et al. . | |
| 4,977,449 | 12/1990 | Morgan . | |
| 5,237,408 | 8/1993 | Blum et al. . | |
| 5,260,944 | 11/1993 | Tomabechi . | |
| 5,745,167 | 4/1998 | Kageyu | 348/153 |

FOREIGN PATENT DOCUMENTS

| | | |
|---|---|---|
| 0371150 | 6/1990 | European Pat. Off. . |
| 9205541 | 6/1992 | Germany . |
| 61-103382 | 5/1986 | Japan . |
| 5-7330 | 1/1993 | Japan . |

OTHER PUBLICATIONS

Tak–Shing Yum et al: "Cynamic Channel Assignment in Integrated–Services Cable Networks" Communications—Rising to the Heights, Denver, Jun. 23–26, 1991, vol. 1 of 3, Jun. 23, 1991, Institute of Electrical and Electronics Engineers, pp. 92–98, XP000269385.

*Primary Examiner*—John K. Peng
*Assistant Examiner*—Wesner Sajous
*Attorney, Agent, or Firm*—Lowe Hauptman Gopstein Gilman & Berner

[57] ABSTRACT

A picture transmission system capable of establishing arbitrary picture connections with picture inputting units exceeding in number channel resources of a transmission medium for multiplexing and transmitting video information taken through the picture inputting units. A picture sending state storage unit provided corresponding to each of the picture inputting units virtually retains channel resources whose number equals the number of picture outputting units to which the picture inputting units are in connection. For picture connection switching from one picture outputting unit to a different picture inputting unit, the picture sending state storage unit gives its channel resource to the different picture inputting unit. The system is provided with a picture connection managing unit for controlling the picture connections between the picture inputting units and the picture outputting units. The picture connection managing unit accepts a picture connection request to perform the centralized management of channel resources of the transmission medium to allow dynamic channel resource allocation. Under control of the picture connection managing unit, the picture connection between the picture inputting unit and the picture outputting unit takes place through an allocated channel resource.

19 Claims, 27 Drawing Sheets

EXAMPLE OF CONNECTION
REQUEST CONTENTS :
PICTURE CONNECTION OF
CAMERA 801-1 TO
MONITOR 803-2
FIG. 17A
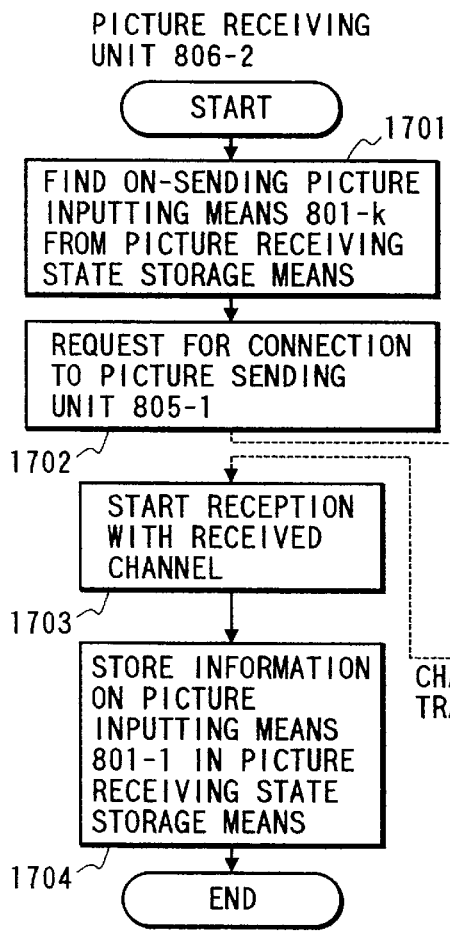
FIG. 17B
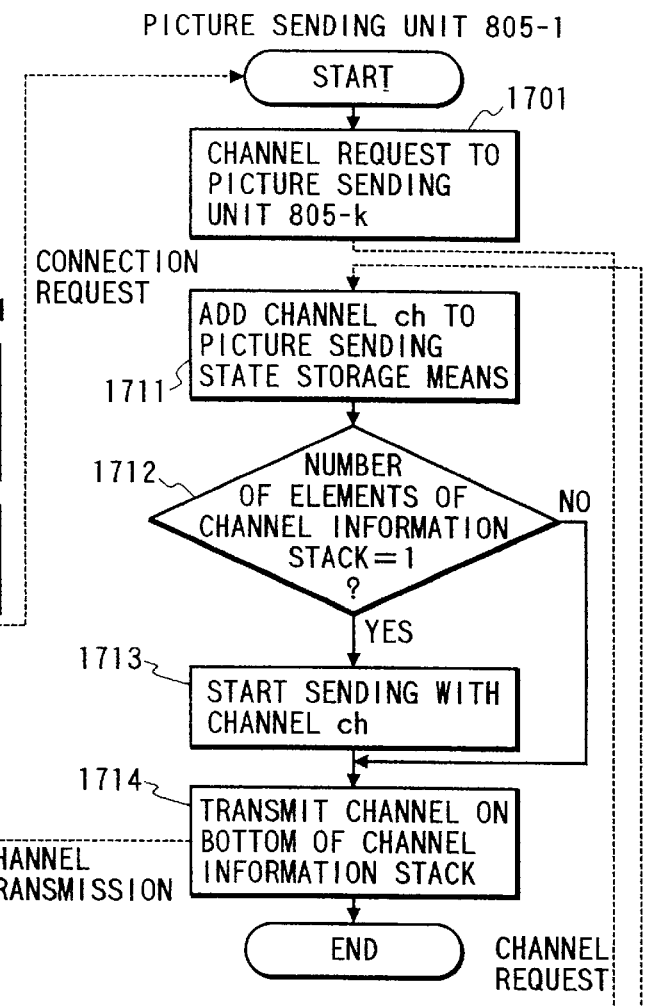
FIG. 17C
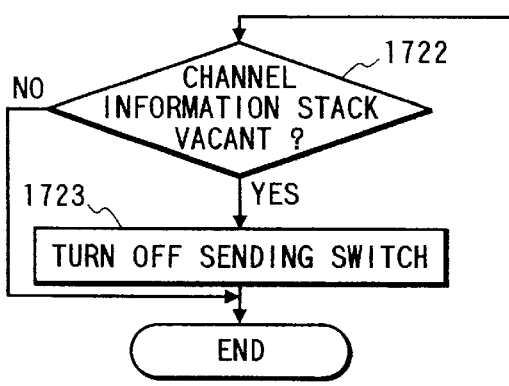
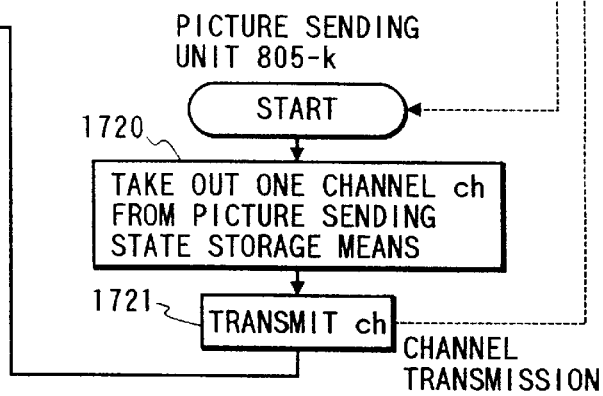

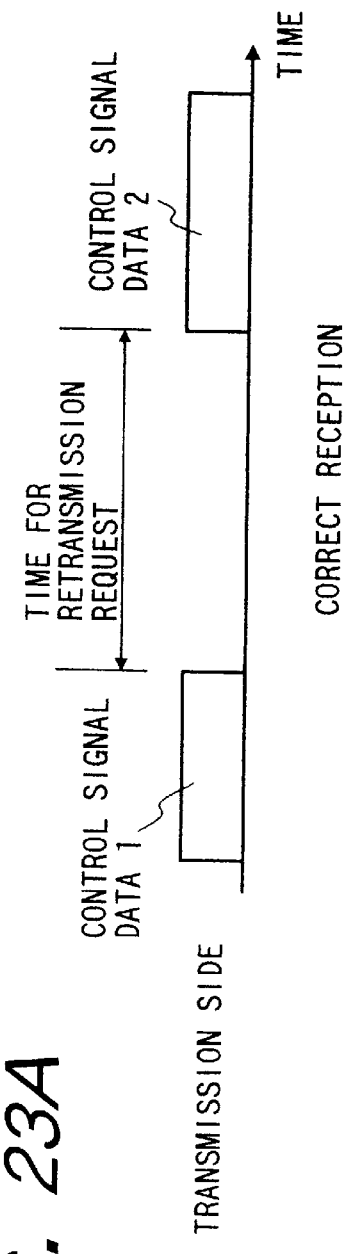
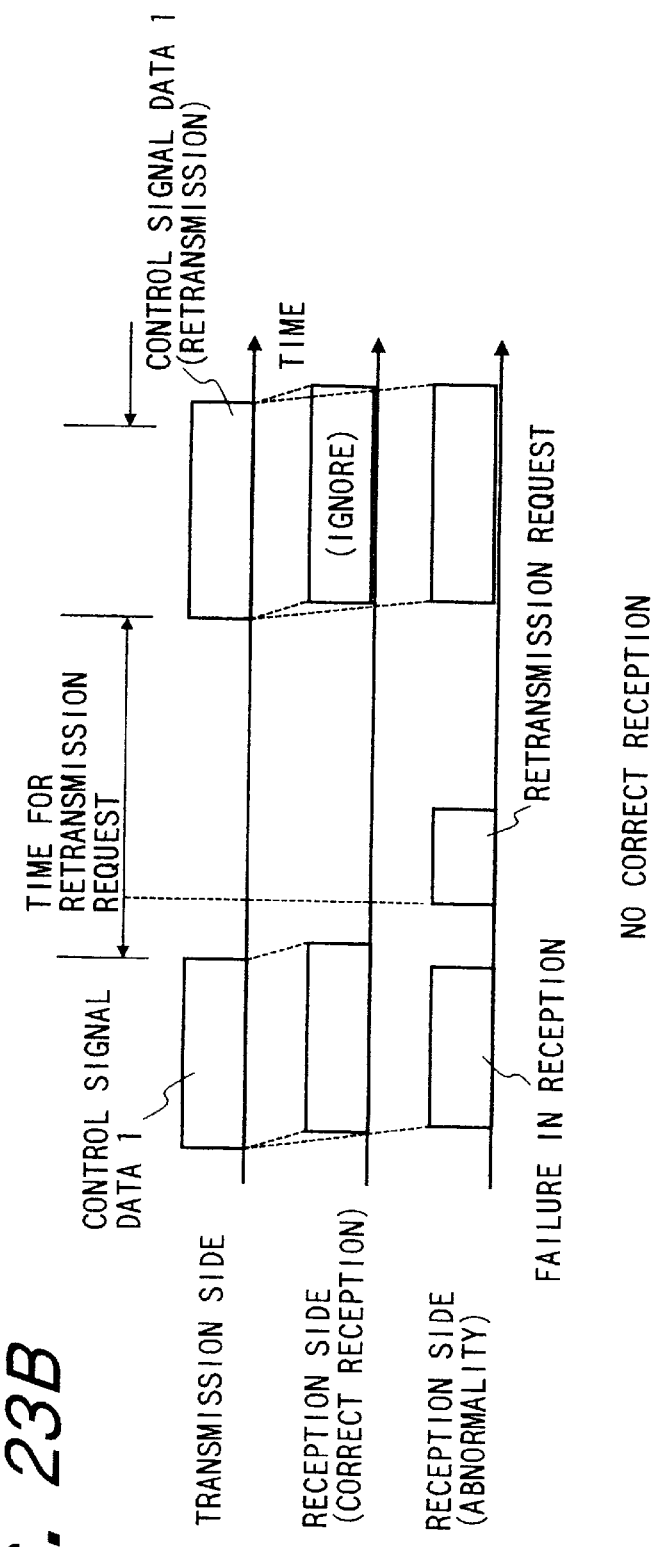
FIG. 23A
FIG. 23B

LOCAL CONTROL SIGNAL TRANSMISSION SECTION OF PICTURE SENDING UNIT, PICTURE RECEIVING UNIT OR CONTROL SIGNAL TRANSMISSION UNIT

ERROR INFORMATION TRANSMISSION SECTION OF PICTURE SENDING UNIT, PICTURE RECEIVING UNIT OR CONTROL SIGNAL TRANSMISSION UNIT

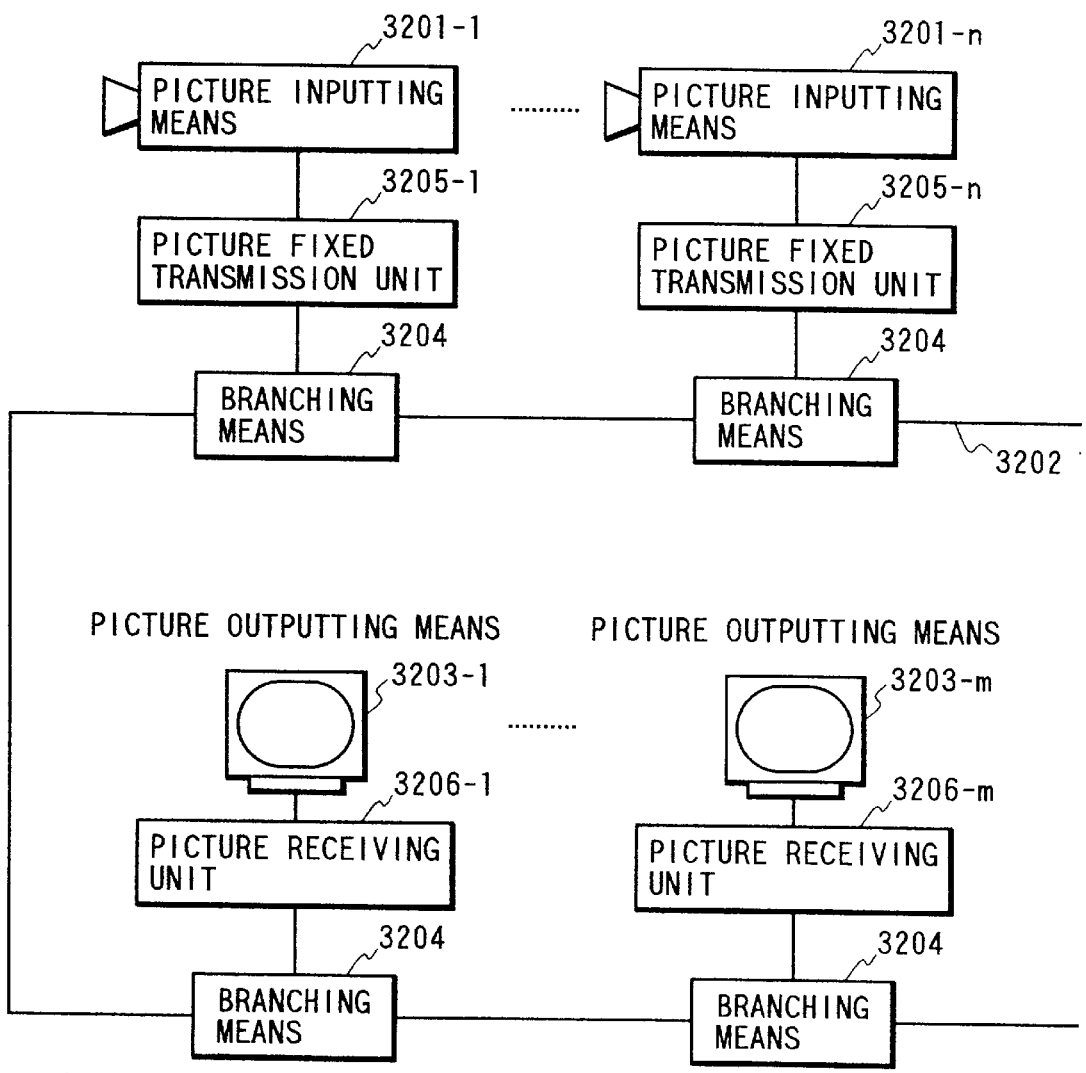

PICTURE TRANSMISSION SYSTEM

BACKGROUND OF THE INVENTION

1. Field of the Invention

The present invention relates to a picture transmission system based upon a frequency multiplex technique or a time division multiplex technique, applicable to on-demand video systems, monitoring camera systems, and others, which transmission system is capable of effective allocation of transmission resources and of switching operation producing less disorder or disturbance of pictures.

2. Description of the Prior Art

Recently, a transmission system for multiplexing video information or audio information to transmit them through a transmission medium has been adopted in fields such as cable television systems and monitoring camera systems which need to transmit a plurality of video information. A description will be made hereinbelow of a prior picture transmission system. As exemplified by Japanese Unexamined Patent Publication No. 5-7330, there has been known a transmission system using a transmission medium allowing the multiplexing of a plurality of video information. Although in this publication a picture transmission system is constructed as a monitor camera system, since even in a picture transmission system of a cable television the picture inputting means (cameras) can be considered to be centered at a head end portion without scattered, in addition to the TV camera a video player or the like can also be taken as the picture inputting means. Accordingly, the cable television system can be regarded as being a prior art.

FIG. 30 shows an arrangement of a prior transmission system.

This prior transmission system is composed of picture inputting means (cameras) 3201-1 to 3201-$n$, a transmission medium 3202 for multiplexing and transmitting video information inputted through the picture inputting means, picture output means (monitors) 3203-1 to 3203-$m$ for displaying the transmitted video information, branching means 3204 fitted in the transmission medium 3202 to join and distribute the multiplexed information, picture fixed transmission units 3205-1 to 3205-$n$ for fixedly outputting the video information from the picture inputting means to specific channels of the transmission medium 3202, and picture receiving units 3206-1 to 3206-$m$ for selecting the video information in the specific channels from the video information in a plurality of channels in the transmission medium 3202 to output them to the picture outputting means 3203-1 to 3203-$m$.

A description will be taken hereinbelow of an operation of the picture transmission system thus constructed. The picture fixed transmission units 3205-1 to 3205-$n$ modulate the video information, piked up by the respective picture inputting means (cameras) 3201-1 to 3201-$n$, with different fixed channel resources on the transmission medium 3202, with the modulated video information signals being introduced through the branching means 3204 into the transmission medium 3202. On the other hand, in the reception side the branching means 3204 distribute the video information signals on the transmission medium 3202, while the picture receiving units 3206-1 to 3206-$m$ demodulate the video information signals through the use of the channel resources designated, so that the picture outputting means (monitors) 3203-1 to 3203-$m$ display the demodulated video information. The picture picked up by the a given picture inputting means (camera) can appear on the picture outputting means (monitors) in such a manner that the operator changes the demodulation channels of the picture receiving units 3206-1 to 3206-$m$.

However, the prior picture transmission system creates the following problems. First, since the channel resources for the video information fed from the picture inputting (camera, video player) side are in a fixed condition, the number of picture inputting means to be installed is not be allowed to exceed the number of transmission medium channel resources. In addition, in practice the restriction to the channel resources usable occurs due to the significance and installed place of each of the picture inputting means (cameras), and the conventional arrangement involves this restriction in determining a different channel resource at every picture sending unit. Further, a special managing unit is necessary for the dynamic allocation of channel resources, and the trouble of the managing unit causes the difficulty of switching pictures. Still further, since difficulty is encountered to simultaneously carry out the picture switching operations in such a manner that a plurality of picture receiving units and a plurality of picture sending units are in the synchronized relation to each other, the picture temporarily falls into disorder at the picture switching.

Moreover, since the stability of a reception circuit in the picture receiving unit takes time in switching the channel resources for the picture reception, the disorder of the picture temporarily occurs. Further, when the picture receiving unit or the picture sending unit transmits a control signal to all the picture receiving units or picture sending units, the retransmission requests issued from the picture reception units or the picture sending units failing to receive the control signal gather to deteriorate the performance of the transmission medium. Still further, in the case of automatically performing the operations such as picture switching according to a given procedure, a special managing unit is required to manage that procedure, besides the switching processing and the transmission time go on increasing due to the use of the managing unit, which makes it difficult to gain a sufficient performance.

Furthermore, in the case of automatically executing the operation such as the picture switching with no use of the managing unit, difficulty is experienced to control its own automatic execution such as temporary stop and reexecution. In addition, in the case of automatically implementing the operation such as the picture switching with no use of the managing unit, since the scattered picture receiving units or picture sending units carry out the automatic execution, it is difficult to grasp the state of the execution. Further, in the case of the automatic execution of the operation such as the picture switching, there is a need to send switching requests, different in contents from each other, through the transmission medium to a plurality of picture receiving units or picture sending units, and therefore the actual switching operations therebetween can not concurrently take place, so that the picture switching in the plurality of picture receiving units take place in time-shifted states and becomes unnatural. Still further, in the case of the prior system, difficulty is encountered to transmit, through the transmission medium, control signals issued from control equipment (a camera, a video player, a different system or the like which outputs an message). Besides, because the picture receiving units or the picture sending units, which independently operate in parallel to each other, conduct various processes, it is difficult to capture the situation of the occurrence of errors.

SUMMARY OF THE INVENTION

It is therefore an object of the present invention to provide a picture transmission system which is capable of eliminating the above-mentioned drawbacks of the prior system. That is, a picture transmission system according to the present invention creates the following advantages.

1) The number of picture inputting means (cameras, video players) to be installed can exceed the number of channel resources of the transmission medium;
2) Taking into consideration the restriction to the channel resources for the utilization, the channel allocation is possible at every picture input means;
3) The dynamic allocation of the channel resources is possible with a simple arrangement without the use of a special managing unit;
4) The managing unit does not require the preparation of its own backup system;
5) A plurality of picture receiving units or picture sending units are synchronized with each other to switch the pictures without disorder;
6) The picture receiving unit uses two or more tuners to switch the pictures without disorder;
7) The picture receiving unit or the picture sending unit can transmit a control signal without greatly lowering the efficiency in the transmission medium;
8) The operations such as picture switching in the scattered picture receiving units or picture sending units are possible with no use of a managing unit;
9) The automatically executing operations such as picture switching are easily controllable in the dispersed picture receiving units or picture sending units;
10) It is easily possible to gasp the state of the automatically executing operations such as picture switching in the dispersed picture receiving units or the picture sending units;
11) In the case of automatically executing operations such as picture switching, the simultaneous switching of the picture in a plurality of picture receiving units is possible in such a manner that the switching operations are concurrently conducted between a plurality of picture receiving units or picture sending units, thus providing a natural switching of pictures;
12) It is easily possible to transmit a control signal from control equipment through a transmission medium; and
13) When a picture receiving unit, a picture sending unit or a control signal transmission unit conducts error processing, the situation of the executing state is readily graspable.

In accordance with an aspect of the present invention, a picture transmission system comprises a picture sending unit for selecting a specified channel of a transmission medium to output video information from picture inputting means and further for performing the input and output of a control signal, a picture receiving unit for selecting a specified channel from a plurality of channels multiplexed in the transmission medium to output video information from the specified channel to picture outputting means and further for carrying out the input and output of a control signal, a control signal transmission unit for performing the input and output of a control signal, picture connection requesting means for making a request for picture display switching of a picture of a specified picture inputting means to a specified picture output means, and a picture connection managing unit for managing a picture connection state and a channel resource of the transmission medium and for accepting a connection request from the picture connection requesting means to control the picture connection state, with the picture connection managing unit being equipped with a plurality of picture sending state storage means for storing or retaining channel information on the respective picture inputting means in a stacked structure, a plurality of picture receiving state storage means for storing identification information on the picture inputting means from which each of the picture outputting means is in a picture receiving condition, and resource allocation means for assigning channel resources necessary for picture connection.

Furthermore, the picture connection managing unit is provided with a plurality of picture sending state storage means for storing channel information on the respective picture inputting means which are on output and the number of picture outputting means which are in picture connection, a plurality of picture receiving state storage means for storing identification information on the picture inputting means from which each of the picture outputting means is on picture reception, vacant channel information storage means for storing a channel resource which is not in use, channel resource goodness-of-fit calculation means for calculating the goodness of fit between the picture inputting means and the channel resource, and resource allocation means for assigning a channel resource necessary for picture connection.

According to this invention providing such an arrangement, with a centralized control of the channel resources of the transmission medium under the picture connection managing unit, the dynamic allocation of the channel resources is made so that the picture inputting means (a camera, a video player or the like) and the picture outputting means (a monitor, a television or the like) are allowed to accomplish the picture connection through the use of the allocated channel resources. Further, the picture sending state storage means corresponding to each of the picture inputting means virtually has channel resources whose number is equal to the number of picture outputting means to which that picture inputting means is on picture connection, and when the picture outputting means switches its connection to different picture inputting means, the picture sending state storage means hands over the channel resources thereof to the picture inputting means being a target for switching, so that arbitrary picture connection is possible with the channel resources whose number equals the number of picture outputting means. Whereupon, the number of picture inputting means to be installed can be increased to exceed the number of channel resources of the transmission medium. Still further, by the manner in which the channels which are in no use are retained in the lump in the vacant channel information storage means and the goodness of fit between the vacant channel and the picture inputting means is calculated at the channel allocation, at the picture switching the channel allocation is possible taking into consideration the restriction of the used channel resources.

Furthermore, in accordance with another aspect of the present invention, a picture transmission system is composed of a picture sending unit for selecting a specified channel of the transmission medium to output video information from the picture inputting means and further for performing the input and output of a control signal, a picture receiving unit for selecting video information of a specified channel of a plurality of channels multiplexed in the transmission medium to output it to the picture outputting means and further for carrying out the input and output of a control signal, a control signal transmission unit for performing the input and output of a control signal, and picture connection requesting means for making a request for picture display switching of a picture from specified picture inputting means to specified picture outputting means, with the picture sending unit, the picture receiving unit and the control signal transmission unit being equipped with simultaneous transfer means for simultaneously transferring the same control signal to all the picture sending unit, the picture receiving unit and the control signal transmission unit or a group of a portion thereof.

In addition, a picture sending unit is provided with one picture sending state storage means for storing channel information on the picture inputting means in a stacked structure and sending channel resource delivering and receiving means for accepting and delivering channel resources from and to a different picture sending unit or picture receiving unit for picture connection, with the picture receiving unit being provided with one picture receiving state storage means for storing identification information on the picture inputting means from which the picture outputting means is on picture reception and reception channel resource delivering and receiving means for giving and receiving channel resources to and from a different picture sending unit for the picture connection.

Furthermore, each of a picture sending unit and a picture receiving unit is provided with execution command storage means for storing one or more execution commands such as the start of picture delivery using a specified channel resource and the start of picture reception, stored command execution means for implementing a command operation stored in the execution command storage means and execution command reception means for receiving an execution command from a different picture sending unit, a different picture receiving unit or a different control signal transmission unit to store it in the execution command storage means and further for receiving instructions for command execution from a different picture sending unit, a different picture receiving unit or a different control signal transmission unit to issue a request to the stored command execution means to conduct the command operation stored in the execution command storage means.

Still further, a picture receiving unit is composed of two or more picture signal demodulation means for selecting and demodulating a picture signal of video information multiplexed in the transmission medium in a set demodulation channel to output the demodulated picture signal, picture output switching means for selecting and outputting one of a plurality of picture signals outputted from the picture signal demodulation means, demodulation channel setting means for setting a demodulation channel for each of the picture signal demodulation means, and control signal reception means for receiving a control signal transmitted through the transmission medium and for accepting a picture switching request.

With the distributed management of the channel resources of the transmission medium by a plurality of picture sending units or picture receiving units, the dynamic allocation of the channel resources takes place, and the picture inputting means (cameras, video players or the like) and the picture outputting means (monitors, TVs or the like) can accomplish the picture connections through the use of the allocated channel resources. The picture sending state storage means corresponding to each of the picture inputting means virtually retains the channel resources whose number equals the number of picture outputting means to which that picture inputting means is in connecting relation, and when the picture outputting means switches its connection to a different picture inputting means, the picture sending state storage means hands over the channel resources thereof to the picture inputting means being the target for switching, so that arbitrary picture connections becomes possible with the channel resources which coincides in number with the picture outputting means. Therefore, the number of picture inputting means to be installed is allowed to exceed the number of channel resources of the transmission medium.

Through the use of simultaneous transfer means which can concurrently achieve the transmission to a plurality of picture sending units, a plurality of picture receiving units and a plurality of control signal transmission units and execution command storage means which stores execution commands such as picture switching in advance, a plurality of picture receiving units or picture sending units can be synchronized with each other to implement the picture switching operations, with the result that the switching becomes possible without the disorder of the pictures.

Furthermore, a picture sending units and a picture receiving units are equipped with a plurality of picture sending state storage means for storing the channel information on each of the picture inputting means in a stacked structure, a plurality of picture receiving state storage means for storing the identification information on the picture inputting means from which the picture outputting means are on the picture reception, and resource allocation means for assigning channel resources necessary for the picture connection. With the dynamic management of the channel resources by a plurality of picture sending units and a plurality of picture receiving units, the dynamic allocation of the channel resources becomes possible with a simple arrangement without the use of a special managing unit.

Still further, each of a picture sending unit and a picture receiving unit is provided with a plurality of picture sending state storage means for storing the channel information on the respective picture inputting means which is currently in the outputted state and the number of picture outputting means which are on the picture connection, a plurality of picture receiving state storage means for storing the identification information on the picture inputting means to which each of the picture outputting means is in picture receiving relation, vacant channel information storage means for storing the channel resources which are not put to use, channel resource goodness-of-fit calculation means for calculating the goodness-of-fit between the picture inputting means and the channel resource, and resource allocation means for allocating the channel resources necessary for the picture connection. In the manner that the channels which are in no use are stored in lump in the vacant channel information storage means and the goodness-of-fit is calculated at the channel allocation, the channel allocation is allowed with the restriction of the channel resources to be used in the picture switching in mind.

Moreover, each of a picture sending unit, a picture receiving unit and a control signal transmission unit is equipped with simultaneous transfer means, control data transmission means for transmitting control data to a different picture sending unit, a different picture receiving unit and a different control signal transmission unit in response to a request from the simultaneous transfer means, control data reception means for receiving control data from a different picture sending unit, a different picture receiving unit and a different control signal transmission unit through the transmission medium, control data detection means for detecting the fact that the control data flows on the transmission medium, transmission control means for making a request for retransmission of the control data to the simultaneous transfer means when a different picture sending unit, a different picture receiving unit and a different control signal transmission unit issue a retransmission request through the transmission medium. When the picture receiving unit or the picture sending unit transfers a control signal through the use of the simultaneous transfer means, only the picture receiving unit or the picture sending unit which fails to receive it issues a retransmission request within a given period of time whereas the picture receiving unit or the picture sending unit which succeeds in reception does not send anything within a given period of time. With this operation, it is possible to prevent the retransmission requests from jamming, with the result that the the transmission is possible without greatly impairing the efficiency of the transmission medium.

Furthermore, each of a picture receiving unit and a picture sending unit is provided with execution command sequence storage means for storing execution command sequences including one or more execution commands such as the number of the automatic execution step, the time interval determined at every step and the picture delivery start or the picture reception start to be implemented at the step, stored command execution means for implementing the execution command corresponding to a designated step, execution command sequence reception means for receiving all or a portion of the aforesaid execution command sequence from the external to make the execution command sequence storage means store it, time measuring means for measuring time to give time information to automatic stored command execution requesting means at a given time interval, the automatic stored command execution requesting means for making a request to the stored command execution means to conduct the command operation stored in the execution command sequence storage means, and on-execution command number storage means for storing step identification information on the automatic execution command which is currently on execution. The picture receiving unit or the picture sending unit stores the execution command sequence and the identification information on the command which is on execution and the time measuring means measures time, and hence it is possible to independently and automatically perform the operation such as the picture switching, with the result that the processing with a high performance is possible owing to the parallel execution of processes or the reduction of the transmission time.

Furthermore, each of a picture receiving unit and a picture sending unit is composed of execution command sequence storage means, stored command execution means, execution command sequence reception means, time measuring means, automatic stored command execution requesting means, on-execution command number storage means, and execution control method selection means for selecting one of receiving a control request for the automatic execution operation of an execution command from the external and automatically advance the execution in accordance with the time information from the time measuring means. In the situation of automatically executing a execution command sequence, by the switching between the time information from the time measuring means and the operation instructions from the external, the automatic execution operation is controllable from the external.

Furthermore, each of a picture receiving unit and a picture sending unit is provided with execution command sequence storage means, stored command execution means, automatic stored command execution requesting means, on-execution command number storage means, and automatic execution status notification means for notifying the information on the execution command to a different picture receiving unit, a different picture sending unit and a different control signal transmission unit when the stored command execution means conducts the command execution operation. In the situation of automatically executing an execution command sequence, the command information is given to the external each time the command is executed, with the result that it is possible to grasp the execution status.

Still further, each of a picture receiving unit and a picture sending unit is equipped with execution command sequence storage means, stored command execution means, and execution command sequence reception means, and at least one picture receiving unit or picture sending unit is provided with time measuring means, on-execution command number storage means, simultaneous transfer means, and automatic stored command execution requesting means. In the automatic execution of an execution command in a plurality of picture receiving units or picture sending units, a plurality of automatic execution operations are feasible through the use of the simultaneous transfer means.

Moreover, each of a control signal transmission unit, a picture sending unit and a picture receiving unit is provided with local control signal reception means for receiving a control signal from an external control unit connected thereto, destination information storage means for storing the destination of a control signal to be transmitted, control signal transmission means for transmitting a control signal to the picture sending unit, the picture receiving unit or the control signal transmission unit being the destination stored in the destination information storage means, and destination information setting means for setting the destination to be stored in the destination information storage means in accordance with a request from the external. Each of the picture receiving unit, the picture sending unit and the control signal transmission unit has the destination and the destination is made to be set from the external, and therefore it is possible to easily transfer a control signal emitted from a control unit through the transmission medium.

Moreover, each of a picture sending unit, a picture receiving unit and a control signal transmission unit includes error detection means for detecting an error in the internal processing of the picture sending unit, the picture receiving unit or the control signal transmission unit, error information destination storage means for storing the destination of error information, error information transmission means for transmitting the error information to the picture sending unit, the picture receiving unit or the control signal transmission unit being the destination stored in the error information destination storage means, and error information destination setting means for setting the destination of the error information to be stored in the error information destination storage means in accordance with a request from the external. Each of the picture receiving unit, the picture sending unit and the control signal transmission unit retains the error destination and the destination is designed to be set from the external, and hence, in the error processing the error status is readily graspable.

BRIEF DESCRIPTION OF THE DRAWINGS

The object and features of the present invention will become more readily apparent from the following detailed description of the preferred embodiments taken in conjunction with the accompanying drawings in which:

FIG. 17A is a flow chart showing an example of an algorithm for picture connection processing by reception channel resource delivering and receiving means in the fifth embodiment;

FIG. 17B is a flow chart showing an example of an algorithm for picture connection processing by sending channel resource delivering and receiving means in the fifth embodiment;

FIG. 17C is a flow chart showing an example of an algorithm for picture disconnection processing by the sending channel resource delivering and receiving means in the fifth embodiment;

FIGS. 23A and 23B are illustrations of an example of a time table for control signal data delivering and receiving in the eighth embodiment;

FIG. 30 is a block diagram showing an arrangement of a prior picture transmission system.

DESCRIPTION OF THE PREFERRED EMBODIMENTS

First Embodiment

Figure 1:
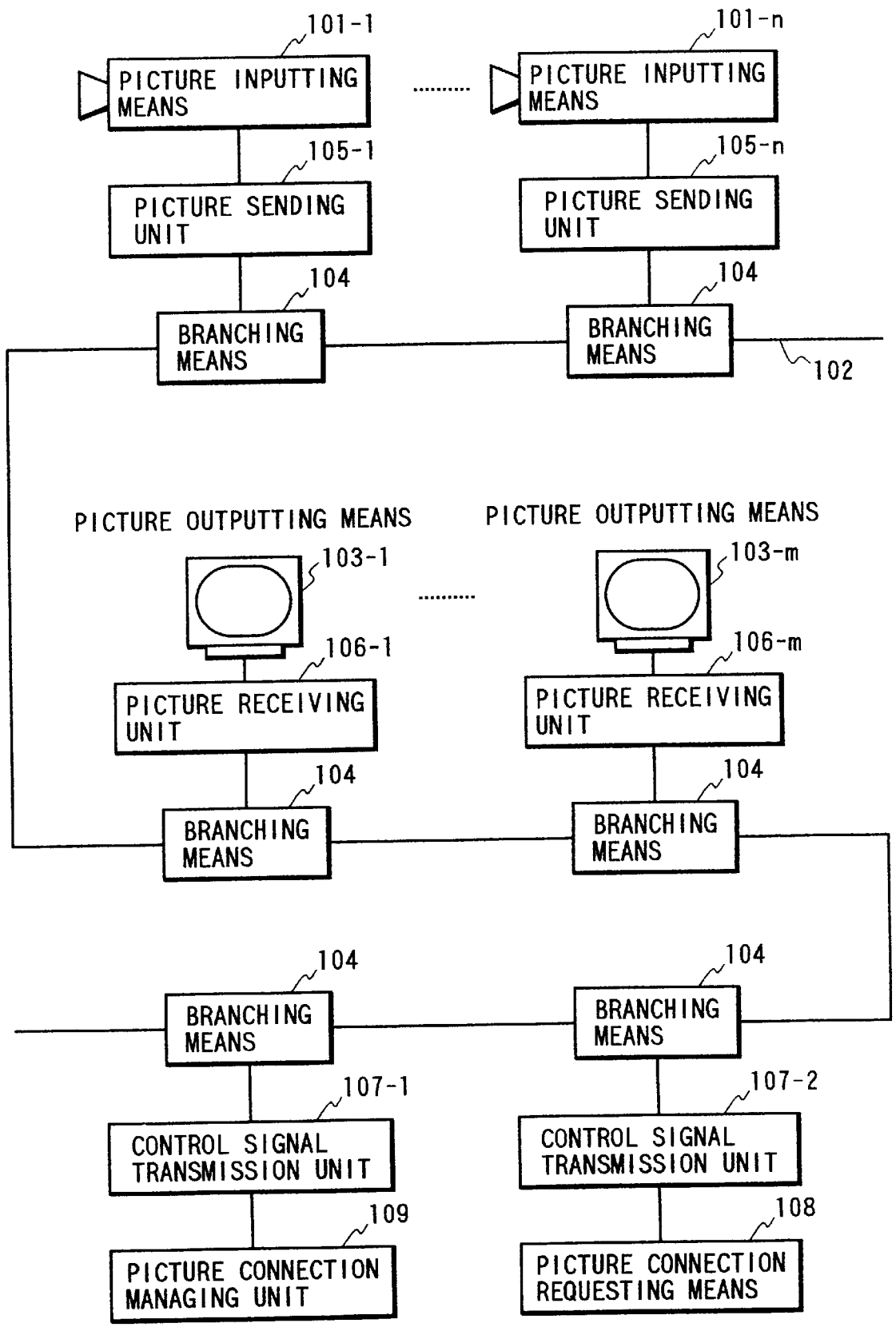
FIG. 1 is a block diagram showing an arrangement of a picture transmission system according to a first embodiment of the present invention.

Referring now to FIGS. 1 to 4, a description will be made hereinbelow of a first embodiment of the present invention. FIG. 1 is a block diagram showing an arrangement of a picture transmission system according to the first embodiment of this invention. A picture transmission system shown in FIG. 1 is made up of picture inputting means 101-1 to 101-n for picking up video information undergoing transmission, a transmission medium 102 for transmitting the inputted video information in a multiplexed condition, picture outputting means 103-1 to 103-m for displaying the transmitted video information, a plurality of branching means 104 for joining and distributing the multiplexed information, picture sending units 105-1 to 105-n for selecting a specified channel of the transmission medium 102 to send the video information from the picture inputting means 101 to the transmission medium 102 using the selected channel and further for performing the input and output of a control signal through the transmission medium 102, picture receiving units 106-1 to 106-m for selecting and receiving the video information of the specified channel of a plurality of channels multiplexed in the transmission medium 102 to output it to the picture outputting means 103 and further for carrying out the input and output of a control signal through the transmission medium 102, control signal transmission units 107-1 to 107-2 for performing the input and output of a control signal through the transmission medium 102, picture connection requesting means 108 for making a request for picture display switching, and a picture connection managing unit 109 for managing a picture connection state and the channel resources of the transmission medium 102 and for accepting a connection request from the picture connection requesting means 108 and for controlling the picture connection state. As an example of the picture inputting means 101, there is a television camera, a video player, a program sending unit or the like, and as an example of the picture outputting means 103 there is a monitor, a television or the like, whereas as an example of the transmission medium 102 there is a CATV coaxial cable for multiplexing information through the use of the frequency multiplex technique or the time division multiplex technique, a digital video/audio network cable, or the like. In this embodiment, a camera is taken as the picture inputting means while a monitor is taken as the picture outputting means.

Figure 2:
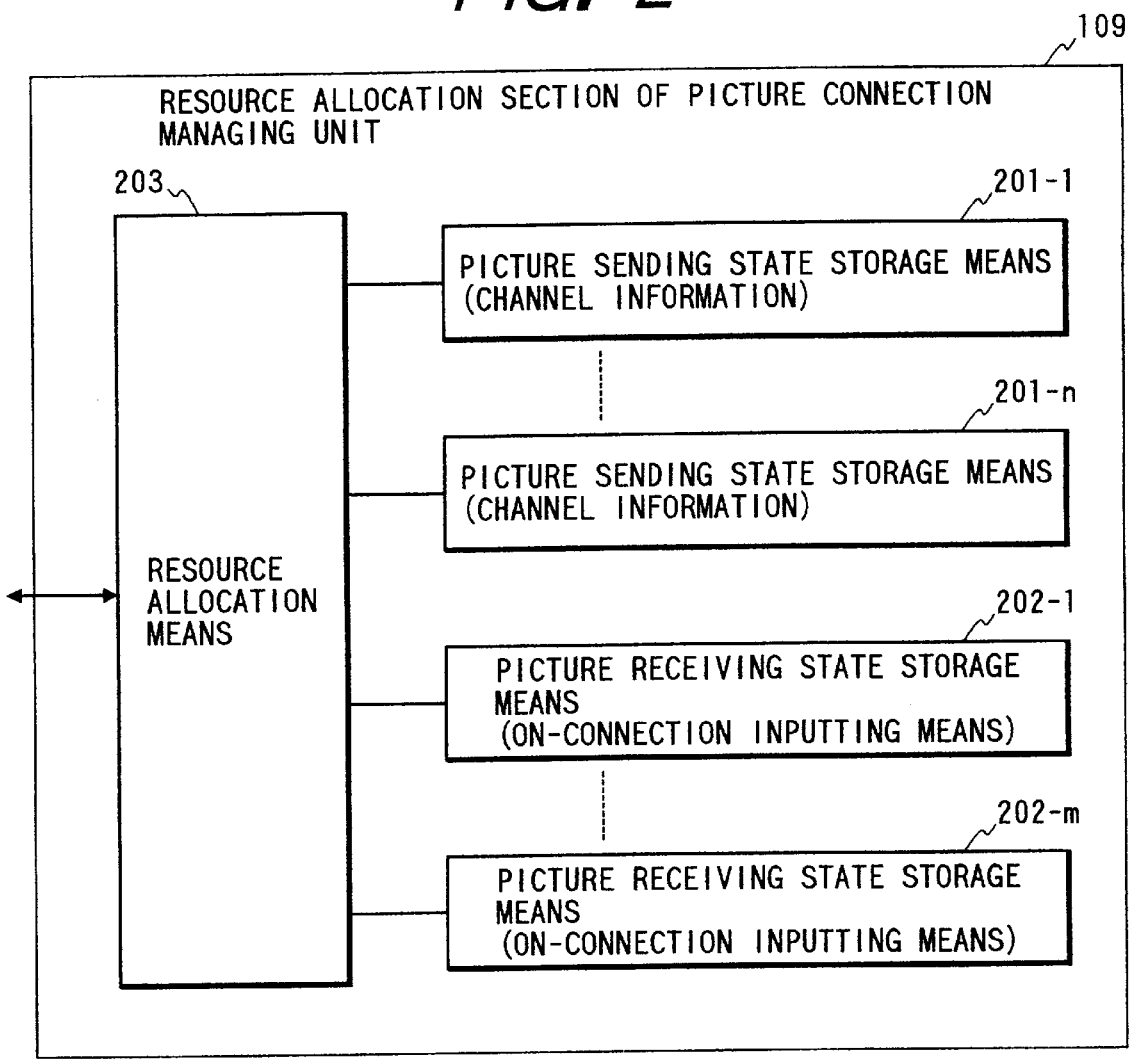
FIG. 2 is a block diagram showing an arrangement of a resource allocation section of a picture connection managing unit in the first embodiment.

FIG. 2 is a block diagram showing an arrangement of a resource allocation section of the picture connection managing unit 109 in this first embodiment. In FIG. 2, the resource allocation section is composed of picture sending state storage means 201-1 to 201-$n$ for storing channel information on the respective picture inputting means 101-1 to 101-$n$ in a well-known stacked structure, picture receiving state storage means 202-1 to 202-$m$ for storing identification information on the picture inputting means 101 from which the picture outputting means 103 are on the reception, and a resource allocation means 203 for allocating channel resources necessary for the picture connections.

Figure 3:
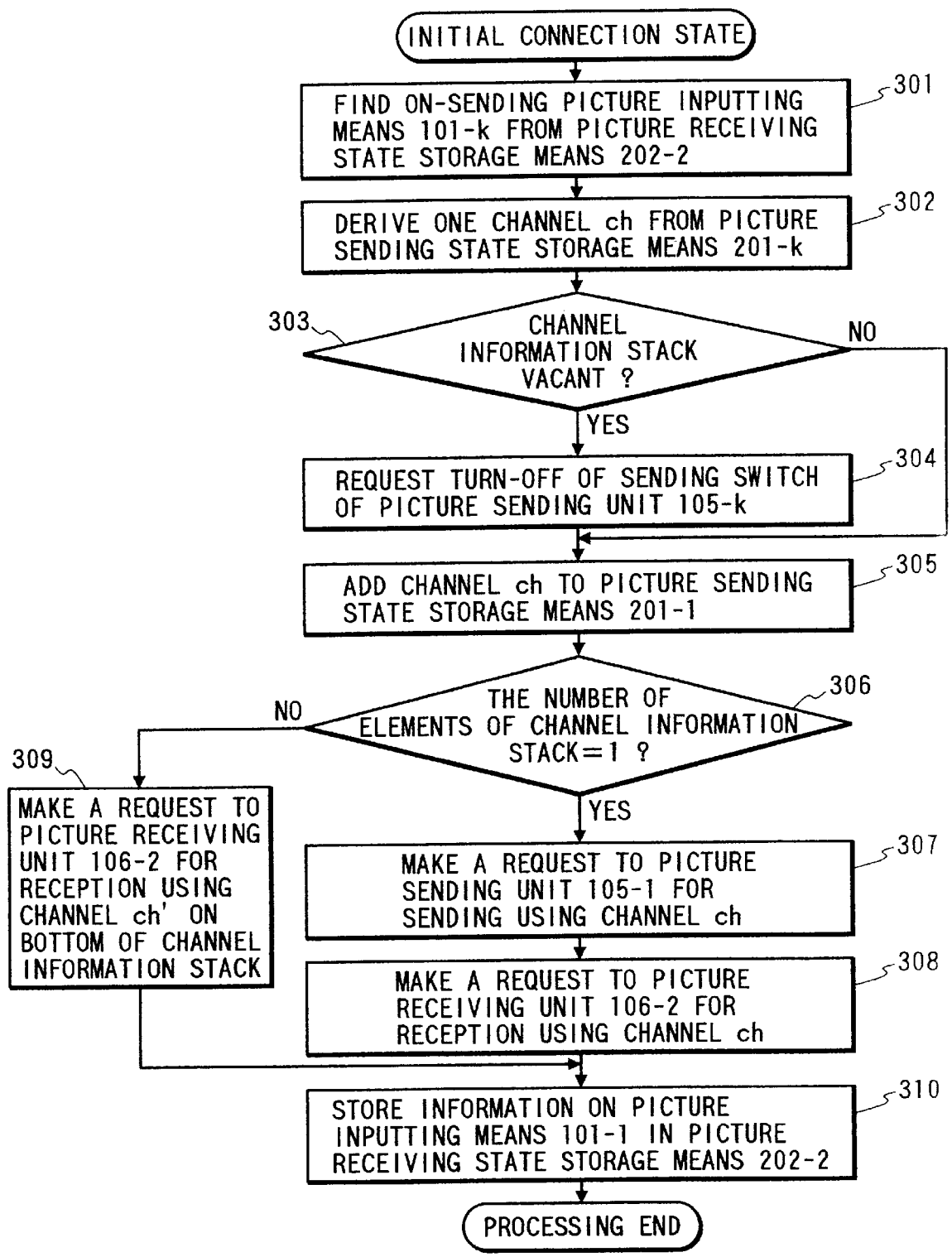
FIG. 3 is a flow chart showing an example of an algorithm for picture connection processing in resource allocation means in the first embodiment.
Figure 4:
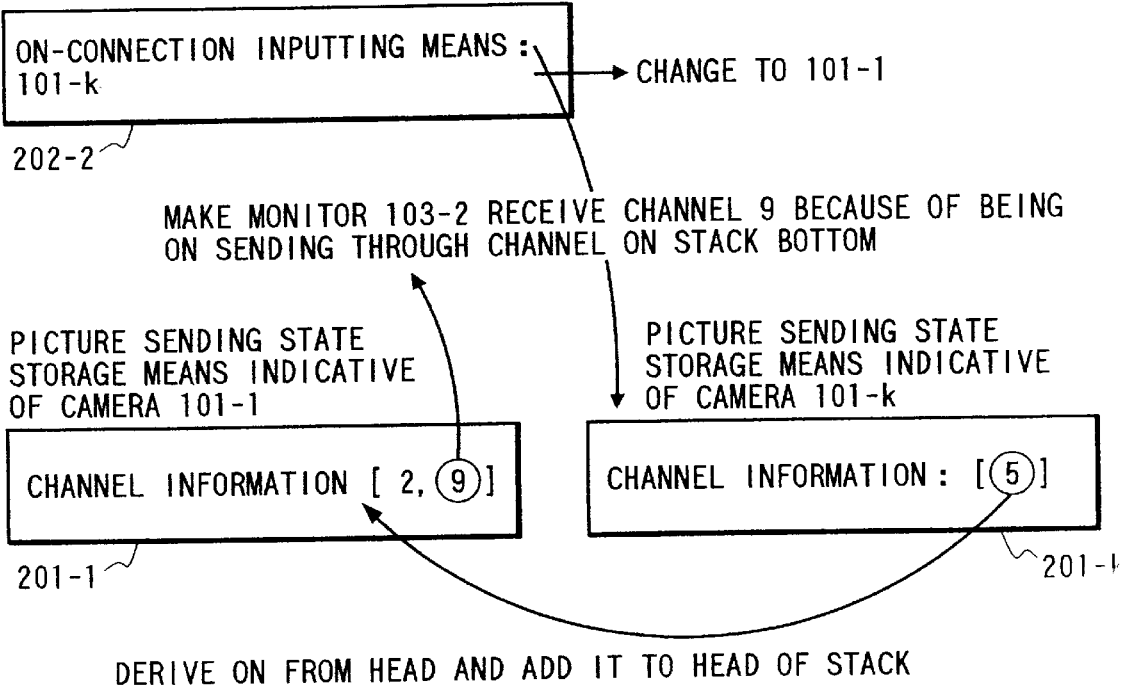
FIG. 4 is an illustration of an example of picture connection processing in the resource allocation section in the first embodiment.

FIG. 3 is a flow chart showing an algorithm for picture connection processing in the resource allocation means 203 in the first embodiment, and FIG. 4 is an illustration of an example of the picture connection processing in the first embodiment.

A description will be taken hereinbelow of an operation of the arrangement as shown in FIGS. 1 to 4. Now, let it be assumed that the picture connection requesting means 108 requests the picture connection to display or project the picture taken from the camera (the picture inputting means) 101-1 on the monitor (picture outputting means) 103-2 whereas the picture taken through the camera (the picture inputting means) 101-$k$ now appears on the monitor 103-2. At this time, the picture connection requesting means 108 gives instructions to the control signal transmission unit 107-2 to transmit a picture connection request, so that the control signal transmission unit 107-2 sends the picture connection request through the branching means 104 and the transmission medium 102 to the control signal transmission unit 107-1 which is in connection relation to the picture connection managing unit 109. When receiving the picture connection request, the resource allocation means 203 of the picture connection managing unit 109 conducts the following operation.

A brief description will be taken here of the information stored in the picture sending state storage means 201 and the picture receiving state storage means 202. Each of the picture receiving state storage means 202 retains identification information indicative of the cameras (picture inputting means) which are in the picture connections to the respective monitors (picture outputting means). Further, each of the picture sending state storage means 201 stores zero or more channel resources, each of the cameras logically retains, in a stacked structure, where the number of channel resources stored is representative of the number of monitors (the picture outputting means) which are in the picture connection. Further, the picture sending unit 105 being in the picture connection to each of the cameras sends the video information to the transmission medium 102 through the use of the channel resources existing on the stack bottom. Since the picture taken through the camera 101-$k$ now appears on the monitor 103-2, the identification information on the camera 101-$k$ is stored in the picture receiving state storage means 202-2 for (corresponding to) the monitor 103-2 (see FIG. 4). Still further, assuming that the picture outputting means currently displaying the picture taken through the camera 101-$k$ is only the monitor 103-2, only one channel resource in the transmission medium 102 the camera 101-$k$ is currently in use for the picture delivery is included in the channel information in the picture sending state storage means 201-$k$ corresponding to the camera 101-$k$, which will be referred to as ch (in FIG. 4, channel 5). Moreover, let it be assumed that the camera 101-1 undergoing the picture connection request to the monitor 103-2 delivers the picture through the channel ch' (channel 9 in FIG. 4) and is in the picture connection to the other two monitors (the picture outputting means). The channel information in the picture sending state storage means 201-1 is (2, 9), and 9 exists on the stack bottom.

In the flow chart of FIG. 3, the operation begins with a step 301 to find, from the picture receiving state storage means 202-2 corresponding to the monitor 103-2, that the picture input means from which the monitor 103-2 is on reception is the camera 101-$k$, then followed by a step 302 to pick out one channel resource ch from the head of the channel information in the picture sending state storage means 201-$k$ corresponding to the camera 101-$k$. In the case shown in FIG. 4, the channel picked out is 5. Subsequently, the operation enters a step 303 to check whether the channel information is vacant or not. Since in this embodiment it is vacant, a step 304 follows to issue a request to the picture sending unit 105-$k$ to turn off a sending switch. If the answer of the step 303 shows no vacancy, this signifies that in addition to the monitor 103-2 there exists a monitor(s) (the picture outputting means) which is in the picture connecting relation to the camera 101-$k$. Accordingly, the picture sending unit 105-$k$ continuously sends the picture through the use of the channel resource on the stack bottom.

Furthermore, at a step 305 the channel resource ch (channel 5 in FIG. 4) derived at the step 302 is stored in the head of the channel information in the picture sending state storage means 201-1 corresponding to the camera 101-1. Secondly, a step 306 is executed to check whether the number of the elements of the channel information in the picture sending state storage means 201-1 is one or not. If one, a step 307 follows to make a request to the picture sending unit 105-1 being in connection to the camera 101-1 to set the sending channel to ch and to turn on the sending switch, then followed by a step 308 to make a request to the picture receiving unit 106-2 for (corresponding to) the monitor 103-2 to accept the channel resource ch (channel 5 in FIG. 4). Since in this embodiment in the step 306 the number of elements of the channel information comes to 2 or more, the other monitor (the picture outputting means) which is in the picture connection to the camera 101-1 already exists, with the result that the picture sending unit 105-1 continues the picture delivery using the channel resource (channel 9 in FIG. 4) on the stack bottom. At this time, a step 309 is implemented to issue a request to the picture receiving unit 106-2 corresponding to the monitor 103-2 to receive the channel resource ch' (channel 9 in FIG. 4) on the stack bottom of the channel information in the picture sending state storage means 201-1. In response to the request, the picture receiving unit 106-2, the picture sending unit 105-1 and the picture sending unit 105-$k$ operate, thus realizing the picture connection whereby the picture taken through the camera 101-1 appears on the monitor 103-2. Finally, at a step 310, the camera 101-1 information is stored in the picture receiving state storage means 202-2 corresponding to the monitor 103-2.

As described above, according to this embodiment, using the channel resources whose number is equal to the number of picture outputting means (monitors), the arbitrary picture connections with the more picture inputting means (cameras) are possible. That is, the number of picture inputting means to be installed is allowed to exceed the number of channel resources in the transmission medium.

Second Embodiment

Figure 5:
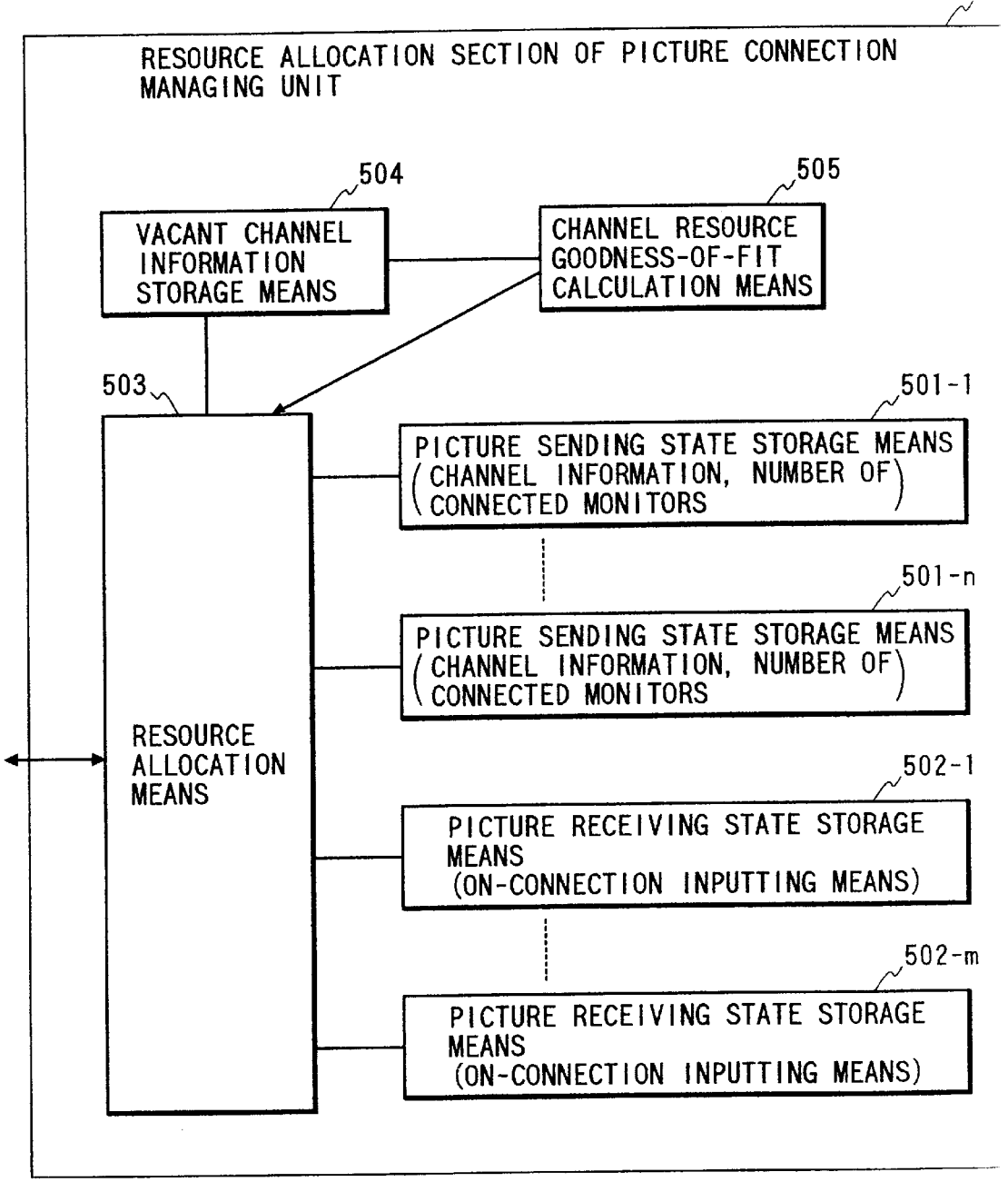
FIG. 5 is a block diagram showing an arrangement of a resource allocation section of a picture connection managing unit in a second embodiment of this invention.
Figure 6:
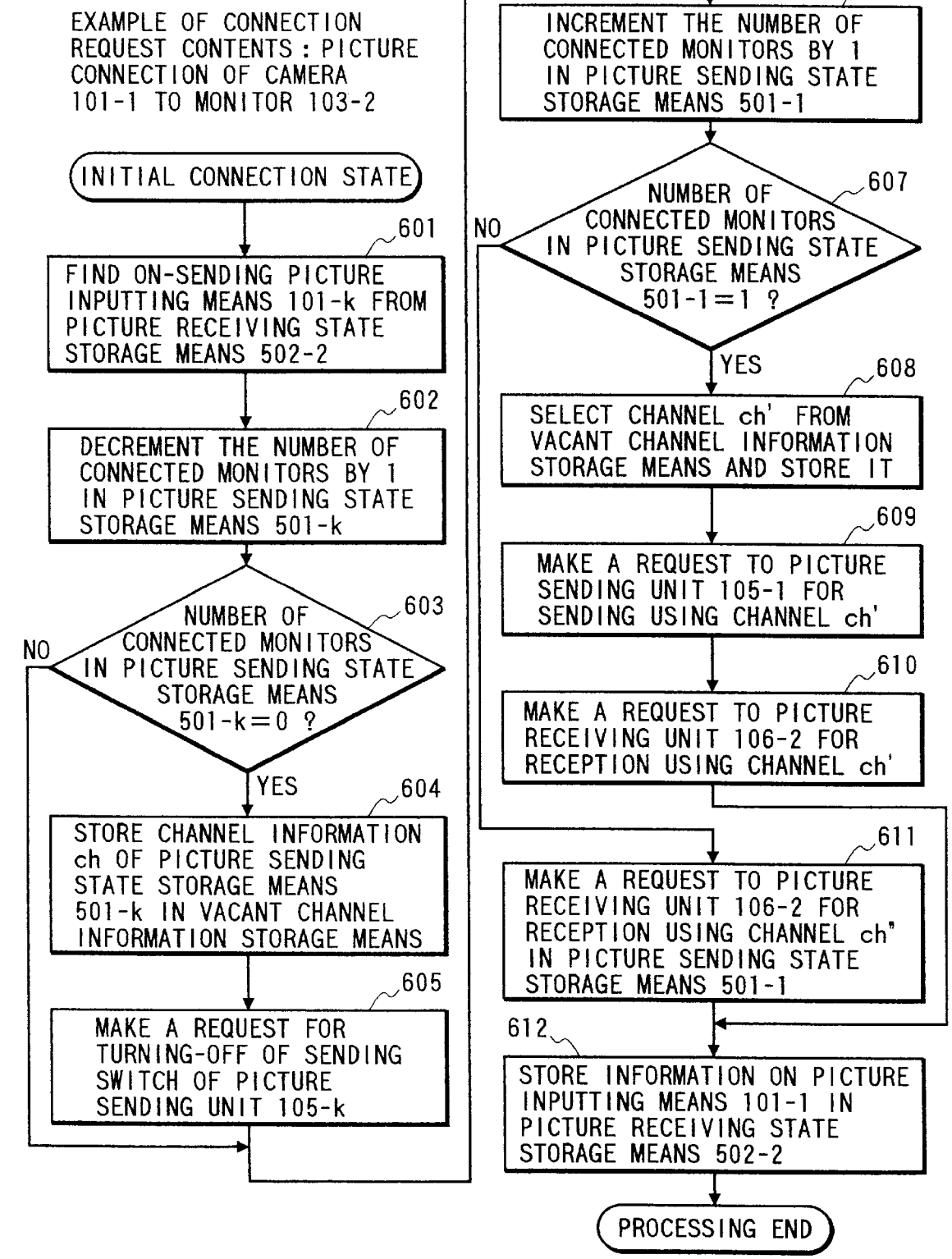
FIG. 6 is a flow chart showing an example of an algorithm for picture connection processing in resource allocation means in the second embodiment.
Figure 7:
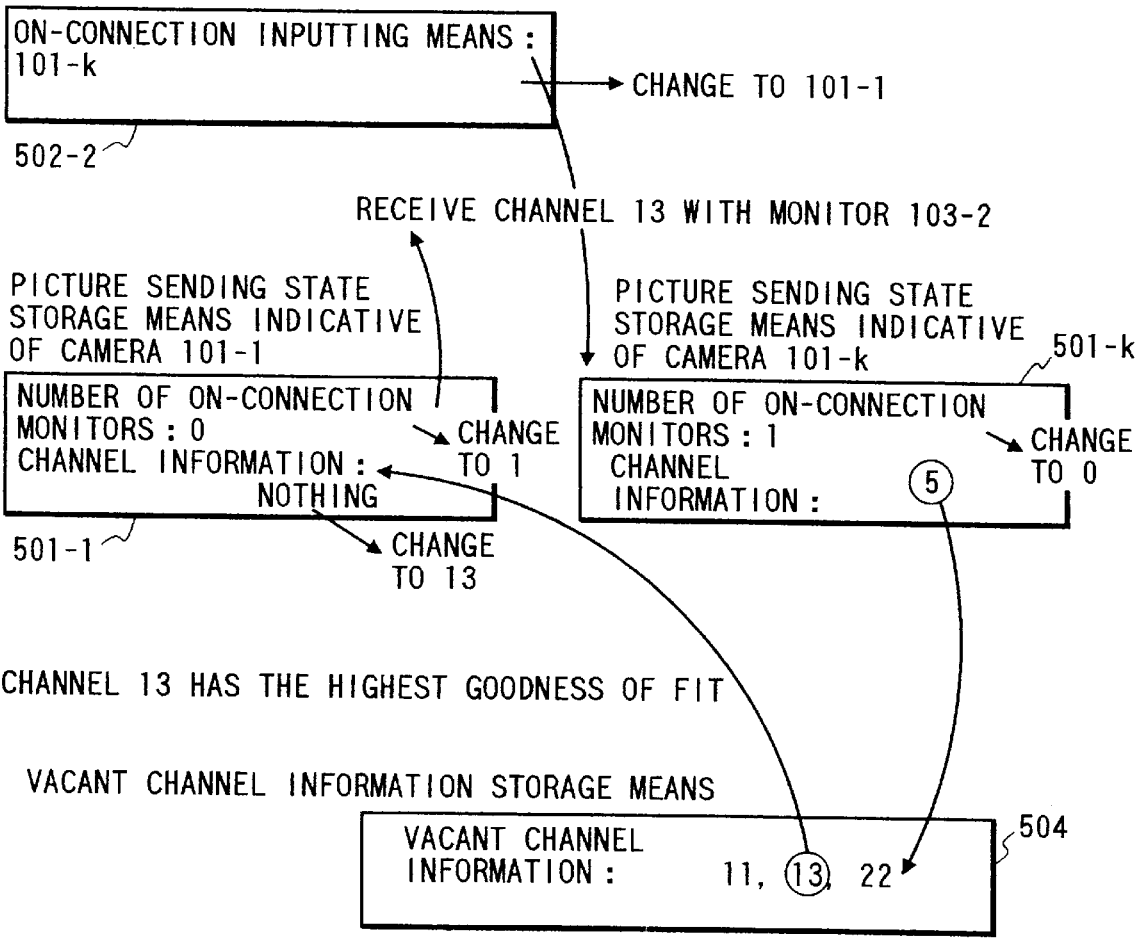
FIG. 7 is an illustration of an example of picture connection processing in the resource allocation section in the second embodiment.

A second embodiment of this invention will be described hereinbelow with reference to FIGS. 1 and 5 to 7. Although FIG. 1 shows the arrangement of the picture transmission system according to the first embodiment of this invention, the arrangement of this second embodiment is the same as that in FIG. 1 and the components are the same as those in the first embodiment. FIG. 5 is a block diagram showing an arrangement of a resource allocation section of a picture connection managing unit 109 in the second embodiment of this invention. The FIG. 5 resource allocation section comprises picture sending state storage means 501-1 to 501-$n$ for storing the channel information on the respective picture inputting means and the number of picture outputting means which are on connection, picture receiving state storage means 502-1 to 502-$m$ for storing the identification information on the picture inputting means from which the picture outputting means are on reception, resource allocation means 503 for assigning channel resources necessary for the picture connections, vacant channel information storage means 504 for storing the channel resources which are in no use, and channel resource goodness-of-fit calculation means 505 for calculating the goodness of fit between the picture inputting means and the channel resource. FIG. 6 is a flow chart showing an algorithm for the picture connection processing in the resource allocation means 503 in the second embodiment of this invention, and FIG. 7 is an illustration of an example of the picture connection processing in the resource allocation means 503 of the picture connection managing unit 109 in the second embodiment.

A description will be taken hereinbelow of an operation of the arrangement as shown in FIGS. 1 and 5 to 7. Now, let it be assumed that the picture connection requesting means 108 issues a picture connection request to the monitor (the picture outputting means) 103-2 to display the picture taken through the camera (the picture inputting means) 101-1, whereas the monitor 103-2 is currently displaying the picture taken through the camera (picture inputting means) 101-$k$. At this time, the picture connection requesting means 108 gives instructions to the control signal transmission unit 107-2 to transmit a picture connection request, and the control signal transmission means 107-2 sends the picture connection request through the branching means 104 and the transmission medium 102 to the control signal transmission unit 107-1 being in connection to the picture connection managing unit 109. When receiving the picture connection request, the resource allocation means 503 of the picture connection managing unit 109 conducts the following operation.

A brief description will be made here of the information stored in the picture sending state storage means 501 and the picture receiving state storage means 502. Each of the picture receiving state storage means 502 stores the identification information representative of the cameras (the picture inputting means) which are in the picture connections with the respective monitors (the picture outputting means). Further, each of the picture sending state storage means 501 stores the channel information having the channel resources the picture sending units 105 being in connection to the cameras use for the picture delivery and the number of monitors being in the picture connections. Since the picture taken through the camera 101-$k$ currently appears on the monitor 103-2, the identification information on the camera 101-$k$ is stored in the picture receiving state storage means 502-2 corresponding to the monitor 103-2 (see FIG. 7). Still further, assuming that the picture outputting means currently displaying the picture of the camera 101-$k$ is only the monitor 103-2, the picture sending state storage means 501-$k$ corresponding to the camera 101-$k$ stores the channel resource (which is referred to as ch, and channel 5 in FIG. 7) of the transmission medium the camera 101-$k$ is currently in use as the channel information for the picture delivery and the number 1 being the number of connected monitors (FIG. 7). Moreover, let it be assumed that the sending switch of the camera 101-1 undergoing the request for the picture connection with the monitor 103-2 is in the OFF state and the camera 101-1 does not establish the picture connection to any monitor. The channel information in the picture sending state storage means 501-1 is empty and the number of connected monitors is zero (FIG. 7). The vacant channel information storage means 504 stores all the channel resources which are not put to use for the picture connection.

In FIG. 6, the operation begins with a step 601 to find, from the picture receiving state storage means 502-2 corresponding to the monitor 103-2, that the picture inputting means giving the picture to the monitor 103-2 is the camera 101-$k$, then followed by a step 602 to decrement the number of connected monitors stored in the picture sending state storage means 501-$k$ corresponding to the camera 101-$k$ by 1, thus coming to 0. Secondly, a step 603 is implemented to check whether the number of monitors being in connection comes to 0. In this case, since it reaches 0, a step 604 follows to take out the channel information ch (channel 5 in FIG. 7) in the picture sending state storage means 501-$k$ to put it in the vacant channel information storage means 504. Further, a step 605 is conducted to issue a request to the picture sending unit 105-$k$, which is in connection with the camera 101-$k$, to turn off its sending switch. If the decision of the step 603 shows that the number of monitors being in connection does not reach 0, this means that besides the monitor 103-2 there is a monitor(s) which is in picture connection with the camera 101-$k$, and the picture sending unit 105-$k$ continues the picture delivery through the use of the channel resources (channel 5 in FIG. 7) put in the picture sending state storage means 501-$k$.

Furthermore, a step 606 is implemented to increment the number of connected monitors stored in the picture sending state storage means 501-1 corresponding to the camera 101-1 by 1, then followed by a step 607 to check whether or not the number of connected monitors in the picture sending state storage means 501-1 is 1. In this case, it comes to 1, at a step 608 the channel resource goodness-of-fit calculation means 505 calculates a channel resource with the highest goodness of it for when the camera 101-1 delivers the picture to select the channel resource from the vacant channel information storage means 504 (which is taken as ch', and the channel 13 in FIG. 7) and put it in the channel information of the picture sending state storage means 501-1 to store ch' (the channel 13 in FIG. 7) in the picture sending state storage means 501-1.

Further, a step 609 is conducted to make a request to the picture sending unit 105-1 being in connection with the camera 101-1 to turn on its sending switch through the use of the channel resource ch', then followed by a step 610 to make a request to the picture receiving unit 106-2 being in connection with the monitor 103-2 to accept the channel resource ch'. When at the step 607 the number of connected monitors comes to 2 or more, this signifies that there is the other monitor which is in the picture connection with the camera 101-1, and therefore the picture sending unit 105-1 continues to send the picture through the use of the channel resource (for example, ch") put in the picture sending state storage means 501-1. At this time, at a step 611 a request to the picture receiving unit 106-2 being in connection with the monitor 103-2 is issued to receive the channel resource ch". Finally, at a step 612, the camera 101-1 information is put in the picture receiving state storage means corresponding to the monitor 103-2. In response to the request, the picture receiving unit 106-2, the picture sending unit 501-1 and the picture sending unit 105-$k$ operate, thus realizing the picture connection to display the picture from the camera 101-1 on the monitor 103-2.

As described above, according to this embodiment, through the use of the picture outputting means (monitors) and the channel resources corresponding to the necessary vacant channels, the arbitrary picture connections with the more picture inputting means (cameras) become possible. That is, the number of picture inputting means (cameras) to be installed is allowed to exceed the number of channel resources in the transmission medium. In addition, with the calculation of the goodness of fit between each of the channels and each of the picture inputting means, the channel allocation is achievable taking into consideration the restriction and preference of the channel resources to be used in the picture switching.

Third Embodiment

Figure 8:
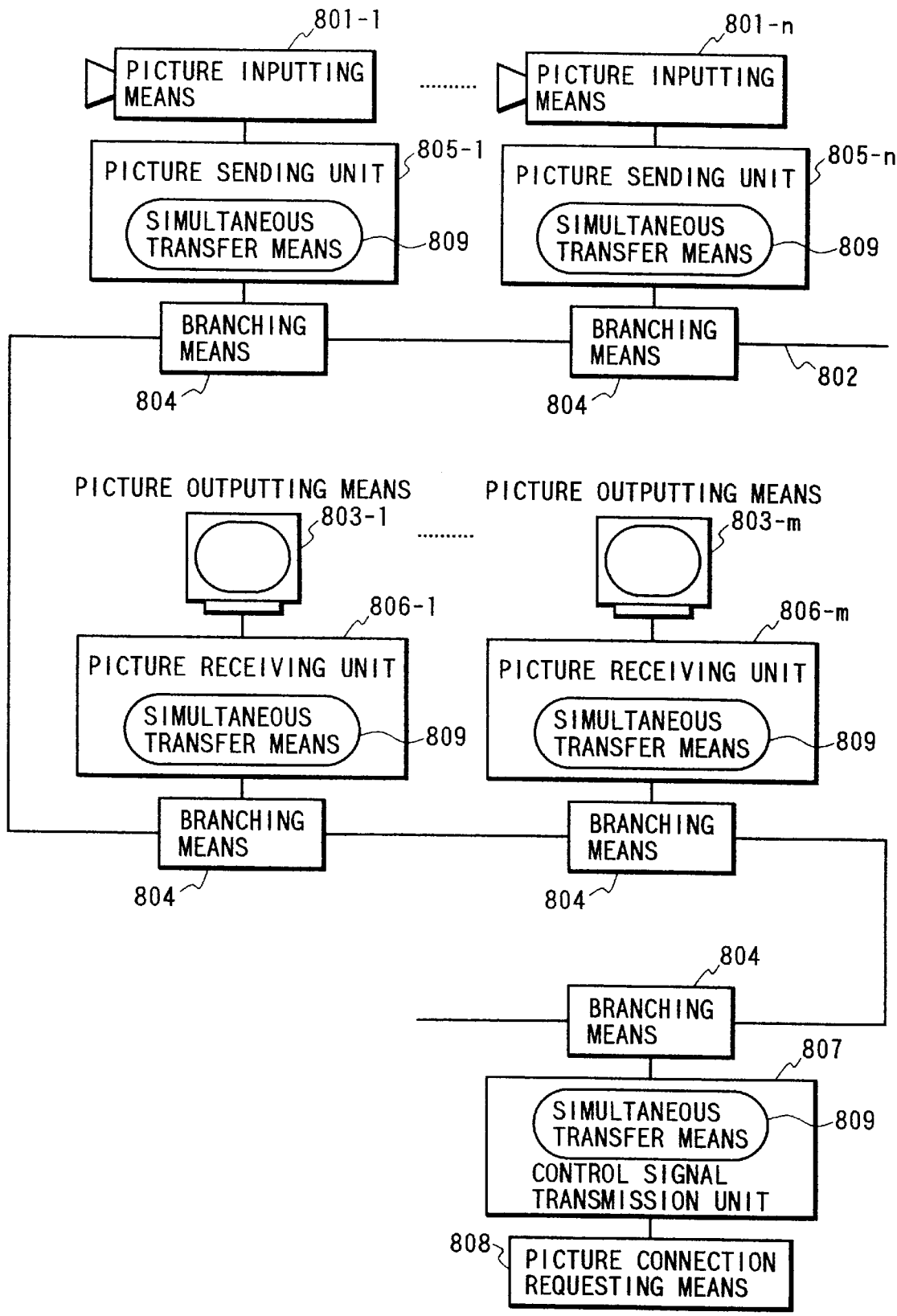
FIG. 8 is a block diagram showing an arrangement of a picture transmission system according to a third embodiment of this invention.

Referring to FIGS. 8 to 11, a description will be made hereinbelow of a third embodiment of the present invention. FIG. 8 is a block diagram showing an arrangement of a picture transmission system according to the third embodiment of this invention. The picture transmission system shown in FIG. 8 is composed of picture inputting means 801-1 to 801-$n$ for taking the video information for the transmission, a transmission medium 802 for multiplexing and transmitting the inputted video information, picture outputting means 803-1 to 803-$m$ for displaying the transmitted video information, a plurality of branching means 804 for joining and distributing the multiplexed information, picture sending units 805-1 to 805-$n$ for selecting a specified channel of the transmission medium 802 to output the video information taken through the picture inputting means 801 to the transmission medium 802 through the use of the selected channel, and for managing the picture connection state and the channel resources of the transmission medium 802 to control the picture connection state and further for performing the input and output of a control signal through the transmission medium 802, picture receiving units 806-1 to 806-$m$ for selecting and receiving the video information of a specified channel of a plurality of channels multiplexed in the transmission medium 802 to output it to the picture outputting means 803, and for managing the picture connection state and the channel resources of the transmission medium 802 to control the picture connection state, and further for carrying out the input and output of a control signal through the transmission medium 802, a control signal transmission unit 807 for performing the input and output of a control signal through the transmission medium 802, picture connection requesting means 808 for making a request for the picture switching, and simultaneous transfer means 809 for simultaneously transferring the same control signal to a plurality of picture sending units 805, a plurality of picture receiving units 806 or the control signal transmission unit 807. As well as in the first embodiment, for example, the picture inputting means 801 is a TV camera, a video player or a program sending unit, and the picture outputting means 803 is a monitor or a television, while the transmission medium 802 is a CATV coaxial cable for multiplexing information through the use of the frequency multiplex technique or the time division multiplex technique or a digital video/audio network cable. In this embodiment, cameras are taken as the picture inputting means, while monitors are taken as the picture outputting means.

Figure 9:
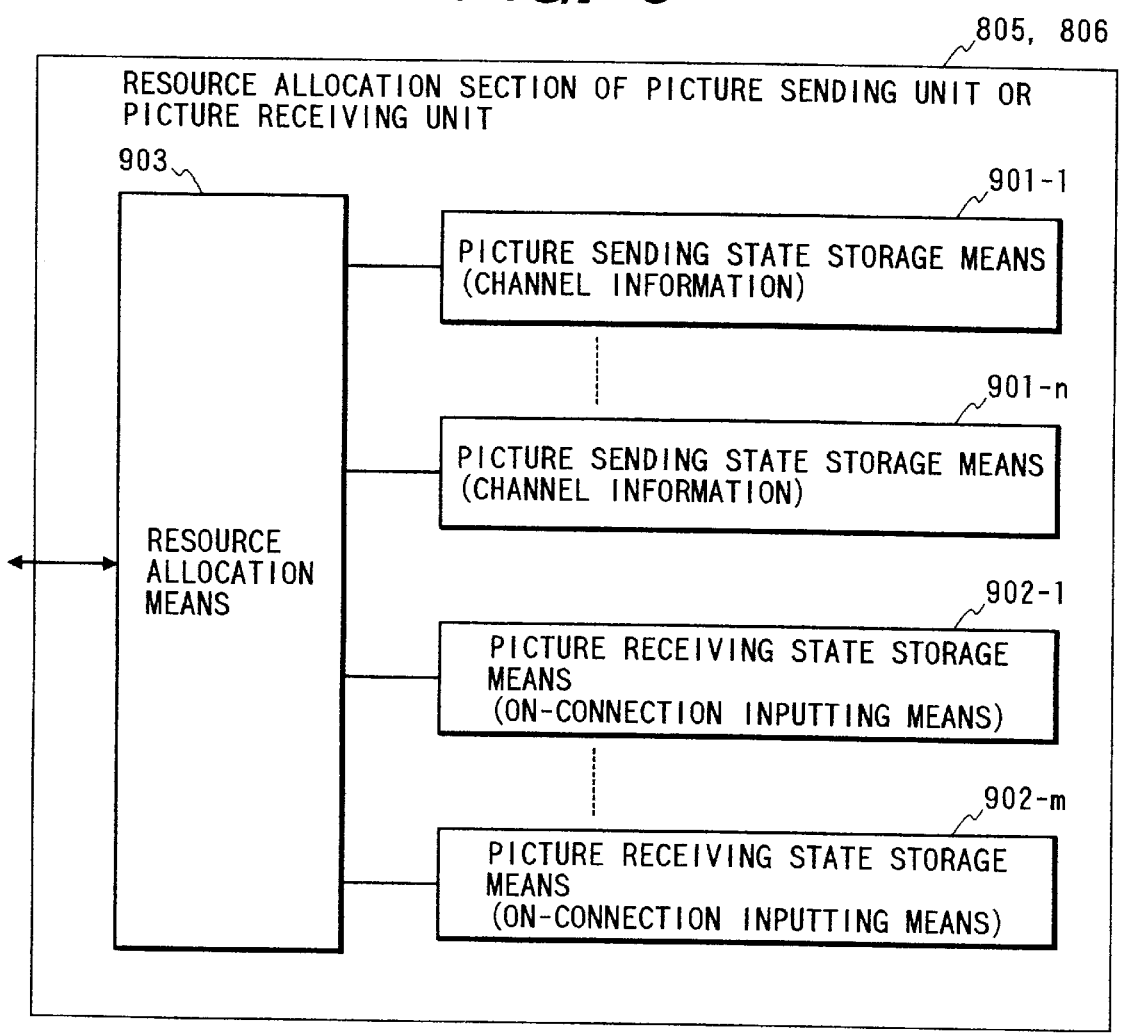
FIG. 9 is a block diagram showing an arrangement of a resource allocation section of a picture sending unit and a picture receiving unit in the third embodiment.
Figure 10:
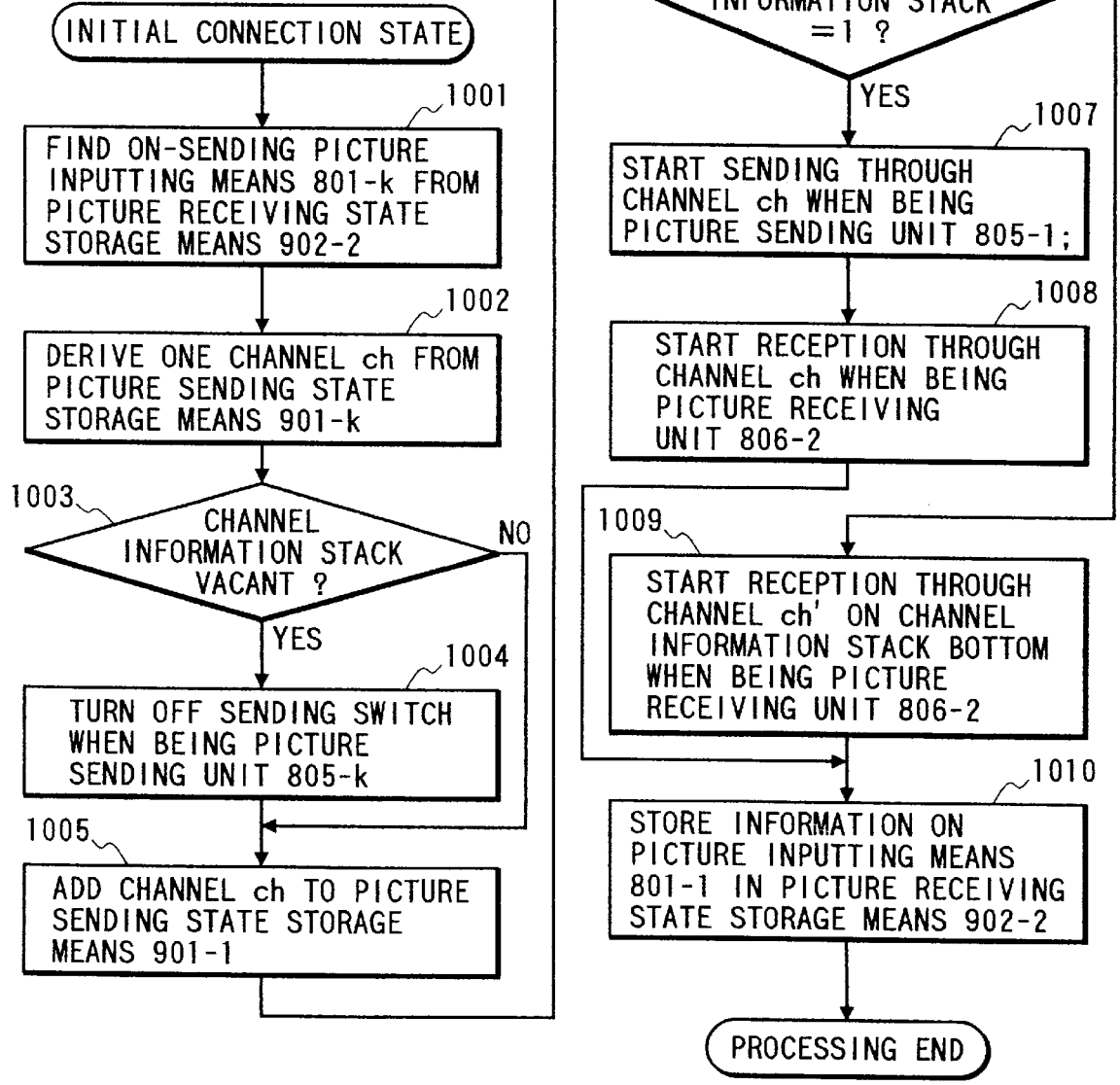
FIG. 10 is a flow chart showing an example of an algorithm for picture connection processing by resource allocation means in the third embodiment.
Figure 11:
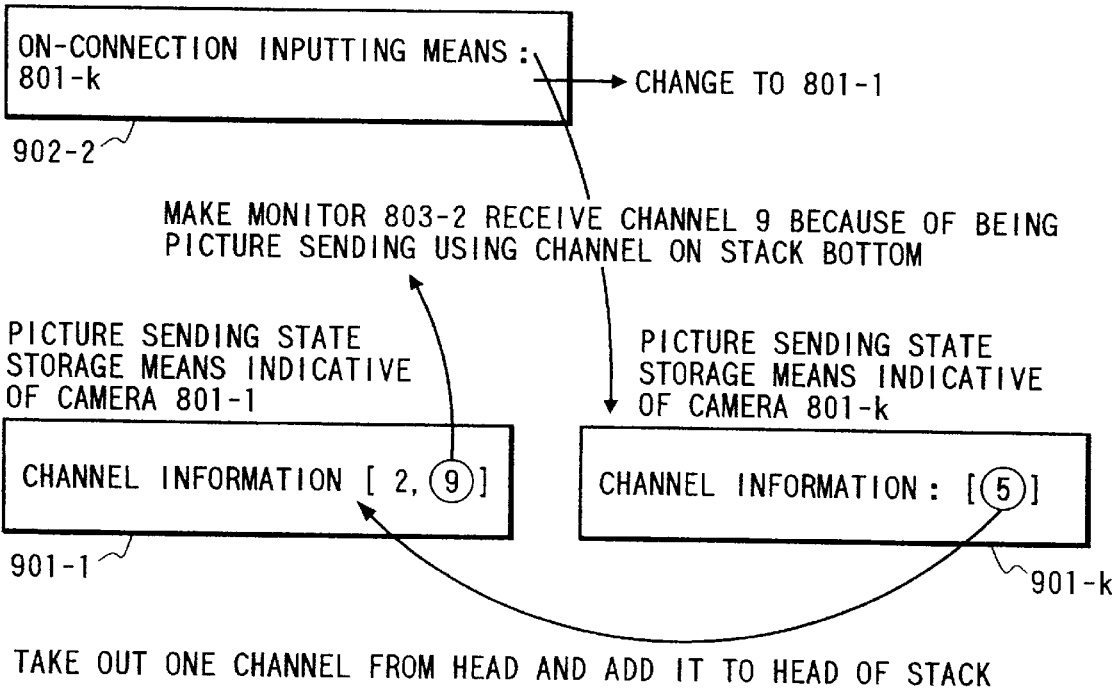
FIG. 11 is an illustration of an example of picture connection processing by the resource allocation section in the third embodiment.

FIG. 9 is a block diagram showing an arrangement of a resource allocation section of a picture sending unit 805 and a picture receiving unit 806. The resource allocation section, as shown in FIG. 9, comprises picture sending state storage means 901-1 to 901-$n$ for storing the channel information on the respective picture inputting means as a well-known stack structure, picture receiving state storage means 902-1 to 902-$m$ for storing the identification information on the picture inputting means from which -the picture outputting means are on reception, and resource allocation means 903 for allocating the channel resources necessary for the picture connection. FIG. 10 is a flow chart showing an algorithm for the picture connection processing in the resource allocation means 903 in the third embodiment, and FIG. 11 is an illustration of an example of the picture connection processing in the resource allocation section of the picture sending unit and the picture receiving unit in the third embodiment, which conducts the same operation as that of the resource allocation means 203 of the picture connection managing unit 109 in the first embodiment shown in FIG. 4, except that all the picture sending units 805 and all the picture receiving units 806 conduct this same operation.

A description will be made hereinbelow of an operation of the arrangement as shown in FIGS. 8 to 11. Now, let it be assumed that the picture connection requesting means 808 issues a request for the picture connection to display the picture taken through the camera (the picture inputting means) 801-1 on the monitor (the picture outputting means) 803-2. Further, let it be assumed that at this time the picture taken through the camera 801-$k$ is currently in display on the monitor 803-2. The picture connection requesting means 808 gives instructions to the control signal transmission unit 807 to transmit a picture connection request to the control signal transmission unit 807, and through the use of the simultaneous transfer means 809 the control signal transmission unit 807 sends the picture connection request through the branching means 804 and the transmission medium 802 to all the picture sending units 805 and all the picture receiving units 806. In response to the reception of the picture connection request, the resource allocation means 903 of all the picture sending units 805 and all the picture receiving units 806 conducts the following operation. In this instance, the information stored in the picture sending state storage means 901 and the picture receiving state storage means 902 is the same as that in the first embodiment. The difference from the first embodiment is that all the picture sending units 805 and all the picture receiving units 806 retain this information.

In the flow chart of FIG. 10, at a step 1001 the fact that the picture inputting means from which the monitor 803-2 is in reception is the camera 801-$k$ is found from the picture receiving state storage means 902-2 corresponding to the monitor 803, and at a step 1002 one channel resource ch is picked out from the channel information in the picture sending state storage means 901-$k$ corresponding to the camera 801-$k$. In the case shown in FIG. 11, the channel taken out is the channel 5. Secondly, a step 1003 is conducted to whether the channel information gets empty or not. In this case, it becomes vacant, and therefore, at a step 1004, only if the picture sending unit is the picture sending unit 805-*k* which is in connection with the camera 801-*k*, it turns off its picture sending switch. At this time, the other picture sending units 805 and picture receiving units 806 do nothing. On the other hand, if the answer of the step 1003 is that the channel information is not empty, this signifies that in addition to the monitor 803-2 there is a monitor (the picture outputting means) which is in the picture connection with the camera 801-*k*, with the result that the picture sending unit 805-*k* continues to send the picture through the use of the channel resource on the stack bottom.

Furthermore, at a step 1005 the channel resource ch (channel 5 in FIG. 11) picked out at the step 1002 is stored in the head of the channel information in the picture sending state storage means 901-1 corresponding to the camera 801-1. Subsequently, a step 1006 is executed to check whether the number of elements of the channel information in the picture sending state storage means 901-1 is 1. If one, only in the case of being the picture sending unit 805-1 which is in connection to the camera 801-1, its own sending switch is turned on. At this time, the other picture sending units 805 and picture receiving units 806 do nothing. Further, only in the case of being the picture receiving unit 806-2 which is in connection to the monitor 803-2, it starts to receive the channel resource ch. The other picture sending units 805 and picture receiving units 806 do nothing. In this embodiment at the step 1006 the number of elements of the channel information comes to 2 or more, which means that there is a further monitor(s) (the picture outputting means) which is in connection with the camera 801-1, and hence the picture sending unit 805-1 continues to send the picture through the use of the channel resource (channel 9 in FIG. 11) on the stack bottom. At this time, only in the case of being the picture receiving unit 806-2 which is in connection to the monitor 803-2, it starts the reception of the channel information in the picture sending state storage means 901-1 through the channel resource ch' (channel 9 in FIG. 11) on the stack bottom, whereas the other picture sending units 805 and receiving units 806 do nothing. With all the picture sending units 805 and all the picture receiving units 806 performing the above-mentioned operation, the picture connection for the display of the picture of the camera 801-1 on the monitor 803-2 is realizable. Finally, at a step 1010 the camera 801-1 information is put in the picture receiving state storage means 902-2 corresponding to the monitor 803-2.

As described above, according to this embodiment, with the channel resources whose number equals the number of picture outputting means (monitors), the arbitrary picture connections with the more picture inputting means (cameras) become possible. In other words, the number of picture inputting means to be installed is allowed to increase to exceed the number of channel resources of the transmission medium. In addition, since a special managing unit is unnecessary for the channel resource allocation, the backup for the managing unit serving as the countermeasures for possible troubles are also unnecessary.

Fourth Embodiment

Figure 12:
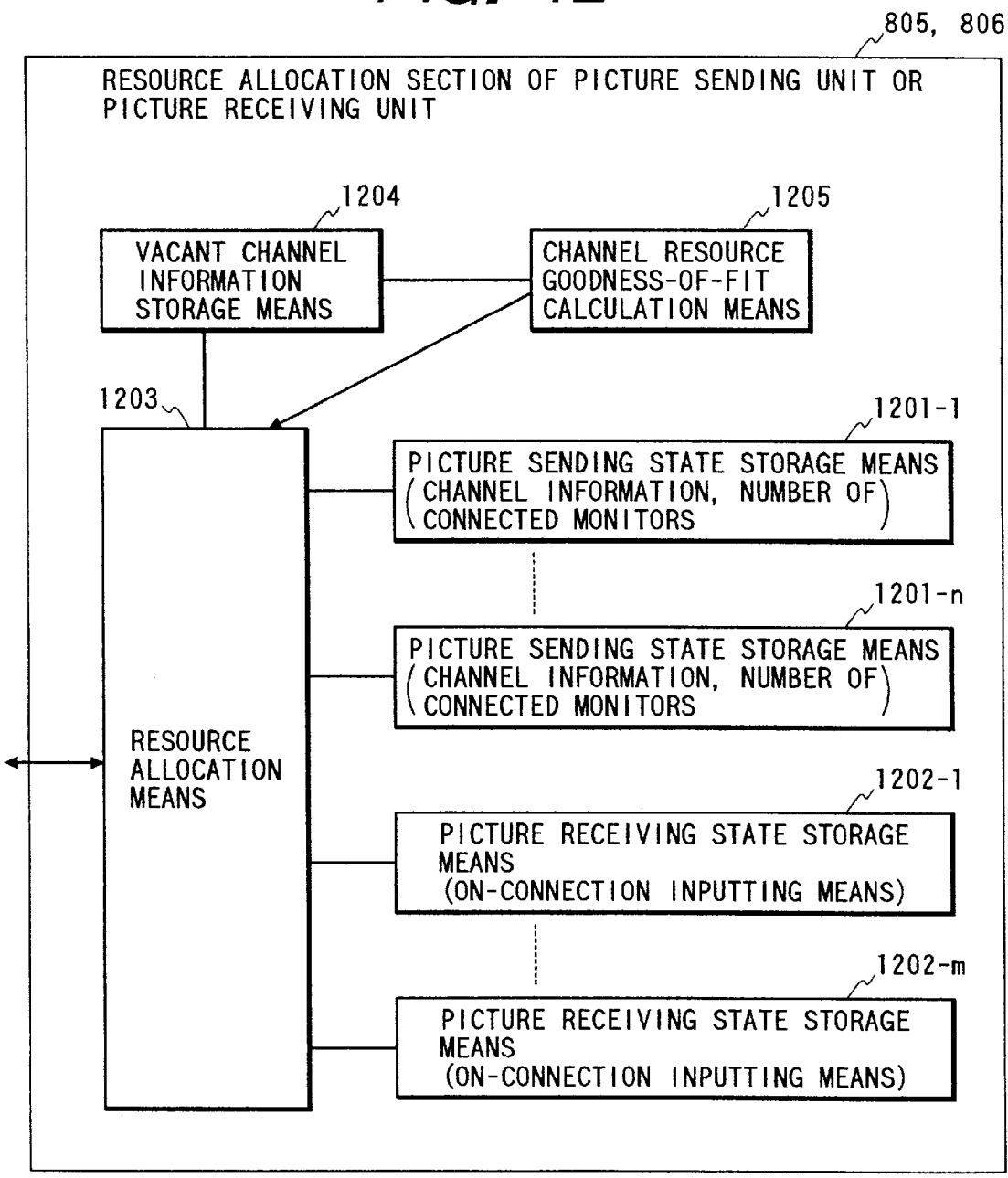
FIG. 12 is a block diagram showing an arrangement of a resource allocation section of a picture sending unit and a picture receiving unit in a fourth embodiment of this invention.

Referring to FIGS. 8 and 12 to 14, a description will be made hereinbelow of a fourth embodiment of this invention. Although FIG. 8 shows the arrangement of the picture transmission system according to the third embodiment of this invention, this fourth embodiment has the same arrangement as that of the third embodiment and the components are also the same as those in the third embodiment. FIG. 12 is a block diagram showing an arrangement of a resource allocation section of each of the picture sending units 805 and the picture receiving units 806 in the fourth embodiment of this invention. The resource allocation section is, as shown in FIG. 12, made up of picture sending state storage means 1201-1 to 1201-*n* for storing the channel information on the respective inputting means and the number of picture outputting means which are in connection, picture receiving state storage means 1202-1 to 1202-*m* for storing the identification information on the picture inputting means from which the picture outputting means are on reception, resource allocation means 1203 for allocating the channel resources necessary for the picture connections, vacant channel information storage means 1204 for storing the channel resources which are in no use, and channel resource goodness-of-fit calculation means 1205 for calculating the goodness of fit between the picture inputting means and the channel resources.

Figure 13:
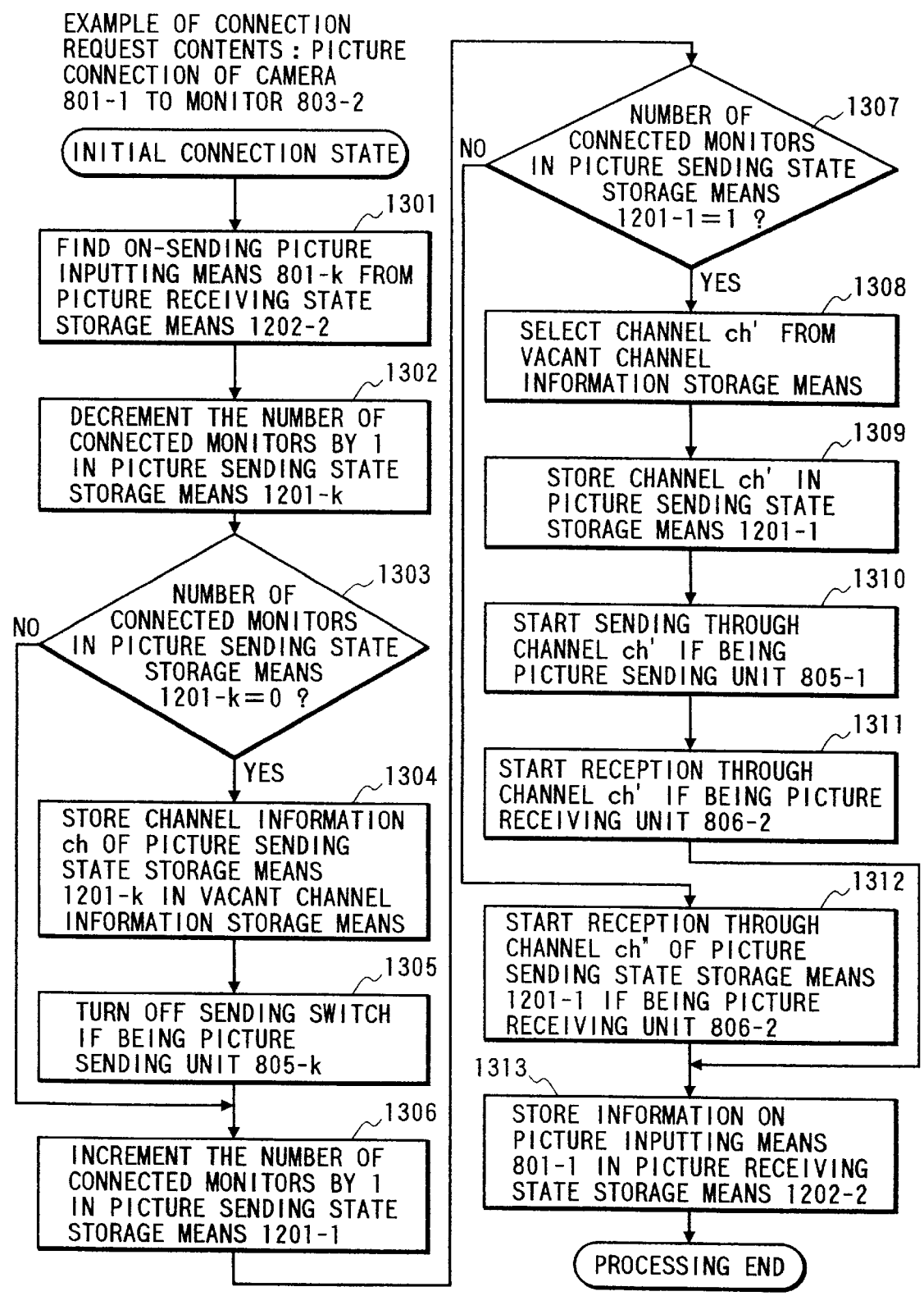
FIG. 13 is a flow chart showing an example of an algorithm for picture connection processing in resource allocation means in the fourth embodiment.
Figure 14:
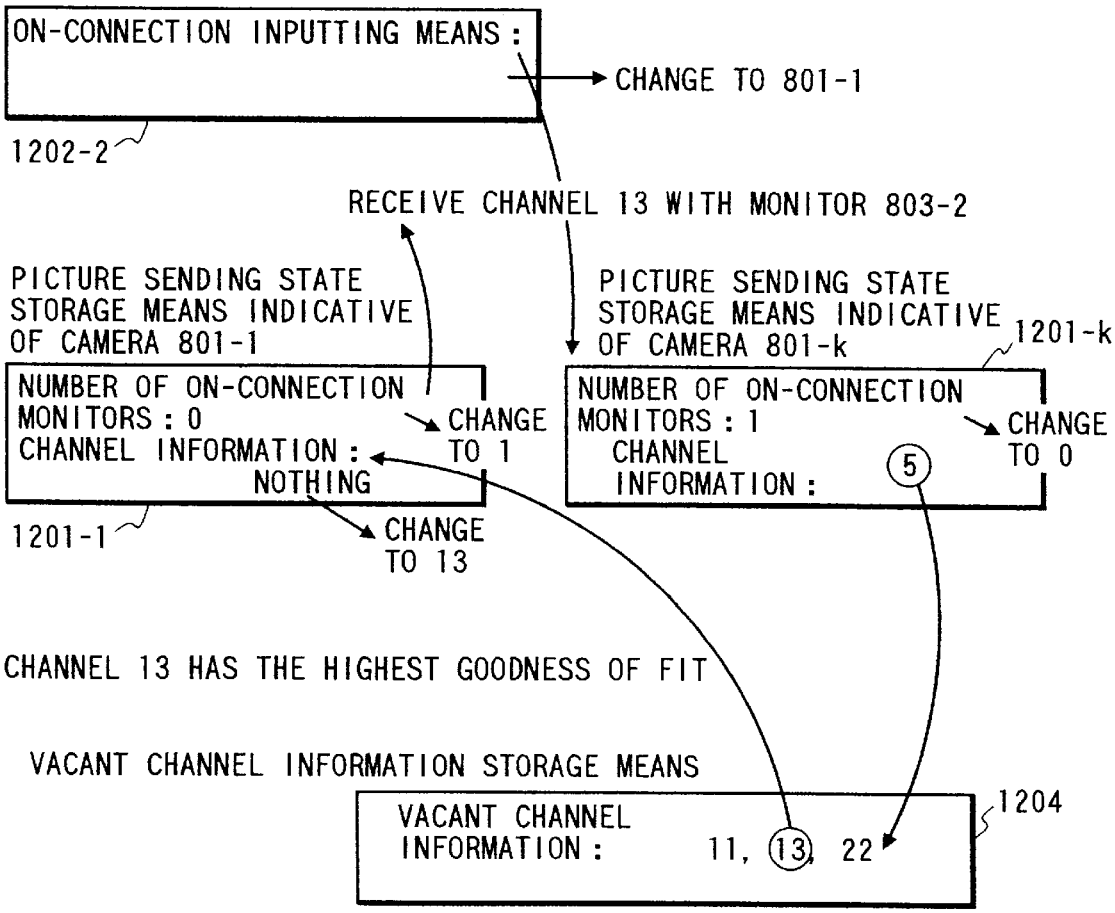
FIG. 14 is an illustration of an example of picture connection processing in the resource allocation section in the fourth embodiment.

FIG. 13 is a flow chart showing an algorithm for the picture connection processing in the resource allocation means 1203 in the fourth embodiment. FIG. 14 is an illustration of an example of the picture connection processing in the resource allocation section of the picture sending unit and the picture receiving unit in the fourth embodiment, which conducts the operation similar to that of the resource allocation means 503 of the picture connection managing unit 109 in the second embodiment shown in FIG. 7. The difference from the second embodiment is that all the picture sending units 805 and all the picture receiving units 806 conduct the same operation.

A description will be taken hereinbelow of an operation of the arrangement as shown in FIGS. 8 and 12 to 14. Now, let it be assumed that the picture connection requesting means 808 issues a request for the picture connection to display the picture taken through the camera (the picture inputting means) 801-1 on the monitor (the picture outputting means) 803-2 and, at this time, the picture taken through the camera (the picture inputting means) 801-*k* is currently on the monitor 803-2. The picture connection requesting means 808 gives instructions to the control signal transmission unit 807 to send a picture connection request, and through the use of the simultaneous transfer means 809 the control signal transmission unit 807 transmits the picture connection request through the branching means 804 and the transmission medium 802 to all the picture sending units 805 and all the picture receiving units 806. In response to the reception of the picture connection request, the resource allocation means 1203 of all the picture sending units 805 and all the picture receiving units 806 conducts the following operation. In this case, the information stored in the picture sending state storage means 1201 and the picture receiving state storage means 1202 are the same as those in the above-described second embodiment, except that all the picture sending units 805 and all the picture receiving units 806 have these information.

In the flow chart of FIG. 13, the operation begins with a step 1301 to find, from the picture receiving state storage means 1202-2 corresponding to the monitor 803-2, that the picture inputting means from which the monitor 803-2 is in reception is the camera 801-*k*, then followed by a step 1302 to decrement the number of connected monitors in the picture sending state storage means 1201-*k* corresponding to the camera 801-*k* by 1 to 0. The operation advances to a step 1303 to check whether the number of connected monitors is 0 or not. In this case, since it is 0, a step 1304 is implemented to take out the channel information ch (channel 5 in FIG. 14) in the picture sending state storage means 1201-*k* to store it in the vacant channel information storage means 1204, and at a step 1305, only in the case of being the picture sending unit 805-k which is in connection with the camera 801-k, its own picture sending switch is turned off. The other picture sending units 805 and picture receiving units 806 do nothing. If at the step 1303 the number of monitors which are on connection is not 0, this signifies that in addition to the monitor 803-2 there exists a monitor(s) (the picture outputting means) which is in connection with the camera 801-k, with the result that the picture sending unit 805-k continues to perform the picture delivery through the use of the channel resources stored in the picture sending state storage means 1201-k.

Subsequently, the operation proceeds to a step 1306 to increment the number of connected monitors in the picture sending state storage means 1201 corresponding to the camera 801-1 by 1 to come to 1, then followed by a step 1307 to check whether the number of connected monitors in the picture sending state storage means 1201-1 is 1 or not. In this case, since it is 1, at a step 1308 the channel resource goodness-of-fit calculation means 1205 calculates a channel resource with the highest goodness of fit when the camera 801-1 carries out the picture delivery to select the channel resource (which is referred to as ch', and channel 13 in FIG. 14) from the vacant channel information means 1204, which in turn, is at a step 1309 stored in the picture sending state storage means 1201-1. Further, at a step 1310, only in the case of being the picture sending unit 805-1 which is in connection to the camera 801-1, its own sending switch is turned on. The other picture sending units 805 and picture receiving units 806 do nothing. In addition, at a step 1311, only in the case of being the picture receiving unit 806-2 which is in connection to the monitor 803-2, it starts to receive the channel resource ch' (channel 13 in FIG. 14). Similarly, the other picture sending units 805 and picture receiving units 806 do nothing. When at the step 1307 the number of monitors being on connection exceeds 1, this means that besides it there exists a monitor(s) (picture outputting means) which is in connection to the camera 801-1, so that the picture sending unit 805-1 continues to carry out the picture delivery through the use of the channel resource (for example, ch") stored in the picture sending state storage means 1210-1. At this time, at a step 1312, only in the case of being the picture receiving unit 806-2 which is in connection to the monitor 803-2, it starts to receive the channel information in the picture sending state storage means 1201-1 through the channel resource ch". The other picture sending units 805 and picture receiving units 806 do nothing. Finally, at a step 1313 the camera 801-1 information is put in the picture receiving state storage means 1202-2 corresponding to the monitor 803-2. The picture connection to display the picture of the camera 801-1 on the monitor 803-2 is realizable in the manner that all the picture sending units 805 and all the picture receiving units 806 conduct the above-described operation.

As described above, this embodiment allows the picture outputting means (monitors) and the channel resources corresponding to the necessary vacant channels to accomplish the arbitrary picture connections with the more picture inputting means (cameras). In other words, the number of the picture inputting means to be installed can exceed the number of channel resources of the transmission medium. In addition, with the calculation of the goodness of fit between the channels and the picture inputting means in the channel allocation, the channel allocation is possible taking into consideration the restriction and preference of the channel resources in the picture switching. Moreover, since a special managing unit is unnecessary for the allocation of the channel resources, the backup for the managing unit serving as the countermeasures for the troubles is also unnecessary.

Fifth Embodiment

Figure 15:
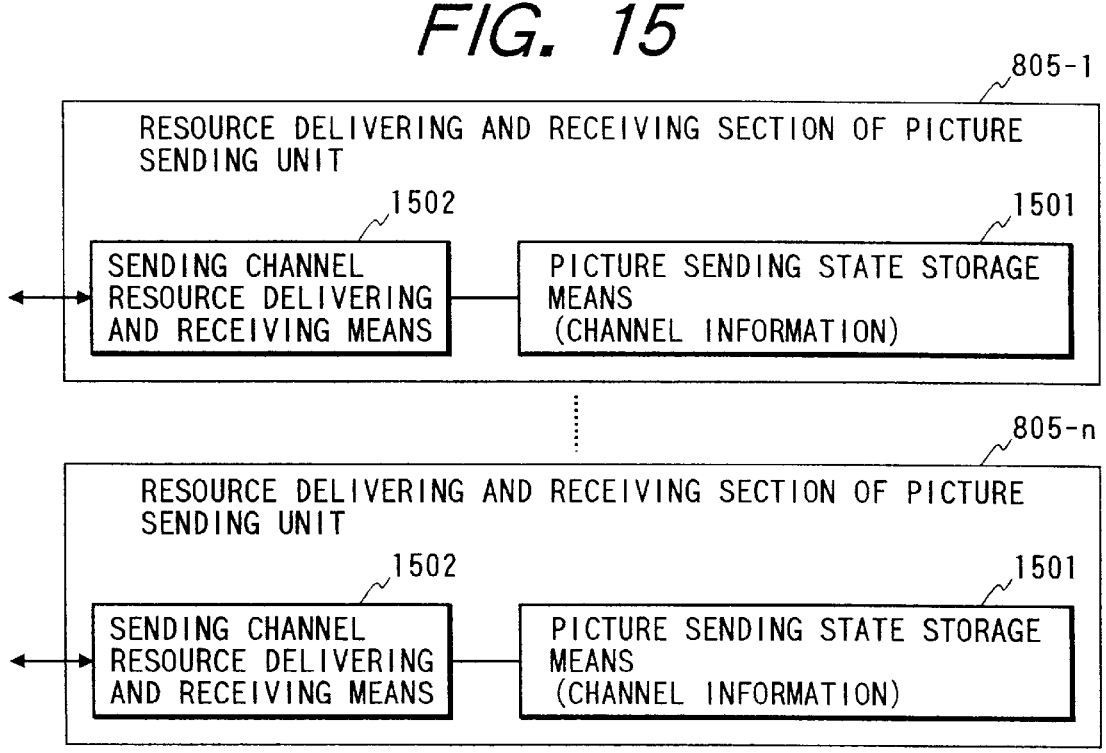
FIG. 15 is a block diagram showing an arrangement of a resource delivering and receiving section of a picture sending unit in a fifth embodiment of this invention.

Moreover, a description will be made hereinbelow of a fifth embodiment of this invention with reference to FIGS. 8 and 15 to 18. Although FIG. 8 shows the arrangement of the picture transmission system according to the third embodiment of this invention, the fifth embodiment has the same arrangement as that as shown in FIG. 8, and the components are the same as those in the third embodiment. FIG. 15 is a block diagram showing an arrangement of a resource delivering and receiving section of each of the picture sending units 805 in the fifth embodiment of this invention. As shown in FIG. 15 the resource delivering and receiving section is composed of picture sending state storage means 1501 for storing, as a well-known stack structure, the channel information on the picture inputting means 801 to which the respective picture sending units 805 are in connection and sending channel resource delivering and receiving means 1502 for determining the delivery channel while giving and getting the channel resources necessary for the picture connections to and from the different picture sending units or picture receiving units 806.

Figure 16:
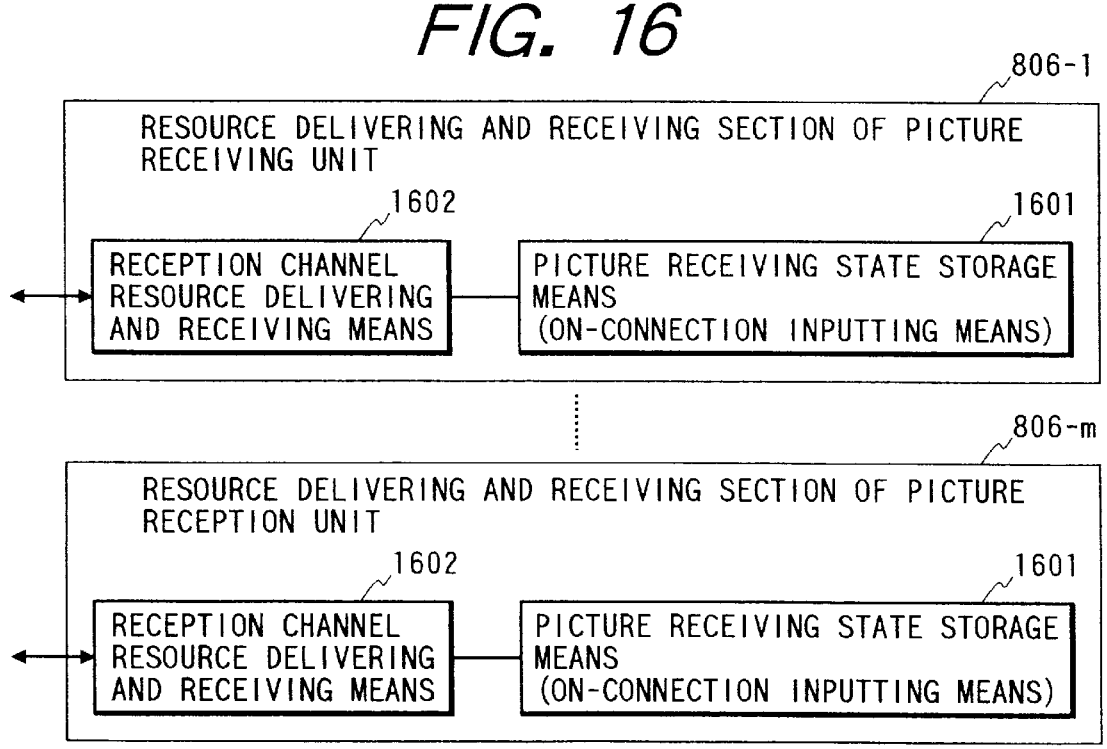
FIG. 16 is a block diagram showing an arrangement of a resource delivering and receiving section of a picture receiving unit in the fifth embodiment.

FIG. 16 is a block diagram showing an arrangement of a resource delivering and receiving section of the picture receiving units 806 in the fifth embodiment. As shown in FIG. 16 the resource delivering and receiving section is made up of picture receiving state storage means 1601 for storing the identification information on the picture inputting means 801 from which the picture outputting means 803 making connection to the picture receiving units 806 are in reception and reception channel delivering and receiving means 1602 for determining the reception channel while giving and getting the channel resources necessary for the picture connections to the other picture sending units 805.

Figure 18:
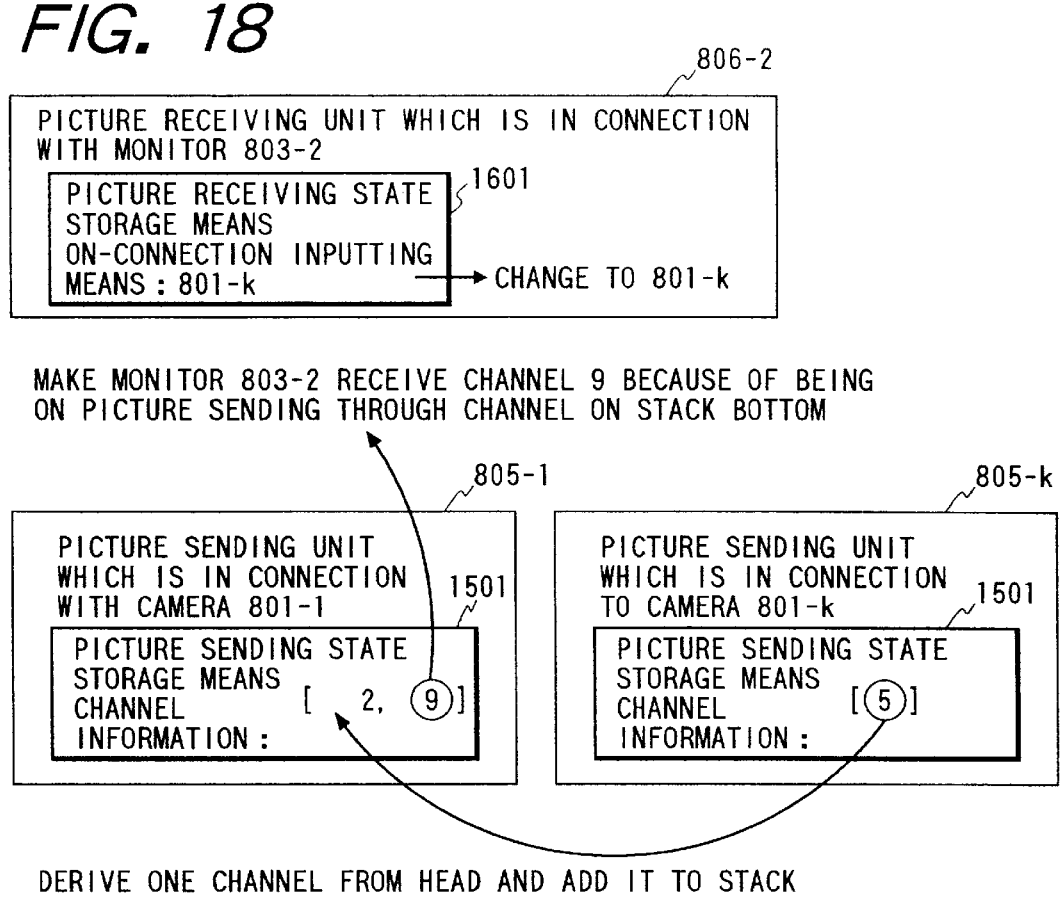
FIG. 18 is an illustration of an example of picture connection processing in the resource delivering and receiving means in the fifth embodiment.

FIG. 17A is a flow chart showing an algorithm for the picture connection in the reception channel resource delivering and receiving means 1602 of the picture receiving units in the fifth embodiment, FIG. 17B is a flow chart showing an algorithm for the picture connection processing in the sending channel resource delivering and receiving means 1502 of the picture sending units in the fifth embodiment, and FIG. 17C is a flow chart showing an algorithm for the picture connection in the sending channel resource delivering and receiving means 1502 of the picture sending units in the fifth embodiment. FIG. 18 is an illustration of an example of the picture connection processing in the resource delivering and receiving section of the picture sending units and the picture receiving units in the fifth embodiment.

A description will be taken hereinbelow of an operation of the arrangement as shown in FIGS. 8 and 15 to 18. Now, let it be assumed that the picture connection requesting means 808 issues a request for the picture connection to display the picture taken 5 through the camera (the inputting means) 801-1 on the monitor (picture outputting means) 803-2 and, at this time, the picture taken through the camera 801-k is on display on the monitor 803-2.

The picture connection requesting means 808 gives instructions to the control signal transmission unit 807 to send a picture connection request, and the control signal transmission unit 807 transmits the picture connection request through the branching means 804 and the transmission medium 802 to the picture receiving unit 806-2 which is in connection with the monitor 803-2.

A brief description will be taken here of the information the picture receiving state storage means 1601 and the picture sending state storage means 1501 retain. Each of the picture receiving units 806 has one picture receiving state storage means 1601 which retains the identification information indicative of the cameras (the picture inputting means) to which the respective monitors (the picture outputting means) 803 connected to the picture receiving units 806 are in the picture connection. On the other hand, each of the picture sending units 805 has one picture sending state storage means 1501 which stores as the stack structure the 0 or more channel resources the respective cameras 801 connected to the picture sending units 805 logically retain, where the number of stored channel resources is representative of the number of monitors which are in the picture connection. Further, the picture sending units 805 which are in connection to the cameras transmit the video information to the transmission medium through the use of the channel resources existing on the stack bottom. Since currently the picture taken through the camera 801-$k$ appears on the monitor 803-2, the identification information on the camera 801-$k$ is stored in the picture receiving state storage means 1601 of the picture receiving unit 806-2 which is in connection to the monitor 803-2 (see FIG. 18). Assuming that the the picture outputting means currently displaying the picture taken through the camera 801-$k$ is only the monitor 803-2, the channel information in the picture sending state storage means 1501 of the picture sending unit 805-$k$ being in connection to the camera 801-$k$ includes only on channel resource of the transmission medium, which is taken as ch (channel 5 in FIG. 18). Still further, let it be assumed that the camera 801-1 experiencing a request on the picture connection with the monitor 803-2 delivers the picture through the channel ch' (channel 9 in FIG. 18) and is in the picture connection to the other two monitors. The channel information in the picture sending state storage means 1501 corresponding to the camera 801-1 is (2, 9) where 9 exists on the stack bottom. This embodiment differs from the first to fourth embodiments in that each of the picture receiving units 806 or picture sending units 805 stores only the information on its own picture connection.

The resource delivering and receiving means 1602 of the picture receiving unit 806-2 receiving the picture connection request starts the connection processing therefor. First, in FIG. 17A, at a step 1701 the resource delivering and receiving means 1602 finds, from the picture receiving state storage means 1601 of the picture receiving unit 806-2, that the picture inputting means from which the monitor 803-2 is on reception is the camera 801-$k$. Subsequently, at a step 1702 the resource delivering and receiving means 1602 transmits a picture connection request to the picture sending unit 805-1 which is in connection to the camera 801-1 and further hands over, as a parameter, the identification information on the camera 801-$k$ from which it is on reception thereto and then waits for the channel resource till reception. Thereafter, the sending channel resource delivering and receiving means 1502 of the picture sending unit 805-1, receiving the picture connection request from the picture receiving unit 806-2, starts the connection processing. In FIG. 17B, at a step 1710 the delivering and receiving means 1502 transmits a channel resource request to the picture sending unit 805-$k$ which is in connection to the camera 801-$k$ and waits the channel resource till reception. Subsequently, the sending channel resource delivering and receiving means 1502 of the picture sending unit 805-$k$, receiving the channel resource request from the picture sending unit 801-1, starts the connection processing. In FIG. 17C, at a step 1720 the delivering and receiving means 1502 picks out one channel resource ch (channel 5 in FIG. 18) from the channel information in the picture sending state storage means 1501 and, at a step 1721, transmits the channel resource ch (channel 5) as a reply to the channel resource request to the picture sending unit 805-1. Further, a step 1722 is implemented to check whether the channel information becomes vacant or not. In this case, it is empty, and therefore, at a step 1723 the picture sending switch of its picture sending unit 805-$k$ is turned off. If at the step 1722 it is not vacant, this signifies that in addition to the monitor 803-2 there is a monitor(s) (the picture outputting means) which is in the picture connection to the camera 801-$k$, with the result that picture sending unit 805-$k$ continues to perform the picture delivery through the use of the channel resource existing on the stack bottom.

The sending channel resource delivering and receiving means 1502 of the picture sending unit 805-1, receiving the channel resource transmitted at the step 1721, resumes the processing and, at a step 1711, stores the received channel resource ch (channel 5 in FIG. 18) in the head of the channel information in its own picture sending state storage means 1501. Then, at a step 1712 the 20 delivering and receiving means 1502 checks whether the number of elements of the channel information in the picture sending state storage means 1501 is 1 or not. If coming to 1, at a step 1713 the delivering and receiving means 1502 turns on the sending switch of its picture sending unit 805-1. In this embodiment, at the step 1712 the number of elements of the channel information comes to 2 or more, and hence there exists a further monitor (the picture outputting means) which is in the picture connection to the camera 801-1, so that the picture sending unit 805-1 continues to perform the picture delivery through the use of the channel resource (channel 9 in FIG. 18) existing on the stack bottom. Thereafter, at a step 1714 the delivering and receiving means 1502 transmits the channel resource ch' (in this case, channel 9) on the stack bottom of the channel information in the picture sending state storage means 1501 to the picture receiving unit 806-2 which is in connection with the monitor 803-2. This is a reply to the picture connection request from the picture receiving unit 806-2, and when at the step 1712 the number of elements of the channel information is 1, ch=ch'.

Finally, at a step 1714 the reception channel resource delivering and receiving means 1602 of the picture receiving unit 806-2, which receives the channel resource ch' transmitted at the step 1714, resumes the processing. At a step 1703 the picture reception starts through the use of the channel resource ch' (channel 9 in FIG. 18) it receives, and at a step 1704 the camera 801-1 information is put in the picture receiving state storage means 1601. As described above, with the communications and the operations of the picture sending unit 805-1, the picture sending unit 805-$k$ and the picture receiving unit 806-2 which takes part in the picture connection as mentioned above, the picture connection is achievable to display the picture taken through the camera 801-1 on the monitor 803-2. At this time, it is not always necessary that the picture connection request is sent to the picture receiving unit 806-2 which is first connected to the monitor 803-2. It is possible that the first picture connection request is sent to the picture sending unit 805-1. It is also possible that, after the transmission of the connection request to all the picture sending units 805 and all the picture receiving units 806, the units taking part in the picture connection delivers and receives the channel resource.

As described above, according to this embodiment, with the channel resources whose number equals the number of the picture outputting means (the monitors), the arbitrary picture connections with the more picture inputting means (the cameras) becomes possible. In other words, the number of picture inputting means to be installed is allowed to exceed the number of resources of the transmission medium. In addition, since a special managing unit is unnecessary for the allocation of the channel resources, the backup for the managing unit serving as the countermeasures for the troubles is also unnecessary. Moreover, as compared with the third and fourth embodiments using the simultaneous transfer means, the operation is accomplished with only the communication processing between the picture receiving units and the picture sending units, this system is strong to the transmission error.

Sixth Embodiment

Figure 19:
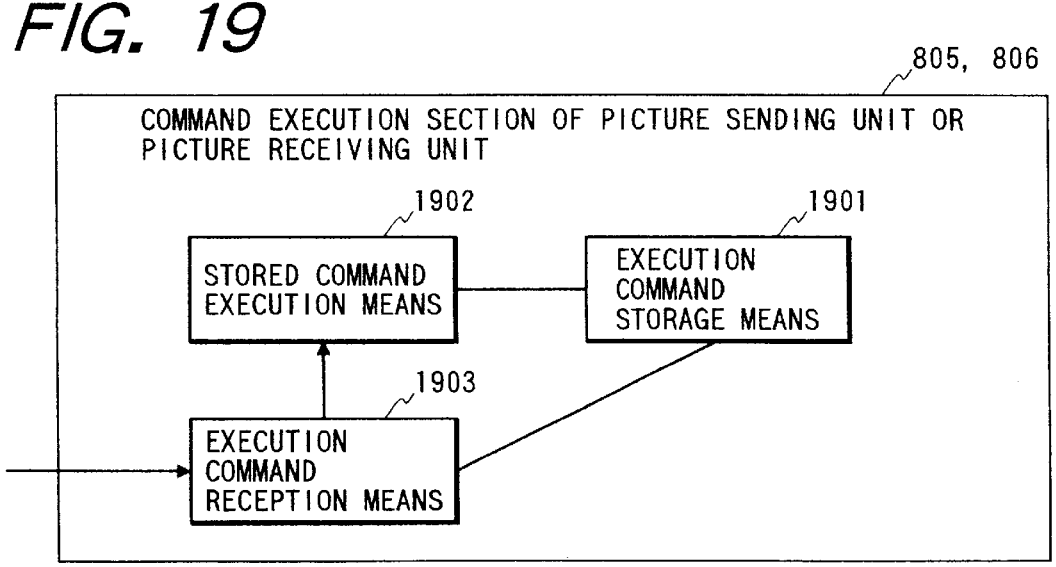
FIG. 19 is a block diagram showing an arrangement of a command execution section of a picture sending unit and a picture receiving unit in a sixth embodiment of this invention.

A sixth embodiment will be described hereinbelow with reference to FIGS. 8, 19 and 20. Although FIG. 8 shows the arrangement of the picture transmission system according to the third embodiment of this invention, the sixth embodiment has the same arrangement as that as shown in FIG. 8, and the components are the same as those in the third embodiment. FIG. 19 is a block diagram showing an arrangement of a command execution section of each of the picture sending units 805 and the picture receiving units 806 in the sixth embodiment of this invention. In FIG. 19, the command execution section is composed of execution command storage means 1901 for storing one or more execution commands such as picture sending start and picture reception start using a specified channel resource, stored command execution means 1902 for actually conducting the operation on the command stored in the execution command storage means, and execution command reception means 1903 for, when receiving an execution command from the external, making the execution command storage means 1901 store the execution command and for, when receiving instructions for the command execution request from the external, making a request to the stored command execution means 1902 to conduct the operation on the command stored in the execution command storage means 1901.

Figure 20:
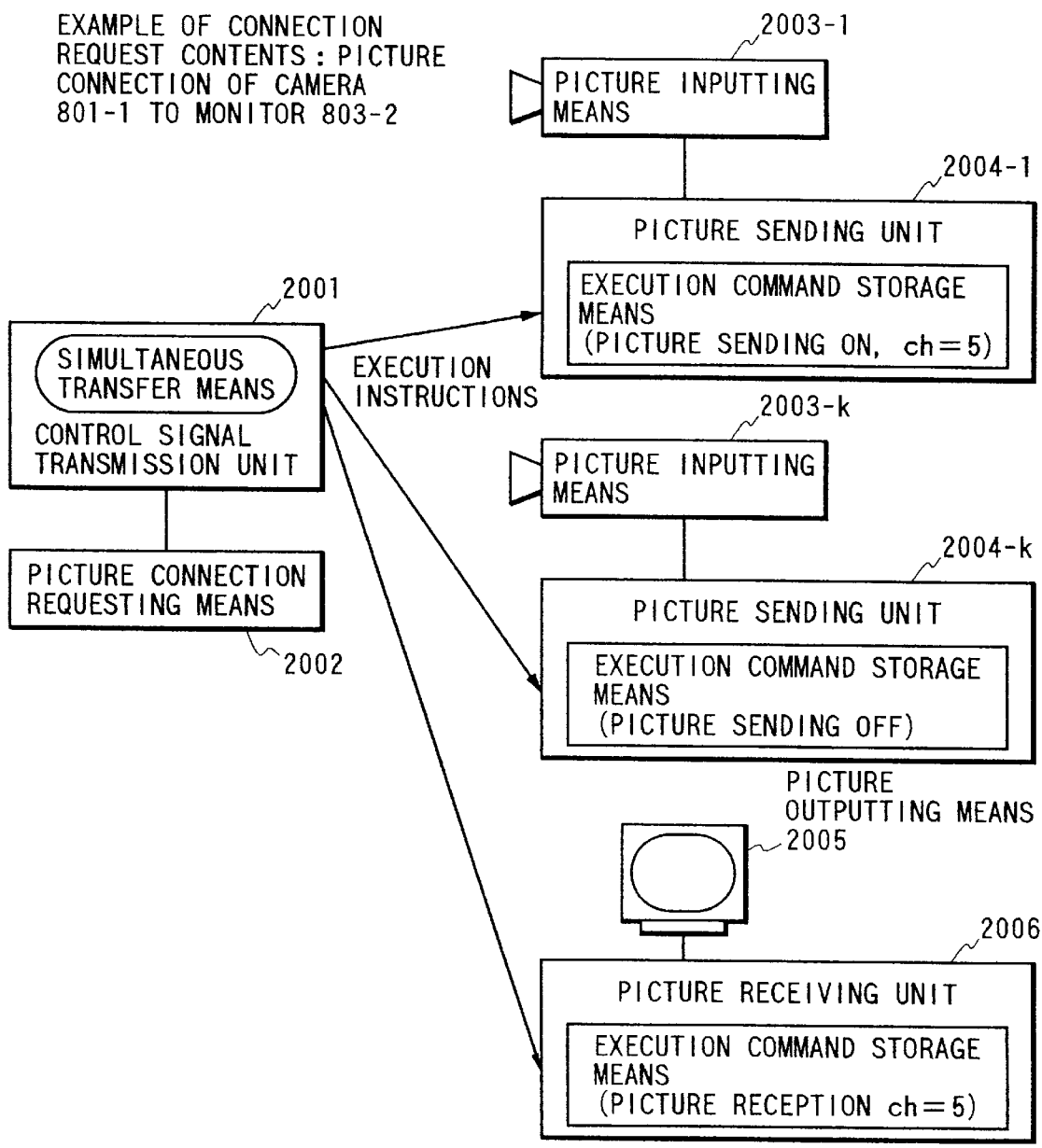
FIG. 20 is an illustration of picture connection processing in a command execution section in the sixth embodiment.

FIG. 20 is an illustration of an example of the execution of the picture connection processing in the command execution section in the sixth embodiment. The FIG. 20 command execution section is made up of a control signal transmission unit 2001 for carrying out the input and output of a control signal through the transmission medium, picture connection requesting means 2002 for making a request to display-switch the picture taken through specified picture inputting means to specified picture outputting means, the picture inputting means 2003-1 undergoing the request on the picture connection, a picture sending unit 2004-1 connected to the picture inputting means 2003-1 to output the video information from the picture inputting means 2003-1 by selecting a specified channel of the transmission medium and further for performing the input and output of a control signal through the transmission medium, the picture outputting means 2005 undergoing the request on the picture connection, a picture receiving unit 2006 for establishing connection to the picture outputting means 2005 to select the video information of a specified channel of a plurality of channels multiplexed in the transmission medium to output it to the picture outputting means 2005 and further for performing the input and output of a control signal through the transmission medium, picture inputting means 2003-$k$ from which the picture outputting means 2005 is currently on the picture reception, and a picture sending unit 2004-$k$ connect ed to the picture inputting means 2003-$k$ to select a specified channel of the transmission medium to output the video information taken through the picture inputting means 2003-$k$ and further for conducting the input and output of a control signal through the transmission medium.

A description will be taken hereinbelow of an operation of the arrangement shown in FIGS. 8, 19 and 20. Now, let it be assumed that the picture connection requesting means 2002 makes a request for the picture connection to display the picture taken through the camera (the picture inputting means) 2003-1 on the monitor (the picture outputting means) 2005 and, at this time, the picture taken through the camera 2003-$k$ currently appears on the monitor 2005. In this case, it is necessary to determine the channel resource to be used for a new picture connection and to realize the picture connection between the camera 2003-1 and the monitor 2005 through the use of the determined channel resource. Although any method is available to determine the channel resource for the picture connection, in this embodiment the channel resource is determined in accordance with the method in the fifth embodiment, thus using the channel 5. In this case, the picture sending unit 2004-$k$ which is in connection with the camera 2003-$k$ needs to turn off its sending switch, while the picture sending unit 2004-1 being in connection with the camera 2003-1 needs to set the sending channel to 5 and to turn on its sending switch, and further the picture receiving unit 2006 being in connection with the monitor 2005 needs to set the reception channel to 5. Accordingly, the picture sending unit 2004-$k$ makes the execution command storage means 1901 store the command "turn off the picture sending switch". The picture sending unit 2004-1 makes the execution command storage means 1901 store the command "set the sending channel to 5 and turn on the sending switch". In a similar way, the picture receiving unit 2006 stores the command "set the reception channel to 5" in the execution command storage means 1901.

After the completion of these three storage operations, any one of the picture sending unit, the picture receiving unit and the control signal transmission unit (for example, the control signal transmission unit 2001 connected to the picture connection requesting means 2002) uses the simultaneous transfer means to give instructions for the execution to the picture sending unit 2004-$k$, the picture sending unit 2004-1 and the picture receiving unit 2006. In response to the reception of the execution instructions, the execution command reception means 1903 of each of the picture sending unit 2004-$k$, the picture sending unit 2004-1 and the picture receiving unit 2006 gives instructions to the stored command execution means 1902 to execute the command stored in the execution command storage means 1901, with the stored command execution means 1902 executing the command stored therein.

At this time, the timing for the command execution in the execution command reception means 1903 of each of the picture sending unit 2004-$k$, the picture sending unit 2004-1 and the picture receiving unit 2006 depends upon its internal clock. One picture sending unit or one picture receiving unit sends a time adjusting command to simultaneously give notice of time at a constant time interval through the simultaneous transfer means, and when receiving this command, the picture sending units and the picture receiving units make the synchronism with their internal clocks, so that the synchronous execution relying on the same clock becomes possible among the plurality of picture sending units and the plurality of picture receiving units.

As described above, according to this embodiment, the internal processing time of the picture sending unit or the picture receiving unit can extremely be shortened with respect to the information propagating time in the transmission medium, and hence the simultaneous picture switching among the plurality of picture sending units and the plurality of picture receiving units becomes possible, thus avoiding the disorder of the picture temporarily occurring at the picture switching operation.

Incidentally, because this embodiment has been described referring to the fifth embodiment, the picture sending unit 2004-k, picture sending unit 2004-1 and picture receiving unit 2006 store the execution command in the execution command storage means 1901 by themselves, whereas it is also appropriate to indicate the command to be stored in the execution command storage means 1901 from the external in such a manner that the picture connection requesting means 2002 or the picture connection managing unit 109 in the above-described first embodiment (FIG. 1) transmits the command to be synchronously conducted to the picture sending units and the picture receiving units. In this case, when receiving the command to be stored, the execution command reception means 1903 of the picture sending units and the picture receiving units puts the received command in the execution command storage means 1901.

Seventh Embodiment

Figure 21:
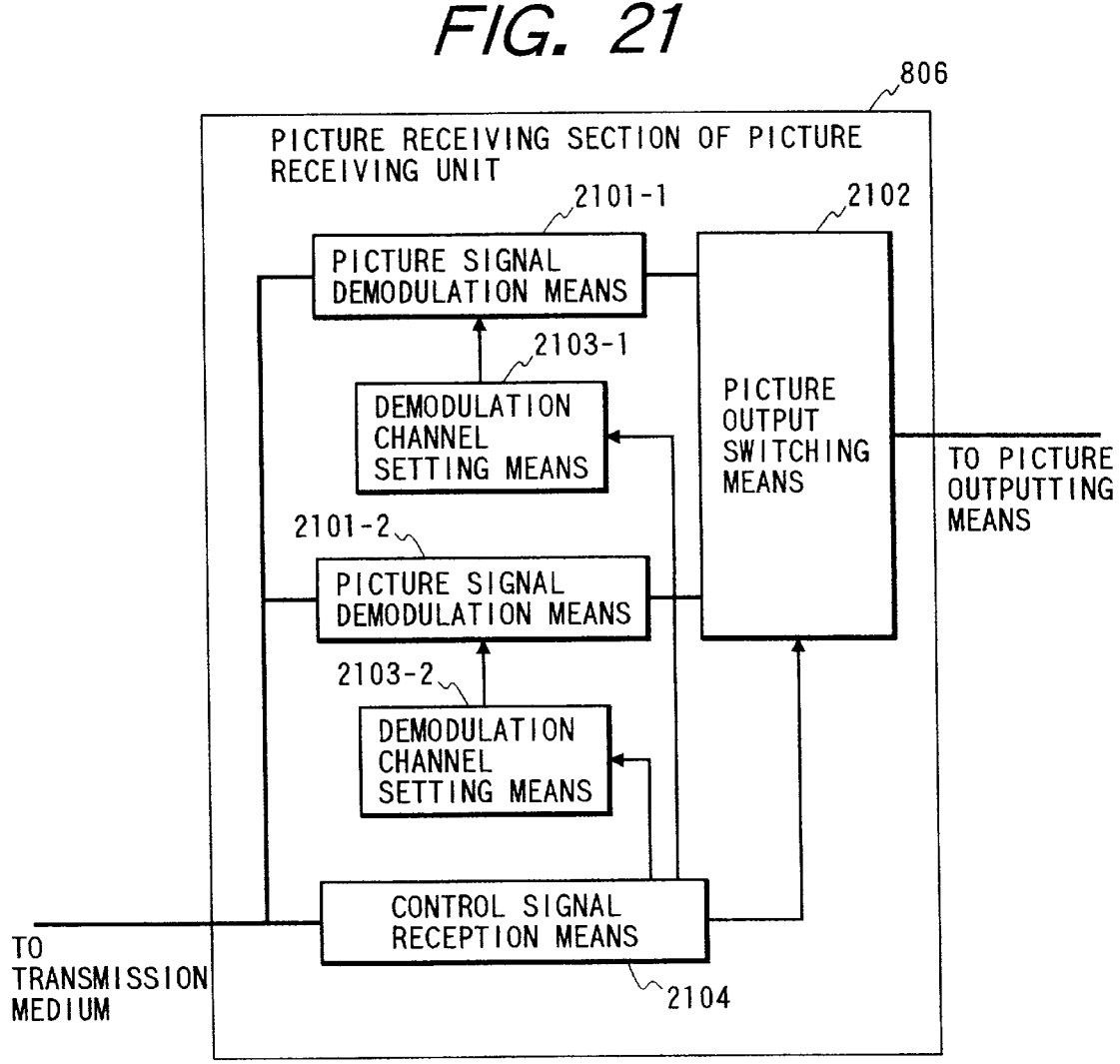
FIG. 21 is a block diagram showing an arrangement of a picture receiving section of a picture receiving unit in a seventh embodiment of this invention.

A seventh embodiment of this invention will be described hereinbelow with reference to FIG. 21. FIG. 21 is a block diagram showing an arrangement of a picture receiving section of picture receiving units in the seventh embodiment of this invention. In FIG. 21, the picture receiving section is composed of picture signal demodulation means 2101-1 to 2101-2 for selecting a picture signal of a set demodulation channel from the video information multiplexed in the transmission medium and for demodulating it to output the demodulated picture signal, picture output switching means 2102 for selecting and outputting one from a plurality of picture signals outputted from two picture signal demodulation means 2101, demodulation channel setting means 2103-1 to 2103-2 for setting the demodulation channel for the demodulation, and control signal reception means 2104 for receiving a control signal transmitted through the transmission medium to receive a picture switching request.

A description will be made hereinbelow of an operation of the arrangement as shown in FIG. 21. Let it be assumed that the picture receiving unit constructed as shown in FIG. 21 is in the picture connection to one camera (picture inputting means). At this time, let it be assumed that the picture signal demodulation means 2101-1 receives a picture signal through the channel 5 being the channel resource to demodulate it and the picture output switching means 2102 is in an outputting state of the picture signal from the picture signal demodulation means 2101-1 to the picture outputting means (monitor). When in this state a picture switching request is sent through the transmission medium to the picture receiving unit, the control signal reception means 2104 accepts the picture switching request. This request also includes the channel resource this picture receiving unit receives after the picture switching. If only one picture signal demodulation means exists within the picture receiving unit, in accordance with the switching request, the control signal reception means 2104 gives an indication of the requested channel resource to the demodulation channel setting means 2103-1 to change the reception channel for the picture signal demodulation means 2101. However, in the case of changing the reception channel, in general the picture is unstable and is in disorder until the demodulation circuit comes into stability. On the other hand, in this embodiment, a plurality of picture signal demodulation means 2101 are provided (in this case, two means), and hence the control signal reception means 2104 gives an indication of the requested channel resource to the demodulation channel setting means 2103 corresponding to the picture signal demodulation means 2101-2 from which the picture output switching means 2102 does not take the output signal, thus changing the reception channel for the picture signal demodulation means 2101-2. Thereafter, it waits until the demodulation circuit of the picture signal demodulation means 2101-2 gets into stability and gives instructions to the picture output switching means 2102 to switch the input to supply the picture output of the picture signal demodulation means 2101-2. When receiving the next picture switching request, the demodulation channel for the picture signal demodulation means 2101-1 is changed, thereby switching the picture in a similar way.

As described above, according to this embodiment, in switching the channel resource for the picture reception in the picture receiving unit, the other picture signal demodulation means first starts the demodulation even for a short time, with the result that the temporary disorder of the picture is avoidable.

Eighth Embodiment

Figure 22:
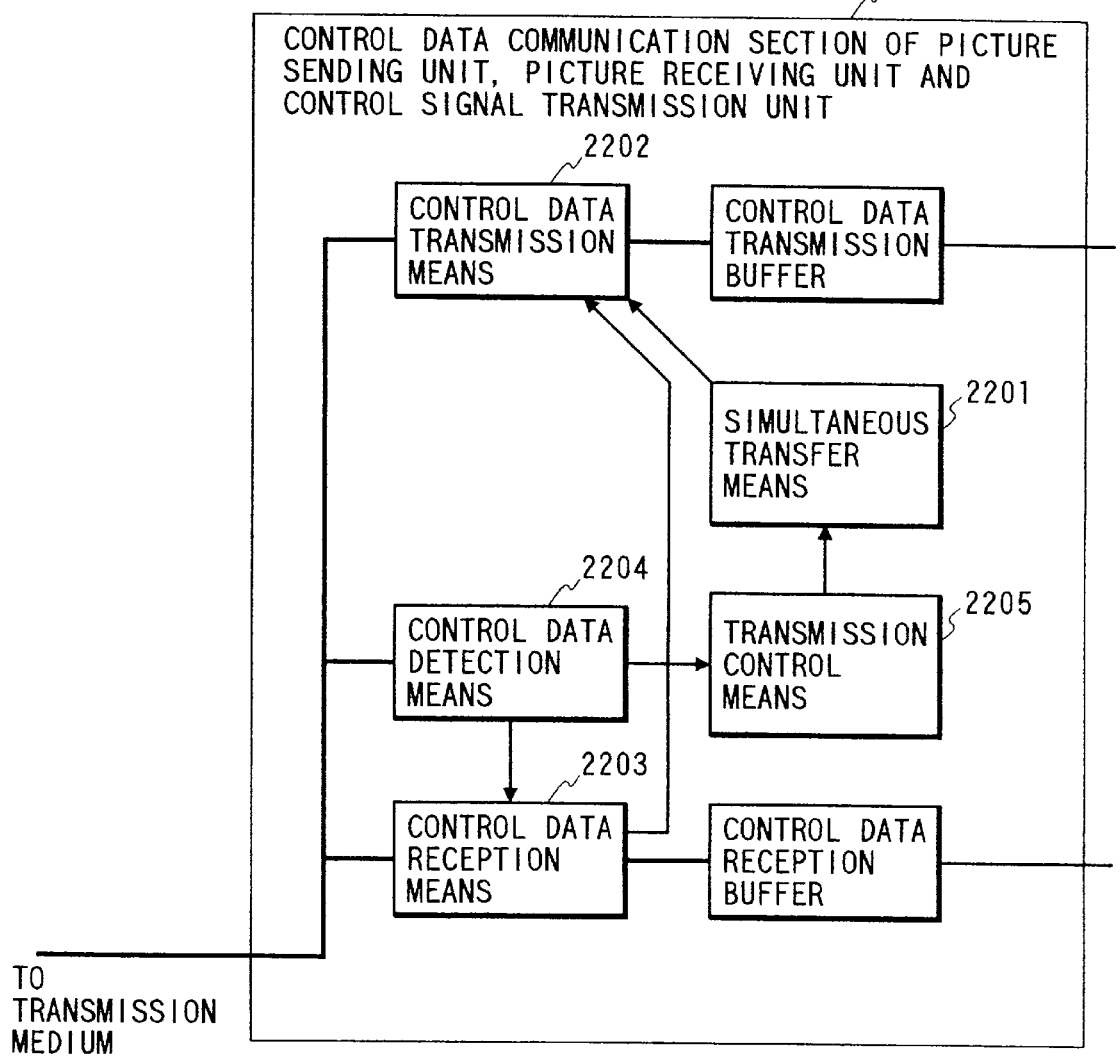
FIG. 22 is a block diagram showing an arrangement of a control data communication section of a picture sending unit, a picture receiving unit and a control signal transmission unit in an eighth embodiment of this invention.

Referring to FIGS. 22, 23A and 23B, a description will be made hereinbelow of an eighth embodiment of this invention. FIG. 22 is a block diagram showing an arrangement of a control data communication section of each of the picture sending units, the picture receiving units and the control signal transmission unit in the eighth embodiment of this invention. In FIG. 22, the control data communication section comprises simultaneous transfer means 2201, control data transmission means 2202 for transmitting control signal data in response to a request from the simultaneous transfer means, control data reception means 2203 for receiving control data through a transmission medium, control data detection means 2204 for detecting the fact that the control data flows on the transmission medium, and transmission control means 2205 for making a request to the simultaneous means 2201 to again transmit the control data when a retransmission request takes place through the transmission medium. FIGS. 23A and 23B are illustrations of an example of a time chart for the control signal data transmission and reception in the eighth embodiment.

A description will be taken hereinbelow of an operation of the arrangement as shown in FIGS. 22, 23A and 23B. Let it be assumed that one control signal transmission unit (referred to as a first control signal transmission unit) transmits control data 1 to all the picture sending units, all the picture receiving units and all the other control signal transmission units. The simultaneous transfer means 2201 of the first control signal transmission unit makes a request for the control data transmission to the control data transmission means 2202, and the control data transmission means 2202 actually transmits one packet of control data. Thereafter, it waits for a given time (time taken for the retransmission request) without conducting transmission. In all the picture sending units, all the picture receiving units and all the other control signal transmission units, the control data detection means 2204 detects the fact that the control data flows on the transmission medium, and the control data reception means 2203 receives the control data if this control data is coming to itself. In this embodiment, since the first control signal transmission unit simultaneously transmits the data, the control data reception means 2203 always receive the data. If succeeding in the reception thereof, the control data reception means 2203 waits without conducting transmission until the elapse of a given ensured time period. On the other hand, if failing to receive for some reason, the control data reception means 2203 issues a request to the control data transmission means 2202, with the control data for the retransmission request being always transmitted during the time period taken for the retransmission request. Let it be assumed that the second and third control signal transmission units fail to receive the data and their control data transmission means 2202 issue the retransmission request. This retransmission request can be accomplished by transmitting the same data for a given time period or by continuously sending a spare signal for the data transmission for a given time period.

In the first control signal transmission unit which first transmits the control data 1, the control data detection means 2204 monitors the transmission medium for the time for the retransmission request after the transmission of the control data. If the retransmission request is not issued during the time ensured for the retransmission, the transmission control means 2205 makes a request to the simultaneous transfer means 2201 to transmit the next control data. If there is the control data to be transmitted, the next control data is sent as the control data 2 (FIG. 23A).

If the control data detection means 2204 detects, during the time period taken for the retransmission request after the transmission of the control data, the fact that the control data flows on the transmission medium, the transmission control means 2205 makes a request to the simultaneous transfer means 2201 to again transmit the control data 1 transmitted immediately before (FIG. 23B). Although there is a possibility that the retransmission requests are broken if they are continuously transmitted from the second and third control signal transmission means which came out to be a failure in the reception a while ago, since in this embodiment the control data other than the retransmission request does not flow in the transmission medium during the time for the retransmission request, the first control signal transmission unit can find the occurrence of the retransmission request even if the control data reception 2203 does not correctly receive it. The second and third control signal transmission units which came out to be a failure in the reception can once more receive the control data, while the other picture sending units, picture receiving units and control signal transmission units which immediately normally achieved the reception can ignore the retransmitted control data 1 by retaining the fact of the presence of a unit(s) which failed in reception.

As described above, according to this embodiment, even if the jamming of retransmission requests take place due to a number of control signal transmission units failing in reception, since the fact of the occurrence of the retransmission requests can immediately be found, there is no need for all the control signal transmission units transmitting the reception confirmation. Since contributing to the certain transmission of the control data, this embodiment can suppress the deterioration of the performance of the transmission medium. Although in this embodiment the control signal transmission units are used for the control data transmission and reception, it is also possible to use the picture sending units or the picture receiving units.

Ninth Embodiment

Figure 24:
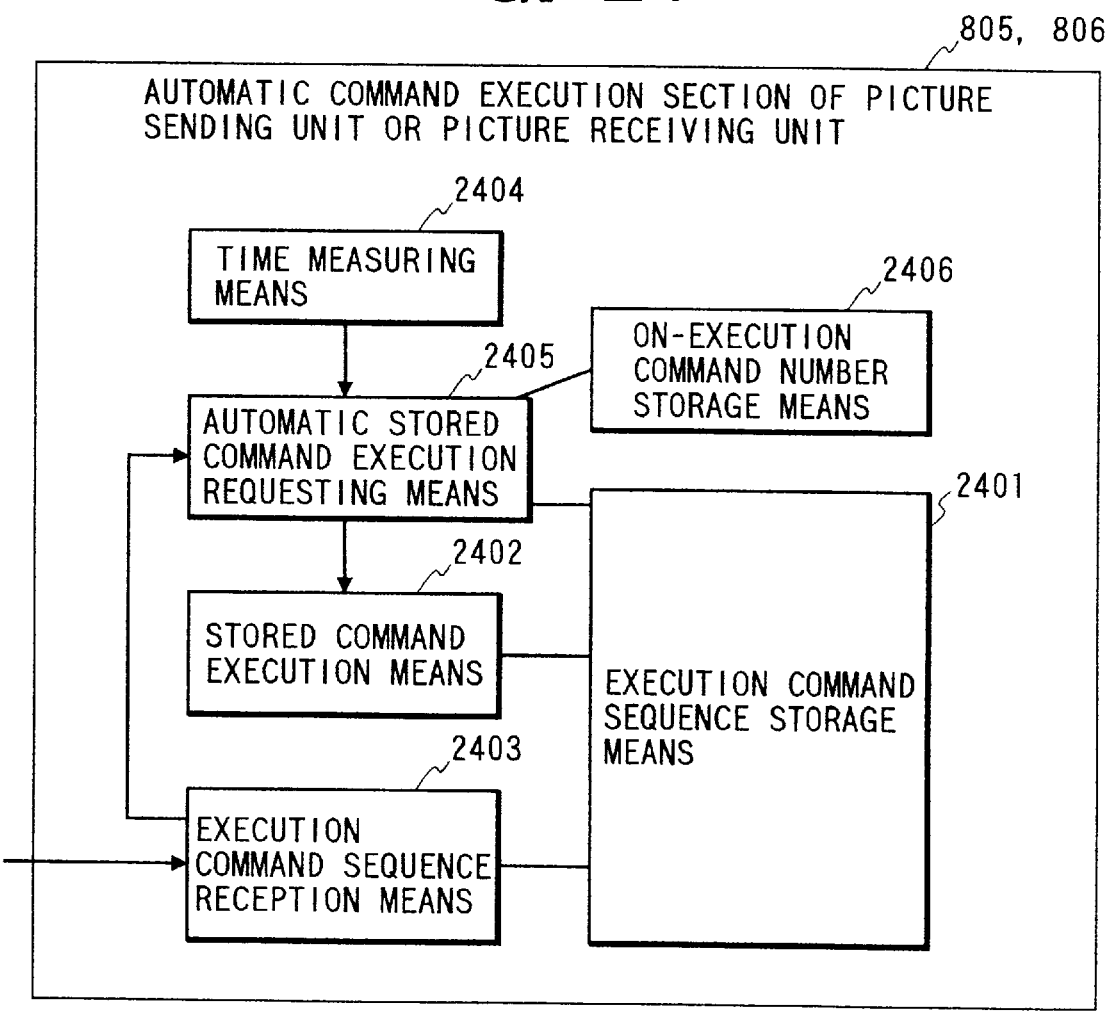
FIG. 24 is a block diagram showing an arrangement of an automatic command execution section of a picture sending unit and a picture receiving unit in an ninth embodiment of this invention.

Referring to FIGS. 8, 24, a description will be made hereinbelow of a ninth embodiment of this invention. Although FIG. 8 shows the arrangement of the picture transmission system according to the third embodiment of this invention, the ninth embodiment has the same arrangement as that as shown in FIG. 8, and the components are the same as those in the third embodiment. FIG. 24 is a block diagram showing an arrangement of an automatic command execution section of each of the picture sending units and the picture receiving units in the ninth embodiment of this invention. In FIG. 24, the automatic command execution section is made up of execution command sequence storage means 2401 for storing an execution command sequence including the numbers of steps under the automatic execution, the time interval determined at every step and one or more execution commands to be implemented in the steps, stored command execution means 2402 for executing the command operations stored in the execution command sequence storage means 2401, execution command sequence reception means 2403 for receiving a portion of or all the execution command sequence from the external to store it in the execution command sequence storage means 2401, time measuring means 2404 for measuring time to communicate the time information to automatic stored command execution requesting means 2405 at every certain time, the automatic stored command execution requesting means 2405 for making a request to the stored command execution means 2402 to conduct the command operation stored in the execution command sequence storage means 2401, and on-execution command number storage means 2406 for storing step identification information of the command which is currently on the automatic execution.

A table 1 shows an example of contents of step numbers, time intervals determined for the steps and one or more execution commands to be executed in the steps, which are stored in the execution command sequence storage means 2401 in the picture sending units, the picture receiving units in the ninth embodiment.

TABLE 1

| Step Number | Time Interval | Command 1 | Command 2 |
|---|---|---|---|
| 1 | 5 seconds | ch4 reception start | illumination on |
| 2 | 3 seconds | ch5 reception start | |
| 3 | 5 seconds | ch8 reception start | illumination off |
| 4 | 7 seconds | ch12 reception start | |

An operation will be described hereinbelow with reference to FIGS. 8 and 24 and the table 1. In this case, the picture receiving units 806 are constructed as shown in FIG. 24. The picture sending units 805 has the same arrangement as that of the above-mentioned embodiment. A predetermined operation such as the picture switching processing can be conducted in the picture receiving units 806 at a given time interval as follows. A command operation sequence to be needed is transmitted in advance from the external such as the picture connection requesting means 808 to the corresponding picture receiving unit 806 and is required to be stored as the execution command sequence. The execution command sequence is exemplified by the above table 1. The table 1 shows the following fixed operations. First, in the command step number 1, the reception starts through the use of the reception channel ch4 and an illumination switch connected to the same picture receiving unit 806 is turned on. Let it be assumed that in this embodiment the illumination switch connected to the picture receiving unit 806 is designed to be mechanically turned on and off. Thereafter, this state remains for 5 seconds, and then in the command step number 2 the reception starts through the use of the reception channel ch5 and similarly the interruption takes place for 3 seconds. Subsequently, in the command step number 3, the reception starts using the reception channel ch8 and the illumination switch connected to the picture receiving unit 806 is turned off. This situation remains (waiting) for 5 seconds. Finally, in the command step number 4, the reception takes place by changing the reception channel to ch12, then waiting for 7 seconds. After the command step number 4, the process returns to the command step number 1, then conducting the operation. When receiving the execution command sequence shown in the table 1, the execution command sequence reception means 2403 of the picture receiving unit 806 puts the designated execution command sequence in the execution command sequence storage means 2401. The external unit such as the picture connection requesting means 808 gives instructions to the picture receiving unit 806 to carry out the automatic execution of the execution command sequence. In response to the reception of the instructions, the execution command sequence reception means 2403 makes a request for the start of the automatic execution to the automatic stored command execution requesting means 2405. In this case, it is also possible that another section of the same picture receiving unit can give instructions for the execution in place of the external unit. The automatic stored command execution requesting means 2405 issues a request for the execution of the command, stored in the execution command sequence storage means 2401, to the stored command execution means 2402. In starting the automatic execution, the stored command execution means 2402 works to execute, of commands stored in the execution command sequence storage means 2401, all of one or more commands in the command step number 1, and the automatic stored command execution requesting means 2405 puts the command step number (beginning with 1) which is currently on execution in the on-execution command number storage means 2406. In this embodiment, the picture reception channel is set to 4 before the reception starts, and the illumination switch connected thereto is turned on. Further, the number 1 is stored in the on-execution command number storage means 2406. Thereafter, the automatic stored command execution requesting means 2405 waits for 5 seconds on the basis of the time information sent from the time measuring means 2404 at a given time interval.

Subsequently, the automatic stored command execution requesting means 2405 detects, on the basis of the time information from the time measuring means 2404, the fact that 5 seconds pass. In addition, referring to the command step number being on execution stored in the on-execution command number storage means 2406, the automatic stored command execution requesting means 2405 makes a request to the stored command execution means 2402 to conduct the operation corresponding to the next command step number of the execution commands stored in the execution command sequence storage means 2401. Accordingly, the picture reception of the command stored in the execution command sequence storage means 2401 and transmitted through the reception channel ch5 starts. Further, the number 2 being the executed command step number is stored in the on-execution command number storage means 2406. Still further, the automatic stored command execution requesting means 2405 waits for 3 seconds on the basis of the time information from the time measuring means 2404. With this operation repeated, the predetermined command process is done at a given time interval in accordance with the operational contents of the execution command sequence shown in the table 1, so that the picture receiving unit 806 automatically operates.

As described above, according to this embodiment, with no use of a special managing unit, the picture receiving units or the picture sending units can independently conduct the process of automatically conducting the operation such as the picture switching in accordance with a given procedure. Thus, a high performance is attainable with the parallel executions in the respective picture receiving units or picture sending units and with the decrease in transmission quantity on the transmission medium.

Tenth Embodiment

A tenth embodiment of this invention will be described hereinbelow with reference to FIGS. 8 and 25 and the table 1. Although FIG. 8 shows the arrangement of the picture transmission system according to the third embodiment of this invention, the tenth embodiment has the same arrangement as that as shown in FIG. 8, and the components are the same as those in the third embodiment. The table 1, which has been used for the description of the ninth embodiment, shows an example of contents of step numbers, time intervals determined for the steps and one or more execution commands to be executed in the steps, which are stored in execution command sequence storage means 2601 in the picture sending units and the picture receiving units in the tenth embodiment.

Figure 25:
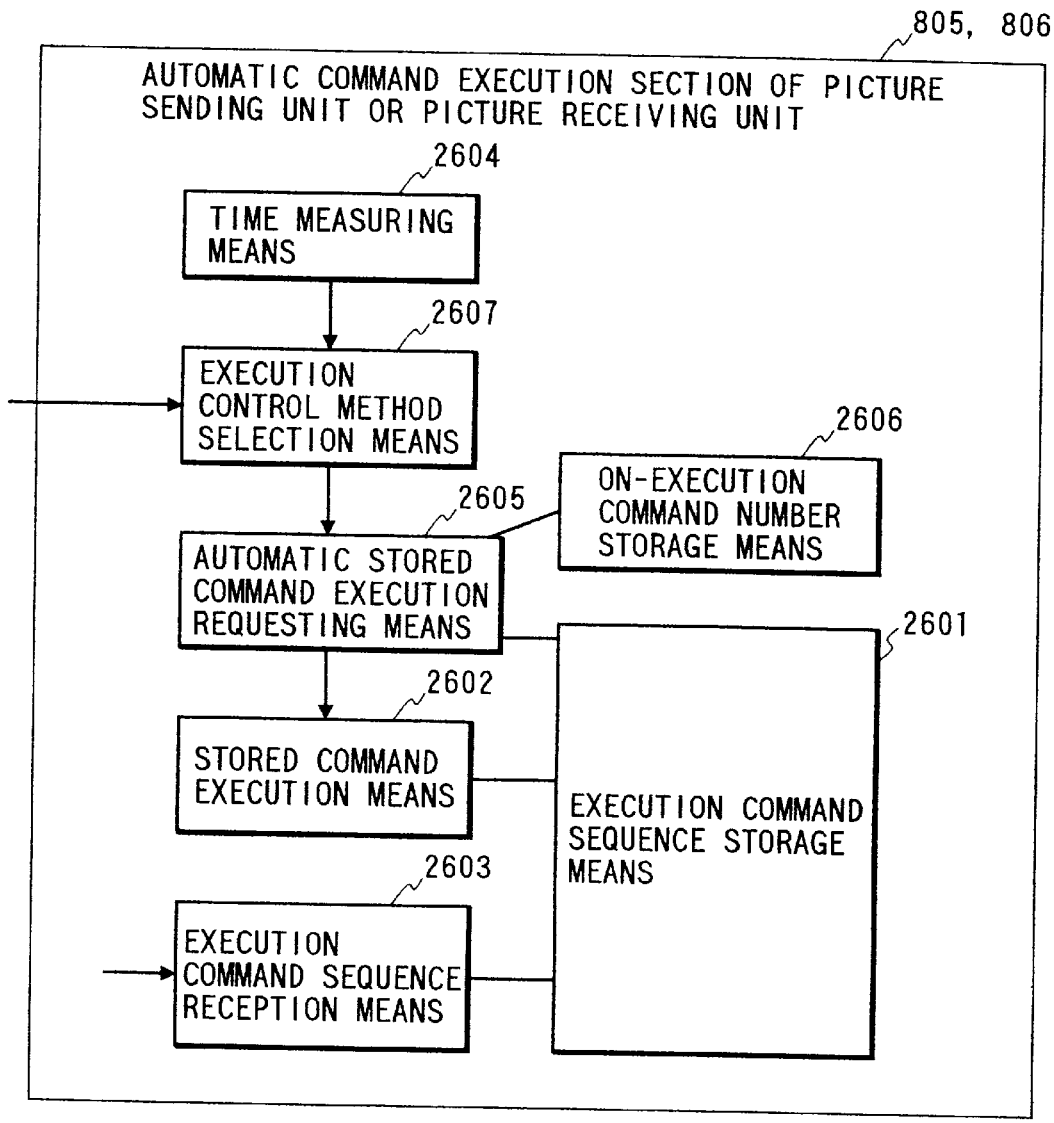
FIG. 25 is a block diagram showing an arrangement of an automatic command execution section of a picture sending unit and a picture receiving unit in a tenth embodiment of this invention.

FIG. 25 is a block diagram showing an arrangement of an automatic command execution section of the picture sending units and the picture receiving units in the tenth embodiment of this invention. In FIG. 25, the automatic command execution section is composed of execution command sequence storage means 2601 for storing an execution command sequence including the number of step under automatic execution, time interval determined for the steps and one or more execution commands to be executed, stored command execution means 2602 for executing the command process stored in the execution command sequence storage means 2601, execution command sequence reception means 2603 for receiving a portion of or all the execution command sequence from the external to put it in the execution command sequence storage means 2601, time measuring means 2604 for measuring time to give a notice of time information to automatic stored command execution requesting means 2605 at a given time interval, the automatic stored command execution requesting means 2605 for making a request to the stored command execution means 2602 to conduct the command process stored in the execution command sequence storage means 2601, on-execution command number storage means 2606 for storing step identification information on the automatically executed command which is currently on execution, and execution method selection means 2607 for selecting one of a method of receiving a control request for the automatic execution operation of the execution command from the external and a method of automatically advancing the process through the use of the time measuring means 2604.

A description will be taken hereinbelow of an operation of the arrangement as shown in FIGS. 8 and 25 and the table 1. The picture receiving units 806 are constructed as shown in FIG. 25. Although the description will be made using an example of the picture receiving units, this embodiment can also use the picture sending units 805 in a similar way. In each of the picture receiving units 806, as well as the method taken in the ninth embodiment, a predetermined operation (such as the picture switching) can automatically be done at a given time interval. In this case, the stopping or resuming of the automatic execution operation from the external is realizable as follows.

Now, let it be assumed that in the picture receiving unit 806 the execution command sequence storage means 2601 stores the execution command sequence shown in the table 1 and the picture receiving unit 806 is in automatic execution operation. At this time, the automatic stored command execution requesting means 2605 works by detecting the time information given from the time measuring means 2604 through the execution control method selection means 2607, and when advancing to the next command step, makes a request to the stored command execution means 2602 referring to the command step number, which is on execution, stored in the on-execution command number storage means 2606 so that the stored command execution means 2602 conducts the operation corresponding to the next command step number of the execution commands stored in the execution command sequence storage means 2601.

During the automatic execution operation, the execution control method selection means 2607 directly passes the time information from the time measuring means 2604 to the automatic stored command execution requesting means 2605. However, when receiving a request for temporarily stopping the automatic execution operation from the external such as the picture connection request means 808, it does not pass the time information from the time measuring means 2604 to the automatic stored command execution requesting means 2605 until receiving a request for resuming the automatic execution operation, but outputs the control command (for example, the resumption of the automatic execution, the advance by one command step, or the like) from the external to the automatic stored command execution requesting means 2605. In this case, the automatic stored command execution requesting means 2605 conducts the command execution in accordance with the control request for the automatic execution from the external.

In the case of receiving the request of "temporary stop of automatic execution operation" from the external, the execution control method selection means 2607 comes into a mode for the stop of the automatic execution and gives instructions to the automatic stored command execution requesting means 2605 to stop the automatic execution and further stops the output of the time information. For this reason, the command number stored in on-execution command number storage means 2606 does not advance.

Secondly, when receiving the request of "advance by one command step", the execution control method selection means 2607 gives that request to the automatic stored command execution requesting means 2605, and the automatic stored command execution requesting means 2605 refers to the on-execution command number stored in the on-execution command number storage means 2606 to make a request to the stored command execution means 2602 to conduct the operation corresponding to the next command step number of the execution commands stored in the execution command sequence storage means 2601.

Furthermore, when receiving the request of "resume automatic execution operation" from the external, the execution control method selection means 2607 gives instructions for the resumption of the automatic execution to the automatic stored command execution requesting means 2605 and further outputs the time information coming from the time measuring means 2604, and the automatic stored command execution requesting means 2605 detects the elapse of the necessary time on the bases of the time information it gets and issues a request to the stored command execution means 2602 to execute the command corresponding to the next command step number. Thereafter, it enters a mode for the automatic execution operation and executes the execution command in the next command step in order after the designated time is elapsed.

As described above, according to this embodiment, even if the process of automatically conducting an operation such as picture switching according to a given procedure is automatically done without the use of a managing unit, by switching between the time information from the time measuring means and the operation instructions from the external, the control of the automatic execution operation is possible from the external.

Eleventh Embodiment

Figure 26:
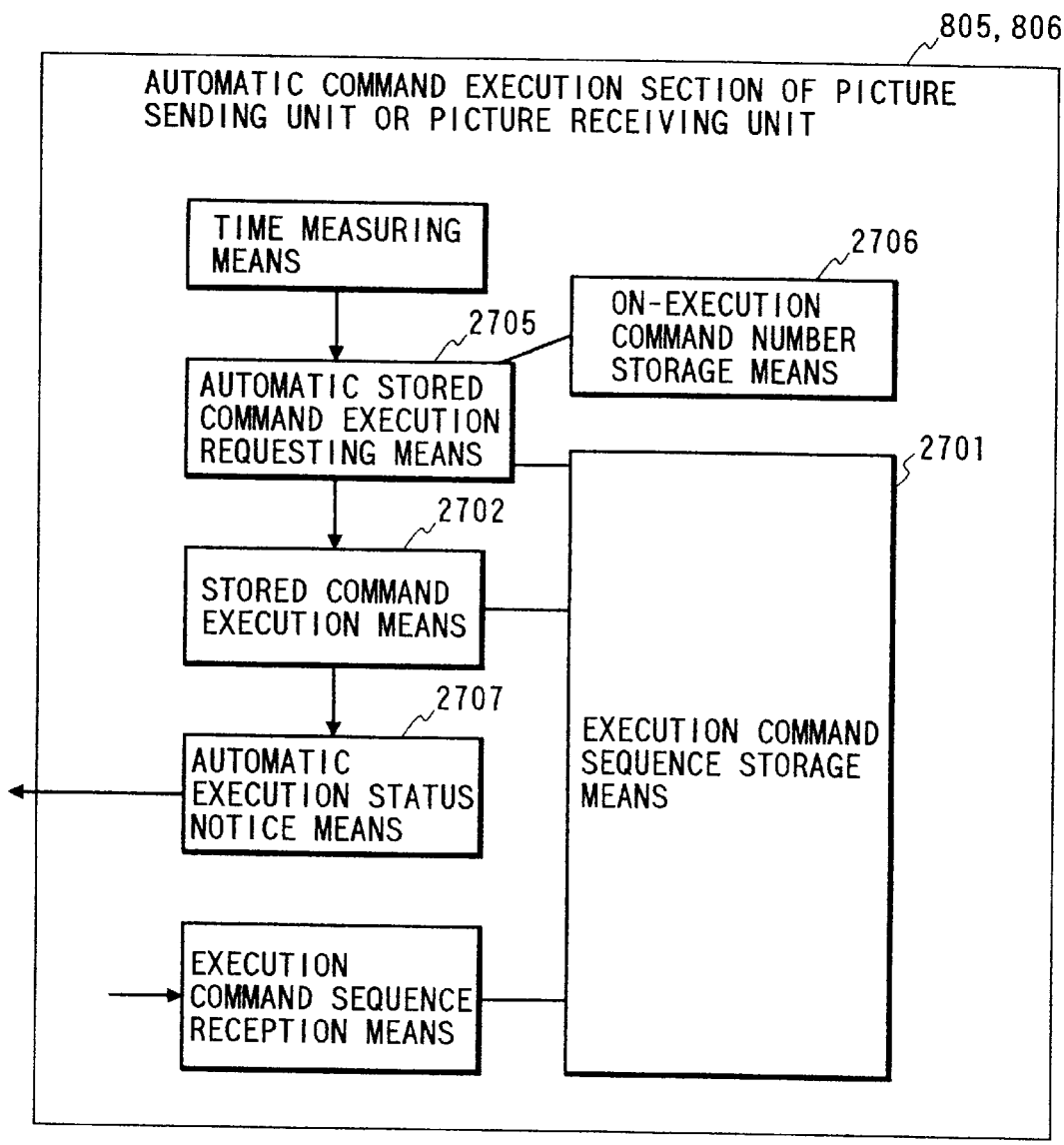
FIG. 26 is a block diagram showing an arrangement of an automatic command execution section of a picture sending unit and a picture receiving unit in an eleventh embodiment of this invention.

Referring to FIGS. 8 and 26 and the table 1, a description will be taken hereinbelow of an eleventh embodiment of this invention. Although FIG. 8 shows the arrangement of the picture transmission system according to the third embodiment of this invention, the eleventh embodiment has the same arrangement as that as shown in FIG. 8, and the components are the same as those in the third embodiment. The table 1, which has been used for the description of the ninth embodiment, also shows an example of contents of step numbers, time intervals determined for the steps and one or more execution commands to be executed in the steps, which are stored in execution command sequence storage means 2701 in the picture sending units and the picture receiving units in the eleventh embodiment.

FIG. 26 is a block diagram showing an arrangement of an automatic command execution section of the picture sending units and the picture receiving units in the eleventh embodiment of this invention. In FIG. 26, the automatic command execution section is made up of execution command sequence storage means 2701 for storing an execution command sequence including step numbers under automatic execution, time intervals determined for the steps and one or more execution commands to be executed in the steps, stored command execution means 2702 for conducting the command operations stored in the execution command sequence storage means 2701, automatic stored command execution requesting means 2705 for making a request for the execution of the command operations stored in the execution command sequence storage means 2701, on-execution command number storage means 2706 for storing step identification information on the commands being currently under the automatic execution, and automatic execution status notice means 2707 for, when the stored command execution means 2702 conducts the command execution operation, communicating the information on that execution command to the other picture receiving units 806, picture sending units 805 and control signal transmission units 807.

A description will be taken hereinbelow of an operation of the arrangement shown in FIGS. 8 and 26 and the table 1. In this case, the picture receiving units 806 are constructed as shown in FIG. 26. Although the description will be made in terms of an example of the picture receiving units, the picture sending units 805 is also available. In cases where in the picture receiving units 806 the predetermined execution command sequence is automatically conducted at a given time interval or is controlled at an arbitrary timing mentioned in the above ninth and tenth embodiments, there may be a need for noticing the outside of the picture receiving unit of the identification information on the executed command or the execution result. That is, there is a case that a different unit accomplishes centralized control of the present picture connection states (for example, the states of the reception channels and the illumination switches shown in the table 1) or the like.

Now, let it be assumed that in the picture receiving unit 806 the execution command sequence storage means 2701 stores the execution command sequence shown in the table 1 and the picture receiving unit 806 conducts the automatic execution operation in accordance with the stored execution command sequence. At this time, the automatic stored command execution requesting means 2705 detects the time information from the time measuring means and operates, and when advancing to the next command step, makes a request to the stored command execution means 2702 referring to the on-execution command step number stored in the on-execution command number storage means 2706 so that the stored command execution means 2702 executes the operation corresponding to the next command step number of the execution commands stored in the execution command sequence storage means 2701. The stored command execution means 2702 executes the requested execution command and gives to the automatic execution status notice means 2707 the command execution information such as the command step number (for example, 1) executed, the contents (for example, the reception start using the channel 4, the illumination on) of the command executed and the execution result of the command. Thereafter, the automatic execution status notice means 2707 transmits the given command execution information to the other picture receiving units 806, the picture sending units 805 and the control signal transmission units 807. The number of destinations can be one or plural.

Then, through the use of the method in the ninth embodiment or the tenth embodiment, the automatic stored command execution requesting means 2705 again issues a request to the stored command execution means 2702 to execute the execution command stored in the execution command sequence storage means 2701, and the automatic execution status notice means 2707 repeatedly sends the command execution information to the other picture receiving units 806, the picture sending units 805 and the control signal transmission unit 807. Thus, in cases where the execution command corresponding to one command step number is executed at a designated time interval or in accordance with instructions from the external, the information can be sent to the external units.

As described above, according to this embodiment, even if the process of automatically performing the operation such as the picture switching according to a given procedure is automatically done without the use of a managing unit, the other units can know the progress status of the automatic executions made in non-synchronous states in the picture sending units or the picture receiving units. In addition, one unit can accomplish the centralized control of the present picture connection states in all the picture receiving units or the like, thus facilitating the management of the whole picture transmission system.

Twelfth Embodiment

Figure 27:
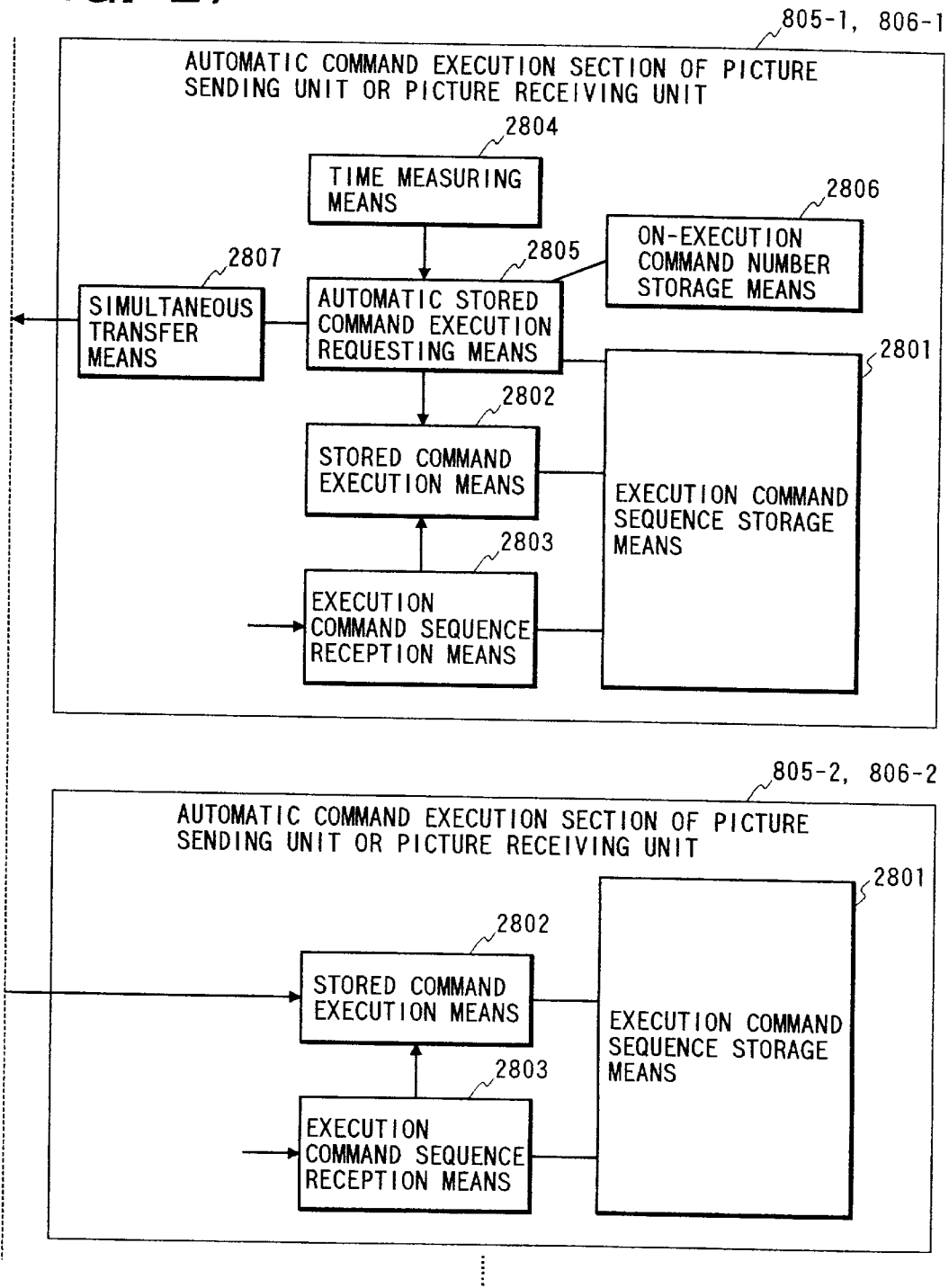
FIG. 27 is a block diagram showing an arrangement of an automatic command execution section of a picture sending unit and a picture receiving unit in a twelfth embodiment of this invention.

Referring to FIGS. 8 and 27 and the following tables 2 and 3, a description will be made hereinbelow of a twelfth embodiment of this invention. Although FIG. 8 shows the arrangement of the picture transmission system according to the third embodiment of this invention, the twelfth embodiment has the same arrangement as that as shown in FIG. 8, and the components are the same as those in the third embodiment.

TABLE 2

Execution Command Sequence for Picture Receiving Unit 806-1

| Step Number | Time Interval | Command 1 | Command 2 |
|---|---|---|---|
| 1 | 5 seconds | ch4 reception start | illumination on |
| 2 | 3 seconds | ch5 reception start | |

TABLE 2-continued

Execution Command Sequence for Picture Receiving Unit 806-1

| Step Number | Time Interval | Command 1 | Command 2 |
|---|---|---|---|
| 3 | 5 seconds | ch8 reception start | illumination off |
| 4 | 7 seconds | ch12 reception start | |

TABLE 3

Execution Command Sequence for Picture Receiving Unit 806-2

| Step Number | Time Interval | Command 1 | Command 2 |
|---|---|---|---|
| 1 | ? seconds | ch22 reception start | |
| 2 | ? seconds | ch25 reception start | illumination on |
| 3 | ? seconds | ch32 reception start | |
| 4 | ? seconds | ch36 reception start | illumination off |

FIG. 27 is a block diagram showing an arrangement of an automatic execution section of the picture sending units and the picture receiving units in the twelfth embodiment of this invention. The automatic command execution section is, as shown in FIG. 27, composed of execution command sequence storage means 2801 for storing an execution command sequence including step numbers under automatic execution, time intervals determined for the steps and one or more execution commands to be executed in the steps, stored command execution means 2802 for conducting the command operations stored in the execution command sequence storage means 2801, execution command sequence reception means 2803 for receiving a portion of or all the execution command sequence from the external and for making the execution command sequence storage means 2801 store the received execution command sequence, time measuring means 2804 for measuring time to inform automatic stored command execution requesting means 2805 of the time information at a given time interval, the automatic stored command execution requesting means 2805 for making a request to the stored command execution means 2802 to conduct the command operation stored in the execution command sequence storage means 2801, and on-execution command number storage means 2806 for storing step identification information on the command which is on the automatic execution.

The table 2 shows the execution command sequence stored in the execution command sequence storage means 2801 of a first picture receiving unit 806-1 in the twelfth embodiment and has the same contents as those of the table 1, and the table 3 shows an example of the execution command sequence stored in the execution command sequence storage means 2801 of a second picture receiving unit 806-2 in this embodiment.

A description will be taken hereinbelow of an operation of the arrangement shown in FIGS. 8 and 27 and the tables 2 and 3. Let it be assumed that the picture receiving units 806 are constructed as shown in FIG. 27. Although the following description will be made in terms of the picture receiving units, it is also possible to use the picture sending units 805. First, using the method in the ninth embodiment, the necessary execution command sequence operations are stored in advance in the execution command sequence storage means 2801 of each of a plurality of units, i.e., the picture receiving unit 806-1 and the picture receiving unit 806-2, which are required to concurrently or synchronously conduct the command operations. Naturally, these command operations can be different from each other. In the case of this embodiment, the execution command sequence storage means 2801 of the first picture receiving unit 806-1 stores the command operation shown in the table 2, while the execution command sequence storage means 2801 of the second picture receiving unit 806-2 stores the command operation shown in the table 3. However, in the case of this arrangement, the time intervals stored in the execution command sequence storage means 2801 of one picture receiving unit 806-1 of the plurality of picture receiving units 806-1 and 806-2 which simultaneously conduct the operations correctly work, whereas the time intervals stored in the execution command sequence storage means 2801 of the other picture receiving unit 806-2 are ignored.

The automatic stored command execution requesting means 2805 of the first picture receiving unit 806-1 starts the automatic execution of the execution command stored in the execution command sequence storage means 2801 through the use of the method in the ninth embodiment or the tenth embodiment. In this case, the automatic stored command execution requesting means 2805 uses the simultaneous transfer means 2807 to concurrently make a request for the command execution to its stored command execution means 2802 and all the other picture receiving units (806-2) which are required to execute the command. When receiving the command execution request, in the picture receiving units 806 the stored command execution means 2802 executes the requested execution command stored in the execution command sequence storage means 2801. Immediately after the start of the automatic execution of the execution command, the stored command execution means 2802 of the first picture receiving unit 806-1 and the stored command execution means 2802 of the second picture receiving unit 806-2 which receives the execution request through the transmission medium concurrently start the command execution. In this embodiment, the stored command execution means 2802 of the first picture receiving means 806-1 starts the reception in a state that the picture reception channel is set to 4 and turns on the illumination switch (table 2) connected thereto, while the stored command execution means 2802 of the second picture receiving unit 806-2 starts the reception in a state that the picture reception channel is set to 22 (table 3). These command executions are simultaneously done in a synchronized condition.

Thereafter, as in the case of the ninth embodiment or the tenth embodiment, the operation remains for a designated time or the next command step is executed in accordance with the control request from the external. In this embodiment, number 1 is stored in the on-execution command number storage means 2806 of the first picture receiving unit 806-1, and then the automatic stored command execution requesting means 2805 makes a request for the execution of the next command step after waiting for 5 seconds on the basis of the time information given from the time measuring means 2804 at a given time interval. With the repeated operation, the command execution operations (mainly, the picture switching or the like) can concurrently be done in accordance with the operational contents of the execution commands stored in the execution command sequence storage means 2801 of each of the plurality of picture receiving means 806. The timing that the picture receiving units 806-1 and 806-2 receiving the execution instructions execute the command respectively depend upon their internal clocks. The plurality of picture sending units and picture receiving units can simultaneously perform the synchronized execution in such a manner that one picture sending unit or picture receiving unit sends a time adjusting command for the notice of time at a given time interval through the simultaneous transfer means and the picture sending units and picture receiving units receiving this command synchronize the internal clocks.

As described above, according to this embodiment, even if the process of automatically conducting the operation such as the picture switching according to a given procedure is automatically done without the use of a managing unit, the execution timings for the automatic executions which are made in non-synchronized states are synchronized in the picture sending units and the picture receiving units, thus accomplishing the concurrent execution. Thus, the picture can concurrently be switched in a plurality of picture receiving units, thereby creating the natural view.

Thirteenth Embodiment

Figure 28:
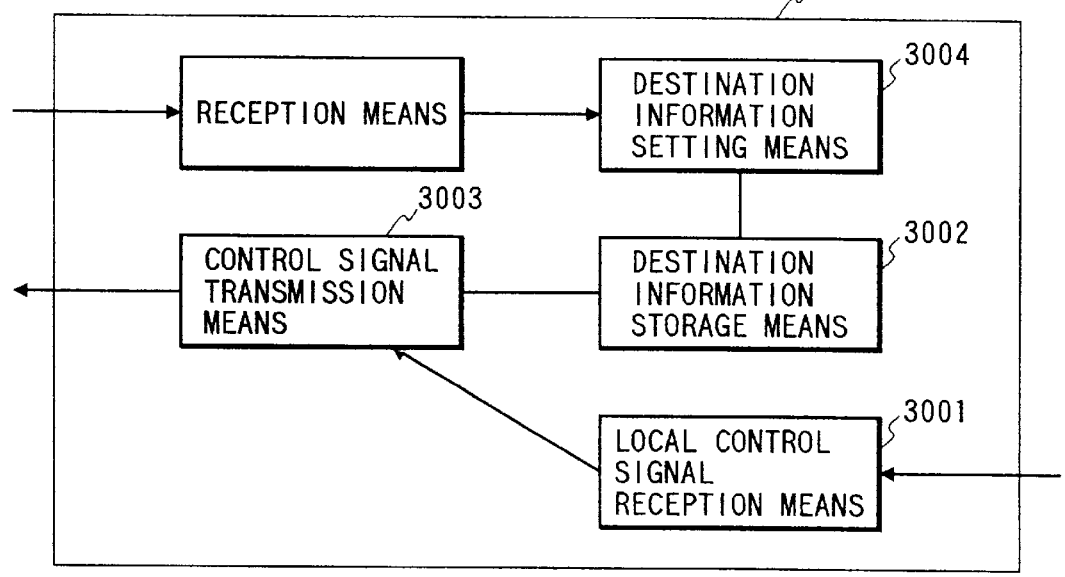
FIG. 28 is a block diagram showing an arrangement of a local control signal transmission section of a control signal transmission unit, a picture sending unit and a picture receiving unit in a thirteenth embodiment of this invention.

Referring to FIGS. 8 and 28, a description will be made hereinbelow of a thirteenth embodiment of this invention. Although FIG. 8 shows the arrangement of the picture transmission system according to the third embodiment of this invention, the thirteenth embodiment has the same arrangement as that as shown in FIG. 8, and the components are the same as those in the third embodiment.

FIG. 28 is a block diagram showing an arrangement of a local control signal transmission section of the control signal transmission units, the picture sending units and the picture receiving units in the thirteenth embodiment of this invention. The local control signal transmission section is, as shown in FIG. 28, composed of local control signal reception means 3001 for receiving a control signal from an external control unit connected thereto, destination information storage means 3002 for storing the destination to which a control signal goes, control signal transmission means 3003 for transmitting a control signal to a different control signal transmission unit, picture sending unit or picture receiving unit which is a destination stored in the destination information storage means 3002, and destination information setting means 3004 for setting the destination stored in the destination information storage means 3002 in accordance with a request from the external.

A description will be taken hereinbelow of an operation of the arrangement as shown in FIGS. 8 and 28. A picture sending unit 805-1 arranged as shown in FIG. 28 is connected to a camera (picture inputting means) 801-1 as shown in FIG. 8 and the camera 801-1 is equipped with a sensor so that a control signal from the sensor is inputted in the picture sending unit 805-1. Let it be assumed that the picture information inputted from the camera 801-1 is now transmitted to a monitor (picture outputting means) 803-1. A unit outside the picture sending unit 805-1, for example the picture connection requesting means 808, issues a request to the picture sending unit 805-1 to set as the destination information the picture receiving unit 806-1 coupled to the monitor 803-1. When receiving this request through the transmission medium and the reception means, the destination information setting means 3004 of the picture sending unit 805-1 makes the destination information storage means 3002 store the picture receiving unit 806-1 (the address of the picture receiving unit 806-1). At this time, if the control signal occurs from the sensor of the camera 801-1, the local control signal reception means 3001 of the picture sending unit 805-1 receives this sensor signal, and the control signal transmission means 3003 transmits the sensor control signal to the destination stored in the destination information storage means 3002 without change. In this example, the transmission is made to the picture receiving unit 806-1. Accordingly, the picture receiving unit 806-1 can receive the sensor signal of the camera 801-1 and, for example, can change the display on the monitor (the picture outputting means) connected thereto or turn on a lamp.

As described above, according to this embodiment, a control signal issued from a control unit connected to the picture sending units, the picture receiving units or the control signal transmission unit can be transmitted to the picture sending units, the picture receiving units and the control signal transmission units which can be set from the external. Although in this embodiment the picture sending unit is used, it is also possible to use the picture receiving units 806 or the control signal transmission units 807. If the other parties are stored as the destination in the destination information storage means, one-to-one control signal communications are possible. In addition to the sensor, it is also possible to transmit to distant places a control signal outputted from a control unit such as a video recorder, a video player and a CD player. The control unit can be a unit which has no relation to this picture transmission system.

Fourteenth Embodiment

Figure 29:
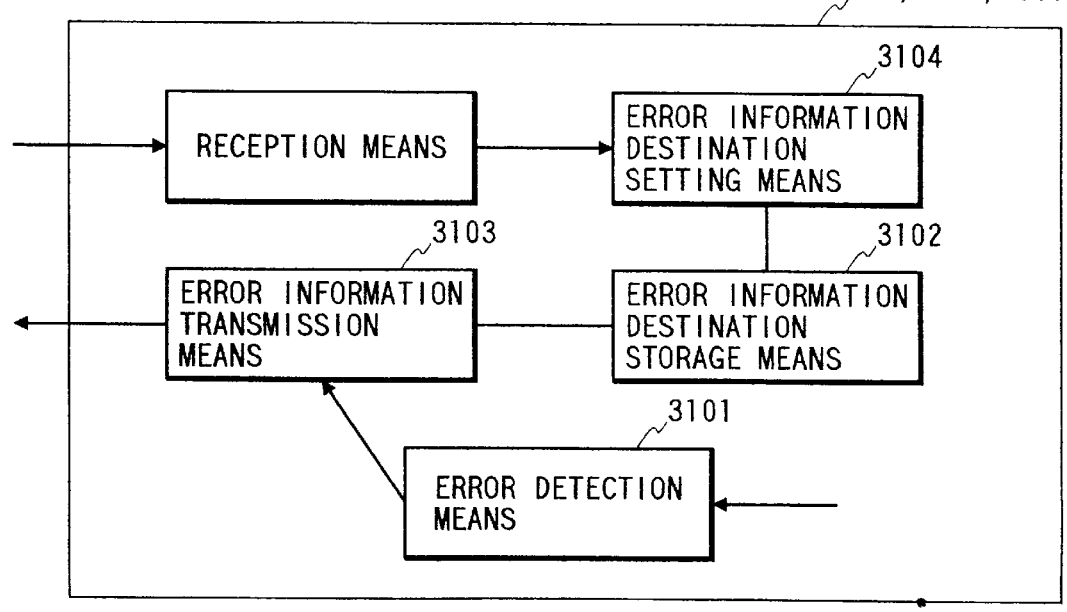
FIG. 29 is a block diagram showing an arrangement of an error information transmission section of a control signal transmission unit, a picture sending unit and a picture receiving unit in a fourteenth embodiment of this invention.

Referring to FIGS. 8 and 29, a description will be made hereinbelow of a fourteenth embodiment of this invention. Although FIG. 8 shows the arrangement of the picture transmission system according to the third embodiment of this invention, the fourteenth embodiment has the same arrangement as that shown in FIG. 8, and the components are the same as those in the third embodiment.

FIG. 29 is a block diagram showing an arrangement of an error information transmission section of the control signal transmission units, the picture sending units and the picture receiving units in the fourteenth embodiment of this invention. The error information transmission section is, as shown in FIG. 29, composed of error detection means 3101 for detecting an error generated in the internal processing, error destination information storage means 3102 for storing the destination to which the detected error information is sent, error transmission means 3103 for transmitting the error information to the picture sending unit 805, the picture receiving unit 806 or the control signal transmission unit 807 which is the destination stored in the error destination information storage means 3102, and error destination information setting means 3104 for setting the error destination to be stored in the error destination information storage means 3102 in accordance with a request from the external.

A description will be made hereinbelow of an operation of the arrangement as shown in FIGS. 8 and 29. The picture sending units 805, the picture receiving units 806 and the control signal transmission units 807 receive a control signal through the transmission medium and transmits a control signal through the transmission medium. Further, as well as the ninth embodiment, various processing such as the automatic execution operations for the execution commands are done in their interiors. In the case that error occurs in these transmission processing, reception processing and internal processing, there is a possibility that the error is not communicated to any place. In this case, there arises a problem that the picture transmission system does not correctly work.

Let it be assumed that the picture sending unit 805 is arranged as shown in FIG. 29 and any failure of the reception of a control signal occurs. In this instance, the error detection means 3101 of the picture sending unit 805 detects the error and gets the error information (such as cause). The error transmission means 3103 sends this error information to the destination stored in the error destination information storage means 3102. A unit outside the picture sending unit 805, for example the picture connection requesting means 808, previously makes a request to the picture sending unit 805 to set as the error destination information the picture receiving unit 806 connected to the monitor 803. When receiving this request through the transmission medium and the reception means, the error destination information setting means 3104 of the picture sending unit 805 makes the error destination information storage means 3102 store the picture receiving unit 806 (the address of the picture receiving unit 806).

Thus, in this embodiment the error information is sent to the picture receiving unit 806, and hence it is possible that the picture receiving unit 806 knows the fact that an abnormality occurs in the picture sending unit 805 connected to the camera 801 and receives that error information. Accordingly, it can display the occurrence of the error or take the countermeasures such as no use of the camera 801.

As described above, according to this embodiment, the error information issued from the internal of the picture sending unit, the picture receiving unit and the control signal transmission unit can be transmitted to the picture sending units, the picture receiving units and the control signal transmission units which can be set from the external. Although in this embodiment the picture sending unit is used, it is also possible to use the picture receiving unit 806 or the control signal transmission unit 807. If the designations stored in the error destination information storage means 3102 of all the picture sending units 805, picture receiving units 806 and control signal transmission units 807 are set to be the same, the error information gather to one place, which can facilitate the error management in the entire picture transmission system.

As described before, this invention performs the dynamic management of the channel resources of the transmission medium with the picture connection managing unit or the picture sending unit and the picture receiving unit to allow the number of picture inputting means (cameras, video players or the like) to be installed to exceed the number of channel resources. In addition, with the goodness of fit between the vacant channels and the picture inputting means being calculated, the channel allocation is possible taking into consideration the restriction of the channel resources to be used in the picture switching. Further, in a manner that a plurality of picture sending units and a plurality of picture receiving units perform the dynamic management of the channel resources, the dynamic allocation of the channel resources is possible with a simple arrangement but without the use of a special managing unit. Still further, through the use of the simultaneous transfer means, a plurality of picture receiving units or picture sending units are synchronized with each other, so that the picture switching is possible without the disorder of the pictures. Moreover, the picture receiving unit has two or more tuners and, through the use of the tuner which is not on output in the picture switching, the picture reception is started and then the tuner is changed, so that it is possible to switch the picture without the disorder of the pictures. Besides, only the picture receiving unit which fails in the reception issues a retransmission request during a given time period when the picture sending unit or the picture receiving unit uses the simultaneous transfer means for transferring a control signal, and hence the transmission is possible without largely deteriorating the efficiency of the transmission medium.

Furthermore, in a way that the picture receiving unit or the picture sending unit stores the execution command, the operation such as the picture switching can automatically be done, and when performing the automatic execution, that operation is controllable and the grasping the execution status is possible. In addition, through the use of the simultaneous transfer means, it is possible to accomplish the automatic execution of the operation such as the picture switching in a synchronized state using a plurality of picture receiving units or picture sending units. Further, with the picture receiving unit, the picture sending unit and the control signal transmission unit retaining the destination, a control signal issued from a control unit can easily be transmitted through the transmission medium. Moreover, with the picture receiving unit, the picture sending unit and the control signal transmission unit retaining the error destination, in the error processing it is possible to readily grasp the execution status.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A picture transmission system comprising:

a plurality of picture inputting means;

a transmission medium for multiplexing and transmitting video information inputted through said plurality of picture inputting means;

a plurality of picture outputting means for displaying said video information transmitted through said transmission medium;

a plurality of branching means for joining and distributing the video information introduced into said transmission medium and multiplexed therein;

a plurality of picture sending units connected to said branching means for selecting a specified channel of said transmission medium to send said video information taken through said picture inputting means, and made for performing input and output of a control signal through said transmission medium;

a plurality of picture receiving units connected to said branching means for selecting said video information of a specified channel of a plurality of channels multiplexed in said transmission medium to output the selected information to said picture outputting means, and made for performing input and output of a control signal through said transmission medium;

a control signal transmission unit connected to said branching unit for carrying out input and out of a control signal through said transmission medium;

picture connection requesting means connected to said control signal transmission unit for making a request for switching a picture taken through specified one of said picture inputting means to specified one of said picture outputting means; and a picture connection managing unit connected to said control signal transmission unit for managing a picture connection state between said picture inputting means and said picture outputting means and channel resources of said transmission medium and for accepting a connection request from said picture connection requesting means to control the picture connection state, wherein said picture connection managing unit includes a plurality of picture sending state storage means for storing channel information on each of said picture inputting means in the form of a stack structure, a plurality of picture receiving state storage means for storing identification information on said picture inputting means from which said picture outputting means is on picture reception, and resource allocation means for allocating channel resources necessary for picture connection, and when said picture connection requesting means makes a request for picture switching to output a picture from first picture inputting means of said plurality of picture inputting means to first picture outputting means of said plurality of picture outputting means, said resource allocation means finds second picture inputting means, from which said first picture outputting means is in picture reception, from said picture receiving state storage means corresponding to said first picture outputting means to take out one head channel resource from said channel information in said picture sending state storage means corresponding to said second picture inputting means and, if said channel information comes to vacancy, gives instructions to turn off a picture sending switch of said picture sending unit which is in connection with said second picture inputting means and gives instructions to said picture sending unit, which is in connection with said first picture inputting means, to add the derived channel resource to a head of said channel information in said picture sending state storage means corresponding to said first picture inputting means and to send a picture through the use of a channel resource existing a stack bottom of said channel information and further gives instructions to said picture receiving unit, which is in connection with said first picture outputting means, to receive the picture through the use of said channel resource existing on the stack bottom of said channel information, so that said channel resources equal in number to said picture outputting means allow arbitrary picture connections with more picture inputting means.

2. A picture transmission system comprising:

a plurality of picture inputting means;

a transmission medium for multiplexing and transmitting video information inputted through said plurality of picture inputting means;

a plurality of picture outputting means for displaying said video information transmitted through said transmission medium;

a plurality of branching means for joining and distributing the video information introduced into said transmission medium and multiplexed therein;

a plurality of picture sending units connected to said branching means for selecting a specified channel of said transmission medium to send said video information taken through said picture inputting means, and made for performing input and output of a control signal through said transmission medium;

a plurality of picture receiving units connected to said branching means for selecting said video information of a specified channel of a plurality of channels multiplexed in said transmission medium to output the selected information to said picture outputting means, and made for performing input and output of a control signal through said transmission medium;

a control signal transmission unit connected to said branching unit for carrying out input and out of a control signal through said transmission medium;

picture connection requesting means connected to said control signal transmission unit for making a request for switching a picture taken through specified one of said picture inputting means to specified one of said picture outputting means; and a picture connection managing unit connected to said control signal transmission unit for managing a picture connection state between said picture inputting means and said picture outputting means and channel resources of said transmission medium and for accepting a connection request from said picture connection requesting means to control the picture connection state, wherein said picture connection managing unit includes a plurality of picture sending state storage means for storing channel information, which is currently on output, on each of said picture inputting means and the number of on-connection picture outputting means which are on picture connection, a plurality of picture receiving state storage means for storing identification information on said picture inputting means from which said picture outputting means are on picture reception, vacant channel information storage means for storing channel resources which are not put to use, channel resource goodness-of-fit calculation means for calculating a goodness of fit between said picture inputting means and said channel resources, and resource allocation means for allocating said channel resources necessary for picture connections, and when said picture connection requesting means makes a request for switching a picture taken through first picture inputting means of said plurality of picture inputting means to first picture outputting means of said plurality of picture outputting means, said resource allocation means finds second picture inputting means, which is in picture reception, from said picture receiving state storage means corresponding to said first picture outputting means to decrement the number of said on-connection picture outputting means, stored in said picture sending state storage means corresponding to said second picture inputting means, by 1, and, when the number comes to 0, derives a channel resource from said channel information to make said vacant channel information storage means store the derived channel resource, and gives instructions to turn off a picture sending switch of said picture sending unit which is in connection with said second picture inputting means, and increments the number of said on-connection picture outputting means, stored in said picture sending state storage means corresponding to said first picture inputting means, by 1, and when the number of said on-connection picture outputting means is not 1, gives instructions to said picture receiving means which is in connection with said first picture outputting means to receive a picture through the use of said channel resource of said channel information stored in said picture sending state storage means, and when the number of said on-connection picture outputting means is 1, gives instructions to said picture sending unit which is in connection to said first picture inputting means to select and take out a channel resource with the highest goodness of fit with respect to said first picture inputting means found through said channel resource goodness-of-fit calculation means from said channel resource stored in said vacant channel information storage means, to store the selected channel resource in said channel information of said picture sending state storage means corresponding to said first picture inputting means and to send a picture through the use of said channel resource included in said channel information, and further give instructions to said picture receiving unit which is in connection to said first picture outputting means to receive the picture through the use of said channel resource, so that picture connections with the more picture inputting means are possible with said picture outputting means and said channel resources corresponding to the vacant channels.

3. A picture transmission system comprising:

a plurality of picture inputting means;

a transmission medium for multiplexing and transmitting video information inputted through said plurality of picture inputting means;

a plurality of picture outputting means for displaying said video information transmitted through said transmission medium;

a plurality of branching means for joining and distributing the video information introduced into said transmission medium and multiplexed therein;

a plurality of picture sending units connected to said branching means for selecting a specified channel of said transmission medium to send said video information taken through said picture inputting means, and made for performing input and output of a control signal through said transmission medium;

a plurality of picture receiving units connected to said branching means for selecting said video information of a specified channel of a plurality of channels multiplexed in said transmission medium to output the selected information to said picture outputting means, and made for performing input and output of a control signal through said transmission medium;

a control signal transmission unit connected to said branching unit for carrying out input and out of a control signal through said transmission medium;

picture connection requesting means connected to said control signal transmission unit for making a request for switching a picture taken through specified one of said picture inputting means to specified one of said picture outputting means; and simultaneous transfer means provided in each of said picture sending units, said picture receiving units and said control signal transmission unit for simultaneously transferring the same control signal to all groups of or a portion of all the groups of said picture sending units, said picture receiving units and said control signal transmission unit.

4. A picture transmission system as defined in claim 3, wherein each of said picture sending units and said picture receiving units includes:

a plurality of picture sending state storage means for storing channel information on each of said picture inputting means in the form of a stack structure;

a plurality of picture receiving state storage means for storing identification information on said picture inputting means from which said picture outputting means are on picture reception; and resource allocation means for allocating channel resources necessary for picture connections, wherein, when said picture connection requesting means uses said simultaneous transfer means to make a request for picture switching to all said picture sending units and all said picture receiving units to output a picture taken through first picture inputting means of said plurality of picture inputting means to first picture outputting means of said plurality of picture outputting means, said resource allocation means in each of said picture sending units and said picture receiving units finds second picture inputting means, which is in picture reception, from said picture receiving state storage means corresponding to said first picture outputting means to derive one head channel resource from said channel information in said picture sending state storage means corresponding to said second picture inputting means and, if said channel information comes to vacancy and it belongs to said picture sending unit which is in connection with said second picture inputting means, turns off its picture sending switch and adds the derived channel resource to a head of said channel information in said picture sending state storage means corresponding to said first inputting means, and when it belongs to said picture sending unit which is in connection to said first picture inputting means, sends a picture through the use of said channel resource existing on a stack bottom of said channel information, and if it belongs to said picture receiving unit which is in connection with said first picture outputting means, starts picture reception through the use of said channel resource, so that said channel resources equal in number to said picture outputting means allow arbitrary picture connections with the more picture inputting means.

5. A picture transmission system as defined in claim 3, wherein each of said picture sending units and said picture receiving units includes:

a plurality of picture sending state storage means for storing channel information, which is currently on output, on each of said picture inputting means and the number of the on-connection picture outputting means which are on picture connection;

a plurality of picture receiving state storage means for storing identification information on said picture inputting means from which said picture outputting means are on picture reception;

vacant channel information storage means for storing channel resources which are not put to use;

channel resource goodness-of-fit calculation means for calculating a goodness of fit between said picture inputting means and said channel resources; and resource allocation means for allocating said channel resources necessary for picture connections, wherein, when said picture connection requesting means uses said simultaneous transfer means to make a request for picture switching to all said picture sending units and all said picture receiving units to output a picture taken through first picture inputting means of said plurality of picture inputting means to first picture outputting means of said plurality of picture outputting means, said resource allocation means in each of said picture sending units and said picture receiving units finds second picture inputting means, which is in picture reception, from said picture receiving state storage means corresponding to said first picture outputting means to decrement said on-connection picture outputting means, stored in said picture sending state storage means corresponding to said second picture inputting means, by 1 and, when the number comes to 0, derives a channel resource from said channel information to make said vacant channel information storage means store said channel resource, and if it belongs to said picture sending unit which is connection with said second picture inputting means, turns off its picture sending switch and increments the number of said on-connection picture outputting means, stored in said picture sending state storage means corresponding to said first picture inputting means, by 1, and when the number of said on-connection picture outputting means is not 1 and it belongs to said picture receiving unit which is in connection with said first picture outputting means, receives a picture through the use of said channel resource of said channel information stored in said picture sending state storage means, and when the number of said on-connection picture outputting means is 1, selects and derives a channel resource with the highest goodness of fit with respect to said first inputting means found through said channel resource goodness-of-fit calculation means from said channel resources stored in said vacant channel information storage means to put the derived channel resource in said channel information of said picture sending state storage means corresponding to said first picture inputting means, and when it belongs to said picture sending units which is in connection to said first picture inputting means, sends a picture through the use of said channel resource stored in said channel information, and when it belongs to said picture receiving unit which is in connection with said first picture outputting means, receives the picture through the use of said channel resource, so that said channel resources equal in number to said picture outputting means allow the picture connections with the more picture inputting means.

6. A picture transmission system as defined in claim 3, wherein said picture sending unit comprises:

one picture sending state storage means for storing channel information on said picture inputting means in the form of a stack structure; and sending channel resource delivering and receiving means for giving and getting channel resources for picture connections to and from the other picture sending units or said picture receiving units, and said picture receiving unit comprising:

one picture receiving state storage means for storing identification information on said picture inputting means from which said picture outputting means are on picture reception; and reception channel resource delivering and receiving means for giving and getting channel resources for picture connections to and from said picture sending units, wherein, when said picture connection requesting means makes a request for picture switching to output a picture taken through first picture inputting means of said plurality of picture inputting means to first picture outputting means of said plurality of picture outputting means, said reception channel resource delivering and receiving means of said picture receiving unit which is in connection with said first picture outputting means finds second picture inputting means, from which a picture is received, stored in said picture receiving state storage means, and said sending channel resource delivering and receiving means of said picture sending unit which is in connection with said second picture inputting means derives one head channel resource from said channel information stored in said picture sending state storage means to give said channel resource to said picture sending unit which is in connection with said first picture inputting means and, when said channel information comes to vacancy, turns off its picture sending switch, and said sending channel resource delivering and receiving means of said picture sending unit which is in connection with said first picture inputting means adds said channel resource it receives to a head of said channel information stored in said picture sending state storage means and sends a picture through the use of said channel resource existing on a stack bottom of said channel information and further passes said channel resource existing on the stack bottom of said channel information to said picture receiving unit which is in connection with said first picture outputting means, and said reception channel resource delivering and receiving means of said picture receiving unit which is in connection with said first picture outputting means receives the picture in said received channel resource, so that said channel resources equal in number to said picture outputting means allow arbitrary picture connections with the more picture inputting means.

7. A picture transmission system as defined in claim 3, wherein each of said picture sending units and said picture receiving units comprises:

execution command storage means for storing one or more execution commands such as picture sending start and picture receiving start;

stored command execution means for conducting an operation corresponding to said command stored in said execution command storage means; and execution command reception means for, when receiving said execution command from any one of the other picture sending units, the other picture receiving units and said control signal transmission unit, making said execution command storage means store said received execution command, and for, when receiving instructions for command execution from the other picture sending units, picture receiving units and said control signal transmission unit, issuing a request to said stored command execution means to conduct a command operation stored in said execution command storage means, wherein, when said picture connection requesting means makes a request for picture switching to output a picture taken through first picture inputting means of said plurality of picture inputting means to first picture outputting means of said plurality of picture outputting means, in response to simultaneous instructions for execution of said command operation from said simultaneous transfer means, each of said picture sending unit which is in connection with said first picture inputting means, said picture receiving unit which is in connection with said first picture outputting means and said picture sending unit which is in connection with said second picture inputting means displayed on said first picture outputting means concurrently conducts said command operation including picture sending start, picture receiving start and picture sending stop so that the picture switching between said plurality of picture sending units and said plurality of picture receiving units are accomplished in synchronized conditions to prevent temporary disorder of pictures.

8. A picture transmission system as defined in claim 3, wherein each of said picture receiving units comprises:

two or more picture signal demodulation means for selecting and demodulating a picture signal in a set demodulation channel of video information multiplexed in said transmission medium to output the demodulated picture signal;

picture output switching means for selecting and outputting one of a plurality of picture signals outputted from said picture signal demodulation means;

demodulation channel setting means for setting said demodulation channel for each of said picture signal demodulation means; and control signal reception means for receiving a control signal transmitted through said transmission medium to accept a picture switching request, wherein, when receiving requests for picture connection and picture switching made from the external through a specified channel resource, said control signal reception means selects one of said picture signal demodulation means which are not selected by said picture output switching means and makes a request to said demodulation channel setting means being in connection with the selected picture signal demodulation means to set said demodulation channel to said channel resource designated from the external, while said picture output switching means selects a picture signal outputted from said picture signal demodulation means which sets said demodulation channel and switches and outputs the picture signal to allow demodulation to start in said picture signal demodulation means to avoid temporary disorder of pictures.

9. A picture transmission system as defined in claim 3, wherein each of said picture sending units, said picture receiving units and said control signal transmission unit comprises:

said simultaneous transfer means;

control data transmission means for transmitting control data to the other picture sending units, picture receiving units and control signal transmission unit in response to a request from said simultaneous transfer means;

control data reception means for receiving said control data through said transmission medium from the other picture sending units, picture receiving units and control signal transmission unit;

control data detection means for detecting the fact that said control data flows on said transmission medium; and transmission control means for making a request for retransmission of said control data to said simultaneous transfer means when the other picture sending units, picture receiving units and control signal transmission unit issues a retransmission request through said transmission medium, wherein said control data transmission means waits for a given time period without transmitting control data after transmitting said control data to the other picture sending units, picture receiving units and control signal transmission unit in response to a request from said simultaneous transfer means, and said control data reception means of said picture sending units, picture receiving units and control signal transmission unit makes a request to said control data transmission means when failing to receive said control data to send a retransmission request into said transmission medium within said given time period, and when detecting within said given time period the fact that said control data flows on said transmission medium, said control data detection means of said picture sending units, picture receiving units and control signal transmission unit which send said control data makes a request to said simultaneous transfer means so that said transmission control means again transmits said control data, and if not detecting within said given time period the fact that the control data flows on said transmission medium, makes a request to said simultaneous transfer means to send the next control data to be transmitted.

10. A picture transmission system as defined in claim 9, wherein all said picture sending units, picture receiving units and control signal transmission unit which fail to receive said control data transmitted from said simultaneous transfer means send the same data for a given time period or continue to transmit a signal for data transmission for a given time period as a request for retransmission of said control data, and said picture sending units, said picture receiving units and said control signal transmission unit which transmits said control data detect an error in reception from said plurality of picture sending units, picture receiving unit and control signal transmission unit at a time.

11. A picture transmission system as defined in claim 9, wherein all said picture sending units, picture receiving units and control signal transmission unit which succeed in reception of control data transmitted from said simultaneous transfer means store the fact of occurrence of said retransmission request made in the reception of said control data at the retransmission to decide that the present data is the retransmitted data to abandon the retransmitted data so that said picture sending units, said picture receiving units and said control signal transmission unit which correctly receive said data do not take part in the data retransmission communication to decrease the number of retransmissions.

12. A picture transmission system as defined in claim 3, wherein each of said picture receiving units and said picture sending units includes:

execution command sequence storage means for storing an execution command sequence including step numbers undergoing automatic execution, a time interval determined at every step and one or more execution commands such as picture sending start and picture receiving start to be executed in the steps;

stored command execution means for executing said execution command corresponding to a designated step of said execution commands stored in said execution command sequence storage means;

execution command sequence reception means for receiving a portion of or all said execution command sequence from the external to make said execution command sequence storage means store said execution command sequence;

automatic stored command execution requesting means for making a request to said stored command execution means to conduct an operation corresponding to said command stored in said execution command sequence storage means;

time measuring means for measuring time to communicate time information to said automatic stored command execution requesting means at a given time interval; and on-execution command number storage means for storing step identification information on said command which is currently on automatic execution, wherein said automatic stored command execution requesting means gives instructions to said stored command execution means to execute said execution command corresponding to one step stored in said execution command sequence storage means and makes said on-execution command number storage means store said identification information on said execution command and further gives instructions to said stored command execution means to execute said execution command corresponding to the next step after the elapse of said time interval for each of the steps stored in said execution command sequence storage means found on the basis of said time information attained from said time measuring means at said given time interval, so that a given command operation is automatically conducted in accordance with a given procedure.

13. A picture transmission system as defined in claim 12, wherein each of said picture receiving units and said picture sending units includes:

execution command sequence storage means for storing an execution command sequence including step numbers undergoing automatic execution, a time interval determined at every step and one or more execution commands such as picture sending start and picture receiving start to be executed in the steps;

stored command execution means for executing said execution command corresponding to a designated step of said execution commands stored in said execution command sequence storage means;

execution command sequence reception means for receiving a portion of or all said execution command sequence from the external to make said execution command sequence storage means store said execution command sequence;

automatic stored command execution requesting means for making a request to said stored command execution means to conduct an operation corresponding to said command stored in said execution command sequence storage means;

time measuring means for measuring time to communicate time information to said automatic stored command execution requesting means at a given time interval;

on-execution command number storage means for storing step identification information on said command which is currently on automatic execution; and execution control method selection means for selecting one of a method of receiving an automatic execution operation for said execution command from the external and a method of automatically advancing said execution command through the use of said time measuring means, wherein said execution control method selection means directly hands over said time information given from said time measuring means to said automatic stored command execution requesting means during said automatic execution operation while, when receiving a request for temporary stop of said automatic execution operation from the external, outputting execution operation instructions from the external without handing over said time information from said time measuring means to said automatic stored command execution requesting means until receiving a request for resumption of said automatic execution operation.

14. A picture transmission system as defined in claim 12, wherein each of said picture receiving units and said picture sending units includes:

execution command sequence storage means for storing an execution command sequence including step numbers undergoing automatic execution, a time interval determined at every step and one or more execution commands such as picture sending start and picture receiving start to be executed in the steps;

stored command execution means for executing said execution command corresponding to a designated step of said execution commands stored in said execution command sequence storage means;

automatic stored command execution requesting means for making a request to said stored command execution means to conduct an operation corresponding to said command stored in said execution command sequence storage means;

on-execution command number storage means for storing step identification information on said command which is currently on automatic execution; and automatic execution status notice means for, when said stored command execution means conducts a command execution operation, informing the other picture receiving units, picture sending units and control signal transmission unit of information on said execution command.

15. A picture transmission system as defined in claim 13, wherein each of said picture receiving units and said picture sending units includes:

execution command sequence storage means for storing an execution command sequence including step numbers undergoing automatic execution, a time interval determined at every step and one or more execution commands such as picture sending start and picture receiving start to be executed in the steps;

stored command execution means for executing said execution command corresponding to a designated step of said execution commands stored in said execution command sequence storage means; and execution command sequence reception means for receiving a portion of or all said execution command sequence from the external to make said execution command sequence storage means store said execution command sequence, wherein at least one of said picture receiving unit and said picture sending unit includes automatic stored command execution requesting means for making a request to said stored command execution means to conduct an operation corresponding to said command stored in said execution command sequence storage means, time measuring means for measuring time to communicate time information to said automatic stored command execution means at a given time interval, on-execution command number storage means for storing step identification information on said command which is currently on automatic execution, and said simultaneous transfer means, and said automatic stored command execution requesting means makes a request through said simultaneous transfer means to said plurality of picture sending units and said plurality of picture receiving units to execute an execution command corresponding to one step stored in said execution command sequence storage means and makes said on-execution command number storage means store the step information on said execution command and further similarly makes a request through said simultaneous transfer means to said plurality of picture sending units and said plurality of picture receiving units to execute an execution command corresponding to the next step after the elapse of said time interval for the step stored in said execution command sequence storage means found on the basis of said time information obtained from said time measuring means at said given time interval, and said stored command execution means of each of said picture sending units and said picture receiving units which experience instructions for execution of said execution command executes said execution command corresponding to a designated command step number so that a process of automatically conducting a given command operation in accordance with a given procedure is concurrently done in a state that the respective execution timings for the automatic execution are synchronized with each other in said plurality of picture sending units and said plurality of picture receiving units.

16. A picture transmission system as defined in claim 15, wherein one picture sending unit or picture receiving unit of said plurality of picture sending units or picture receiving units uses said simultaneous transfer means to send a time adjusting command for simultaneously communicating time at a given time interval so that said plurality of picture sending units and said plurality of picture receiving units which receive said time adjusting command make their internal clocks synchronize with each other to execute a command in synchronized conditions.

17. A picture transmission system as defined in claim 15, wherein, when simultaneously transferring, through said simultaneous transfer means, an operation command for operating said picture receiving unit and said picture sending unit, each of said picture receiving units and said picture sending units adds time adjusting command including time information to said operation command before the transferring, and said plurality of picture sending units and said plurality of picture receiving units which receive said operation command including said time adjusting command make their internal clock synchronize with each other to conduct a command in synchronized conditions, so that the number of occurrences of said time adjusting command decreases.

18. A picture transmission system as defined in claim 3, wherein each of said control signal transmission unit, said picture sending units and said picture receiving units includes:

local control signal reception means for receiving a control signal from an external control unit connected thereto;

destination information storage means for storing a destination to which said control signal is sent;

control signal transmission means for transmitting said control signal to said picture sending unit, said picture receiving unit and said control signal transmission unit which is said destination stored in said destination information storage means; and destination information setting means for setting said destination to be stored in said destination information storage means in accordance with a request from the external.

19. A picture transmission system as defined in claim 3, wherein each of said control signal transmission unit, said picture sending units and said picture receiving units includes:

error detection means for detecting an error occurring in internal processing of said picture sending units, said picture receiving units and said control signal transmission unit;

error information destination storage means for storing a destination to which information on said error is sent;

error information transmission means for transmitting said error information to said picture sending units, said picture receiving units and said control signal transmission unit which is said destination stored in said error information destination storage means; and error information destination setting means for setting said error information destination to be stored in said error information destination storage means in accordance with a request from the external.

* * * * *